US006981134B2

(12) United States Patent
Yamamura

(10) Patent No.: US 6,981,134 B2
(45) Date of Patent: Dec. 27, 2005

(54) METHOD AND SYSTEM FOR PROCESSING USING A CPU AND DIGITAL SIGNAL PROCESSOR

(75) Inventor: Toshimi Yamamura, Kanagawa-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 597 days.

(21) Appl. No.: 10/128,366

(22) Filed: Apr. 24, 2002

(65) Prior Publication Data

US 2003/0009656 A1      Jan. 9, 2003

(30) Foreign Application Priority Data

| Apr. 24, 2001 | (JP) | ............................ 2001-126656 |
| Sep. 21, 2001 | (JP) | ............................ 2001-290273 |
| Dec. 28, 2001 | (JP) | ............................ 2001-402073 |

(51) Int. Cl.[7] .................. G06F 15/177; G06F 9/24; G06F 9/00
(52) U.S. Cl. ................ 713/1; 713/2; 713/100
(58) Field of Search ................ 381/61; 365/104; 711/136, 147, 209; 341/106, 155; 717/168; 712/217, 35; 713/1, 2, 100

(56) References Cited

U.S. PATENT DOCUMENTS

| 4,322,795 | A | * | 3/1982 | Lange et al. ................ 711/136 |
| 5,285,264 | A | * | 2/1994 | Matsushita ................... 348/571 |
| 5,325,494 | A | * | 6/1994 | Imai et al. .................... 712/217 |
| 5,564,031 | A | * | 10/1996 | Amerson et al. ............ 711/209 |
| 5,590,364 | A | * | 12/1996 | Hanzawa et al. ............. 712/43 |
| 5,757,690 | A | * | 5/1998 | McMahon ................... 365/104 |
| 5,959,231 | A | * | 9/1999 | Hasebe ......................... 84/601 |
| 6,002,996 | A | * | 12/1999 | Burks et al. ................. 702/188 |
| 6,031,916 | A | * | 2/2000 | Saito et al. ..................... 381/61 |
| 6,201,488 | B1 | * | 3/2001 | Sato et al. ................... 341/106 |
| 6,205,522 | B1 | * | 3/2001 | Hudson et al. ............. 711/147 |
| 6,414,620 | B1 | * | 7/2002 | Maeda et al. ............... 341/155 |
| 6,643,680 | B1 | * | 11/2003 | Kato et al. .................. 718/104 |
| 6,718,545 | B1 | * | 4/2004 | Imai et al. ................... 717/168 |
| 6,765,587 | B1 | * | 7/2004 | Zhang et al. ............... 345/606 |
| 6,862,359 | B2 | * | 3/2005 | Nordqvist et al. .......... 381/312 |

OTHER PUBLICATIONS

U.S. Appl. No. 09/451,774, filed Dec. 1, 1999, Yamamura.
U.S. Appl. No. 10/128,366, filed Apr. 24, 2002, Yamamura.

* cited by examiner

*Primary Examiner*—Chun Cao
*Assistant Examiner*—Ji H. Bae
(74) *Attorney, Agent, or Firm*—Oblon, Spivak, McClelland, Maier & Neustadt, P.C.

(57) ABSTRACT

A processor processing method suitable for a processor system. The processor system comprises a CPU 10, a ROM 20 coupled to the CPU, and a DSP 30 having a memory unit 50 for storing programs and a processor unit 40 for processing data according to the programs. The ROM stores a plurality of programs and parameters required for processing the programs to the ROM. The CPU downloads an initial program to the memory unit of the DSP when a power is turned on. Then, the programs and the parameters corresponding to each process request from the system processor external are transferred from the ROM to the memory unit of the DSP. The data to be processed is input from the external of the processor system to the DSP; processing the data by the processor unit based on the programs and the parameters that are transferred to the memory unit, and then the processed data is output to the system processor external.

15 Claims, 43 Drawing Sheets

| job type | job-A | | | job-B | | |
|---|---|---|---|---|---|---|
| request type | request I | request II | request III | request I | request II | request III |
| program combination | a-1 ↓ b-1 ↓ c-1 | a-2 ↓ b-1 ↓ c-1 | a-3 ↓ b-2 ↓ c-1 | a-1 ↓ c-2 ↓ d-1 | a-2 ↓ c-3 ↓ d-2 | a-3 ↓ d-3 |

FIG. 13

| request type | request I | request II | request III |
|---|---|---|---|
| program combination | a-1<br>↓<br>b-1<br>↓<br>c-1<br>↓<br>d-1 | a-2<br>↓<br>b-1<br>↓<br>c-1<br>↓<br>d-2 | a-3<br>↓<br>b-3<br>↓<br>c-2<br>↓<br>d-3 | reuse image of resource reuse image2 of resource change of memory area
before getting new resource and
after getting new resource sequence of getting new resource image of getting new resource change of memory area
before overwrite and after overwrite sequence of overwriting resource image of overwriting resource

METHOD AND SYSTEM FOR PROCESSING USING A CPU AND DIGITAL SIGNAL PROCESSOR

CROSS-REFERENCE TO RELATED APPLICATION

This application claims the priority benefit of Japanese application serial no. 2001-126656, filed on Apr. 24, 2001, 2001-290273, filed on Sep. 21, 2001 and 2001-402073, filed on Dec. 28, 2001.

BACKGROUND OF THE INVENTION

1. Field of the Invention

This invention relates in general to a processor processing method and a processor system. More specifically, the invention relates to a processor system having a digital signal processor (DSP) and a central processing unit (CPU), and a processing method suitable for the processor system.

2. Description of Related Art

Conventionally, regarding the signal processing for data processing etc, a general-purpose CPU or a ASIC (Application specific IC) dedicated to a particular useis used. The ASIC is designed so that its performance can be increased beyond that of the general-purpose CPU in the speed or in the cost aspect.

In addition, as the integration type IC becomes more popular, it begins to use products that are more widely used than the ASIC, for example the digital signal processor, such as a music chip or an image processing chip. Basically, the DSP is composed of a signal processing unit (processor unit) and a program storage unit to make the processor unit operate, which is installed as "middleware" having both characteristics of the hardware and the software.

Now, a system encircling a DSP is described. FIG. 56 is a diagram for explaining the configuration of a DSP system. A host CPU (CPU) 10 performs required settings, such as a boot process, on an upstream process unit and a downstream process unit. Additionally, downloading of the program is executed at the DSP 30. The upstream process unit 11 receives the settings from the CPU, and performs required operations to output signals to the DSP 30 when there is a requested process.

In general, the upstream process unit and the downstream process unit are respectively processing units for processing system external signals. In particular, the structure and the processing content are not limited. The programs are downloaded to the DSP 30 by the CPU 10, and the DSP 30 receives signals from the upstream process unit 11 and performs the signal processing according to the downloaded programs. Then, the processed signals are output to the downstream process unit 12.

FIG. 57 is an exemplary structure of the CPU 10 and the DSP 30. The CPU 10 has a read only memory (ROM) for storing a control program inside the CPU 10. The ROM stores the program downloaded to the DSP 30. The CPU 10 performs the download to the DSP in the boot process when the power is turned on or after the reset command.

FIG. 58 is a flow chart for describing the setting process of the CPU 10. The CPU 10 transmits the contents of a DSP program storage area in the ROM inside the CPU 10 to a memory unit in the DSP 30 according to the sequence shown in the drawing. As shown in FIG. 57, the DSP 30 consists of a processor unit 40 for performing the signal input, the signal process, and the signal output, and a memory unit 50 for storing the program that determines the processor's operations. Then, the DSP 30 performs processes according to the program downloaded to the memory unit 50.

FIG. 59 is a chart for showing the sequence that the system in FIG. 56 actually operates. First, when starting the power, a start request is acknowledged to the CPU 10 from external. As the CPU 10 receives the start request, the CPU 10 performs the boot processes to the upstream process unit 11 and the downstream process unit 12, and then sets each component. The drawing only shows the settings of the DSP 30. The process settings from the CPU 10 mean that the programs are downloaded to the DSP 10.

After the program is downloaded, the DSP 30 goes into a standby status for input signal, and returns a response of setting complete to the CPU. The CPU 10 acknowledges that the upstream process unit 11 is ready for starting the process. The upstream process unit 11 transmits signals to the DSP 30 at any time, the DSP 30 then processes the received signals and outputs to the downstream process unit 12.

As described above, by using the DSP, the hardware portion has a more generalized structure, and when using a variety of different hardware programs, the subroutine reuse probability is high and therefore the processing range can be widened.

However, the conventional technology has the following problems. Recently, the operation speed of the IC has increased greatly, and the design burden is increased for each product because the product cycle time is reduced. The specification may have to be versioned up when designing the ASIC or ordering the ASIC, and a portion of the specification may have to be changed. Therefore, it is difficult to properly keep up with the technology revolution. Additionally, for the ASIC chip, because the process content or the parameters required for the process are fixed, application is limited. Furthermore, using the conventional DSP cannot widen the application range.

SUMMARY OF THE INVENTION

According to the foregoing description, an object of this invention is to provide a processor processing method and a processor system to increase the processing varieties of the DSP.

It is another object of this invention is to provide a processor processing method and a processor system to parallel perform several different types of processes at the same time by the DSP.

Still another object of this invention is to provide a processor processing method and a processor system, by which even though requiring a complicated program combination, the CPU can transfer the whole program group to the DSP at a high speed.

It is still another object of this invention is to provide a processor processing method and a processor system to effectively utilize the memory resource or the register resource.

Another object of this invention is to provide a processor processing method and a processor system to reduce the processing time of the DSP.

According to at least the objects mentioned above, the invention provides a processor processing method, suitable for a processor system, wherein the processor system comprises a CPU, a ROM coupled to the CPU, and a DSP having a memory unit for storing programs and a processor unit for processing data according to the programs. The method comprises following steps. A plurality of programs and parameters required for processing the programs is stored to the ROM. An initial program is downloaded from the CPU to the memory unit of the DSP when power is turned on. The programs and the parameters corresponding to each process request from the system processor external are transferred from the ROM to the memory unit of the DSP. The data to be processed is input from the system processor external to the DSP. The data is processed by the processor unit based on the programs and the parameters that are transferred to the memory unit. The processed data is output to the system processor external. Therefore, the design can be easily changed by only replacing the ROM.

In addition, the method further comprises the steps of: storing a plurality of programs corresponding to types of process requests; receiving the process requests by the CPU at any time, and then transferring the programs and the parameters corresponding to the respective process requests from the ROM to the memory unit of the DSP; acquiring the data from a plurality of input/output interfaces respectively, wherein the DSP has the input/output interfaces corresponding to the data; processing the data by the processor unit based on the programs and the parameters that are transferred to the memory unit; and outputting the data to the system processor external through the input/output interfaces. Therefore, the process request can be received immediately.

The method further comprising: preparing a table corresponding to the process requests and program groups required for processing the process requests; and determining required parameters and program groups to be transferred to the DSP by the CPU by referring to the table according to the process requests. Accordingly, it is easy to determine which program can process the process request.

The table is stored in the ROM. Therefore, all elements for changing the design can be integrated into the ROM chip.

The method further comprises detecting a memory use status of the memory unit of the DSP by the CPU; searching empty regions in the memory unit; and transferring the programs and the required parameters corresponding to each process request from the ROM to the empty regions in the memory unit. Therefore, the memory resource can be effectively utilized.

The method further comprises: holding a history of the process requests by the CPU; determining whether each coming process request from the system processor external is consistent with past process requests; transferring required different programs and required different parameters from the ROM to the memory unit of the DSP to process the coming request by referring to the table if the coming process request is not consistent with the past process request; using the programs and parameters that have been transferred to the memory unit of the DSP if the coming process request is consistent with the past process request, and then processing the data by the processor unit and outputting the data to the external of the processor system; and using the different programs and the different parameters as well as the programs and parameters that have been transferred to the memory unit of the DSP to process the data by the processor unit and then to output the data to the system processor external, if different programs and the different parameters are transferred. Accordingly, the transferring time can be reduced.

The method further comprises: detecting a memory use status of the memory unit of the DSP by the CPU; searching empty regions in the memory unit, and then transferring the different programs and the required parameters from the ROM to the empty regions in the memory unit; and referring to the history of the process requests to ask the DSP to release regions where the programs are not used if there are no empty regions, and then transferring the different programs and the required parameters from the ROM to the released regions in the memory unit. Accordingly, the transferring time can be reduced.

The method further comprises: detecting a memory use status of the memory unit of the DSP and a register use status of the register unit of the processor unit by the CPU; and distributing and transferring the programs and the required parameters corresponding to each process request from the ROM to empty regions in the memory unit and empty regions in the registers of the register unit of the processor unit. Therefore, the memory resource and the register resource can be effectively utilized.

The method further comprises: holding a history of the process requests by the CPU; determining whether each coming process request from system processor external is consistent with past process requests; distributing and transferring required different programs and required different parameters from the ROM to the memory unit of the DSP and a register unit of the processor unit to process the coming request by referring to the table if the coming process request is not consistent with the past process request; using the programs and parameters that have been transferred to the memory unit of the DSP if the coming process request is consistent with the past process request, and then processing the data by the processor unit and outputting the data to the system processor external; and using the different programs and the different parameters as well as the programs and parameters that have been transferred to the memory unit of the DSP to process the data by the processor unit and then to output the data to the system processor external, if the different programs and the different parameters are transferred. As a result, the transferring time can be reduced.

The method further comprises: detecting a memory use status of the memory unit of the DSP and a register use status of the register unit of the processor unit by the CPU; distributing and transferring the different programs and the required parameters from the ROM to empty regions in the memory unit and empty regions in the register unit of the processor unit; and referring to the history of the process requests to ask the DSP to release regions where the programs are not used if there are no empty regions, and then transferring the different programs and the required parameters from the ROM to the released regions in the memory unit and the released regions in the register unit of the processor unit. As a result, the transferring time can be reduced.

As mentioned, the CPU holds the history of the past process requests. The processing time of the DSP can be reduced when there is routine work.

The register unit of the processor unit is connected to line memories, an image processing hardware, or an audio processing hardware. Therefore, the complicated processes can be performed conveniently at a high speed.

The transfer of the programs required from the CPU to the DSP is performed each time it is determined that the respective required program needs to process the process request. Therefore, the downloaded programs can become more generalized.

The transfer of the programs required from the CPU to the DSP is performed once after the required program group to process the process request is determined. Therefore, the downloaded programs can become more general.

The invention further provides a processor system, consisting of a CPU and a DSP to perform plural data processes with respect to data, and to execute functions for different applications. The CPU further comprises a ROM coupled to the CPU, for storing programs corresponding to a plurality of processes respectively, and parameters used by the program; a process request input device, for inputting process requests to start processes to execute the functions; a determining device, for determining process combinations to be processed by the DSP and required parameters according to the process requests input from the process request input device; and a transferring device, for transferring programs related to the process combinations, and the parameters, which are determined by the determining device from the programs and parameters stored in the ROM, to the DSP. The DSP further comprises an data input device for inputting the data; a RAM for storing the programs and parameters transferred from the CPU; a processing device, for performing a series of processes to the data input from the data input device, according to the programs and parameters stored in the RAM, and therefore to execute the functions corresponding to the applications.

The invention further provides a processor system, consisting of a CPU and a DSP to perform plural data processes with respect to data, and to execute functions for different applications. The CPU further comprises a ROM coupled to the CPU, for storing programs corresponding to a plurality of processes respectively, and parameters used by the program; a process request input device, for inputting process requests to start processes to execute the functions; a determining device, for determining process combinations to be processed by the DSP and required parameters according to the process requests input from the process request input device; and a transferring device, for transferring programs related to the process combinations, and the parameters, which are determined by the determining device from the programs and parameters stored in the ROM, to the DSP. The DSP further comprises a data input device for inputting the data; a RAM and a register unit for storing the programs and parameters transferred from the CPU; a processing device, for performing a series of processes to the data input from the data input device, according to the programs and parameters stored in the RAM through the register unit, and thereafter to execute the functions corresponding to the applications.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 13 shows an example of the process converting table;

DESCRIPTION OF THE PREFERRED EMBODIMENT

In the following paragraphs, several embodiments are presented for describing the method and the structure in detail according to the invention.

<<First Embodiment>>

Figure 1:
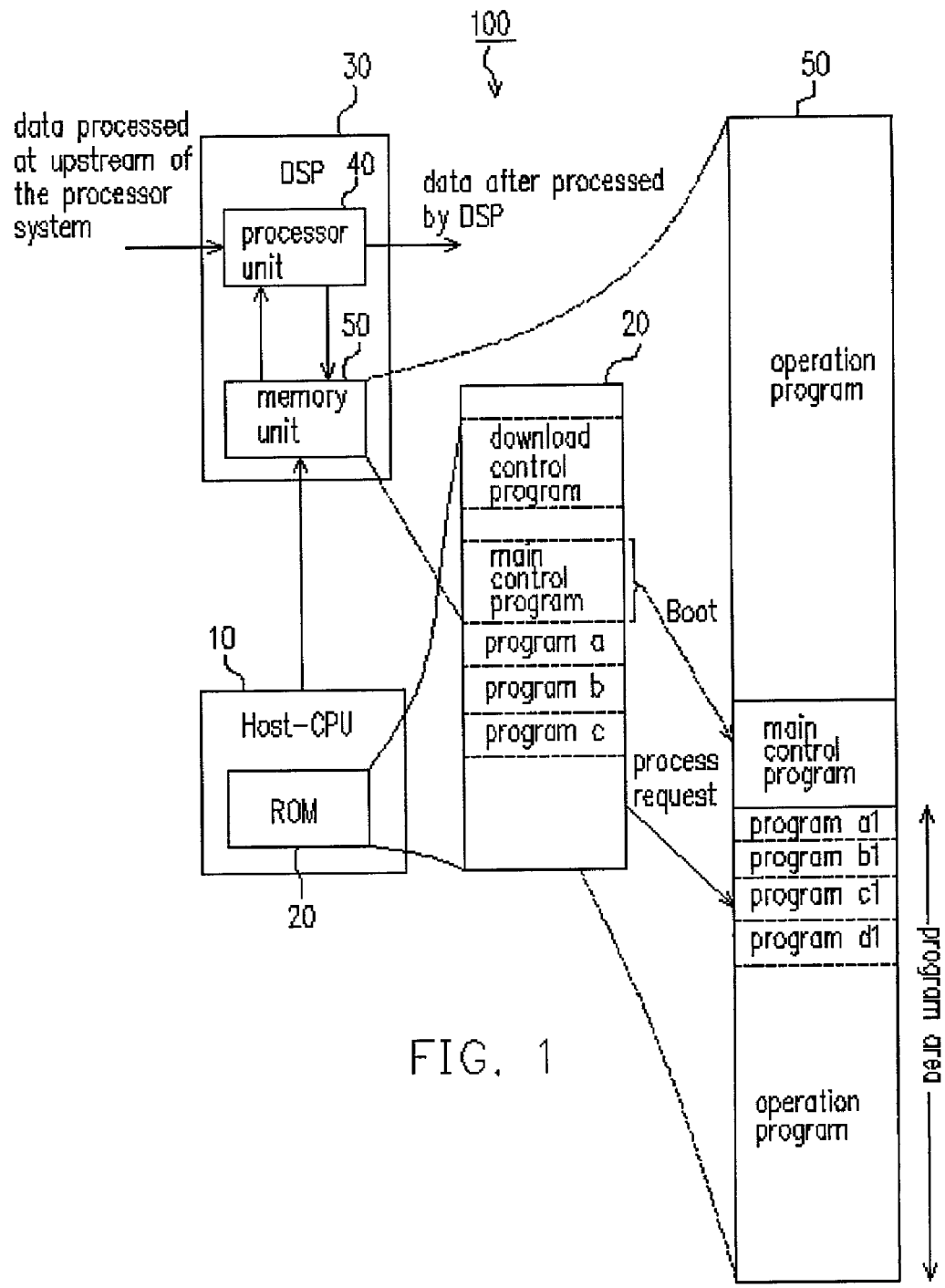
FIG. 1 is an exemplary structure of the processor system suitable for the processor processing method according to the first embodiment.

FIG. 1 schematically shows an exemplary structure of a processor system suitable for a processor processing method according to the first embodiment of the invention. The processor system 100 comprises a CPU 10, a ROM 20 coupled to the CPU 10, and a DSP 30 having a memory unit 50 for storing programs and a processor unit 40 for processing data according to the programs. In addition, for convenience, the CPU 10 can be referred to as a host CPU 10. In FIG. 1, the ROM 20 is configured to reside within the CPU 10, but it is not a limitation, i.e., the ROM 20 can be configured to connect to the CPU 10. At this time, considering the efficiency of program transfer, the ROM has preferably a structure capable of transferring its stored information at a high speed under the control of the CPU 10.

The ROM 20 stores programs and parameters required for processing the programs. For example, the ROM 20 stores plural types of programs for the download control to the DSP 30 (information for controlling the download) or programs downloaded to the DSP 30. The memory unit 50 stores the initial program (the main control program) for the DSP once, which is transferred from the ROM 20 when the power is turned on. Thereafter, the memory unit 50 stores the required programs and the required parameters that are transferred by the same manner. The download of the required programs etc can be performed during the boot process when the power is turned on, or after the reset command is finished, or when receiving a process request at any time.

The DSP 30 consists of the memory unit 50 for storing programs to determine the operations of the processor, and the processor unit 40 for performing the actual signal input, process and output. Processes are performed according to the programs downloaded to the memory unit 50. As shown in FIG. 1, the memory unit 50 consists of a control area for use of the DSP 30 itself and a program area for storing programs transmitted from the host CPU 10.

Figure 2:
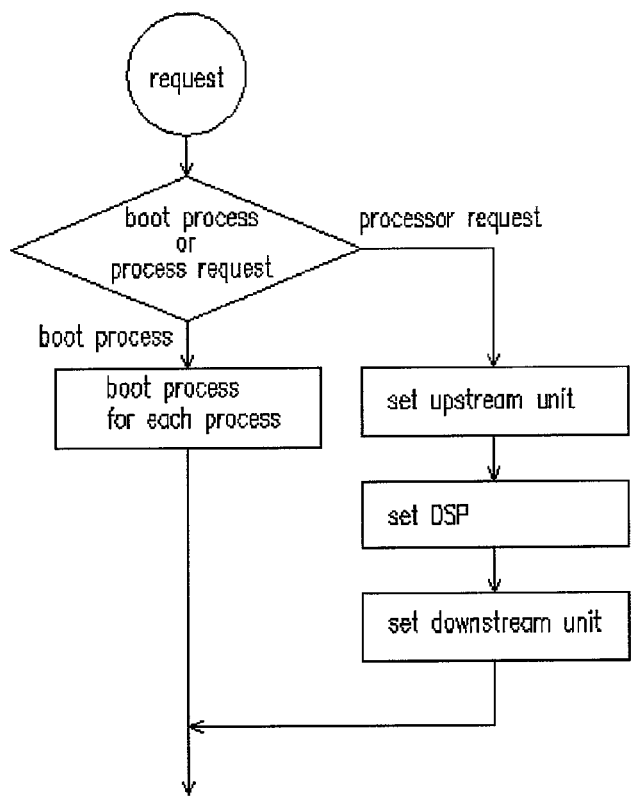
FIG. 2 is a flow chart for describing the download of the required programs in the DSP process according to the first embodiment.

Next, the flow for downloading the programs from the CPU 10 to the memory unit 50 is described. FIG. 2 is a flow chart for describing the downloading of programs required in the DSP processes. First, when the request is a boot, i.e., a download request after power on or reset, the CPU 10 performs a control to initiate the control area of the memory unit 50 in the DSP 30. Next, the CPU 10 performs a control to download the main control program to the program area of the memory unit 50.

The main control program serves as the core operation of the DSP 30, and is an unchangeable portion that is independent of the contents of the following process requests. Namely, the main control program is used for controlling general operations of the DSP 30. The main control program is downloaded to the DSP only once when the boot process is done, and is not required to be downloaded again thereafter. In addition, if it is not necessary to redesign the boot process, the main control program can be also written into the DSP 30.

When the request to the DSP 30 is a process request, the flow at the right side of FIG. 2 is selected. In this situation, the peripherals such as the upstream process unit 11 and the downstream process unit 12 are set, and the parameters and the programs required for the data process are downloaded to the memory unit 50 of the DSP 30. When downloading, because the program stored in the ROM 20 is directly instructed to perform the setting request, the process request can be of different types. In addition, because the main control program has been downloaded, the processor system 100 needs only to download the different portion each time when there is a process request.

Figure 3:
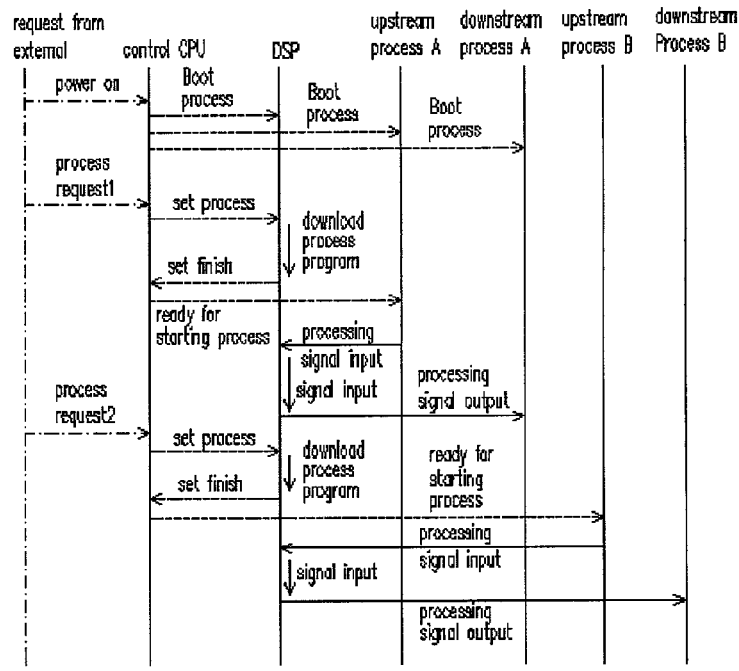
FIG. 3 shows an exemplary sequence of the processor system according to the first embodiment.

FIG. 3 shows an exemplary sequence of the processor system. When the power is turned on or the reset operation is finished, a start request is informed to the CPU 10 from the external of the processor system. As the CPU receives the start request, a boot process is performed to all components required to be acknowledged (all connected components), including the DSP 30. At this time, the DSP 20 initiates the control area of the memory unit 50 in the DSP 30, the main control program is input from the ROM 20 and then stored in the program area of the memory unit 50.

Thereafter, as the CPU 10 receives the process request 1 from the system processor external 100, the CPU 10 refers to the ROM 20 in the CPU 10 so that the program corresponding to the process request 1 is downloaded to the program area where it is located in the memory unit 50 of the DSP 30 and serves as an operational program. After finishing the download, the DSP 30 is in a standby mode and sends a setting finish response to the CPU 10. The CPU 10 then acknowledges to the upstream process unit 11 that it is ready to start the process request 1. The upstream process 11 outputs processing signals (data that should be processed by the DSP) any time, and the DSP 31 processes the received signals and then sends them to the downstream unit 12.

As shown in the drawing, after processing the process request 1, the process request 2 from the external of the process system 100 is acknowledged. The CPU 10 refers the ROM 20 in the CPU 10 so that the program corresponding to the process request 2 is downloaded to an area other than the main control program and serves as an operational program. Afterwards, a setting finish response from the DSP 30 is returned to the CPU 10. The CPU acknowledges to the upstream process unit 30 that it is ready for starting the process, and the processing signals from the upstream process unit 10 are input to the DSP 30, at which point the process is performed by the DSP 30.

In the above descriptive example, the programs for the respective process request 1 and process request 2 are downloaded. However, because the main control program is downloaded at the beginning and not changed, only the processing programs are selected and downloaded. Therefore, the whole processor system 100 can reduce its processing time. In addition, the process types can also be enriched. In particular, by changing the ROM 10 coupled to the CPU 10, the process content types are increased, program bugs can be fixed, and the applications of the processor system is enlarged.

<<Second Embodiment>>

Following is a description of a processor processing method according to the second embodiment of the invention. In the second embodiment, there are no particular limitations. The same numerals are labeled to the same elements as in the first embodiment, and their corresponding descriptions are omitted.

Figure 4:
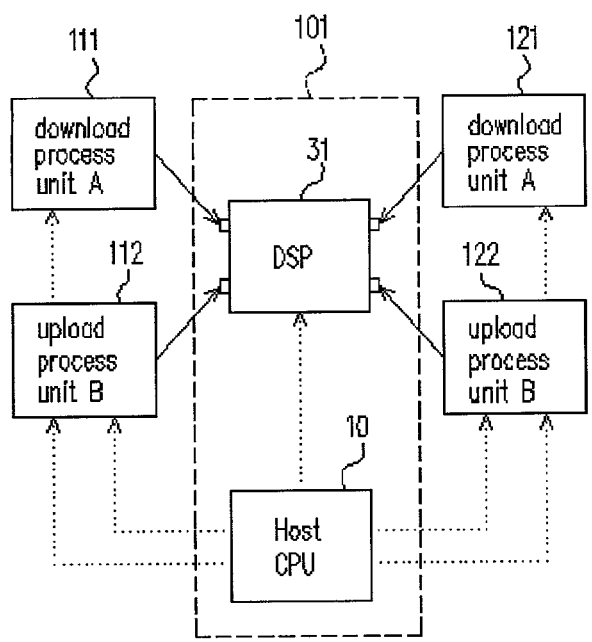
FIG. 4 shows an exemplary structure of the processor system suitable for the processor processing method according to the second embodiment.

FIG. 4 schematically shows an exemplary processor system suitable for the processor processing method of the second embodiment. When data is processed, the host CPU (CPU) 10 performs necessary settings to an upstream process unit A 111, an upstream process unit B 112, a downstream process unit A 121 and a downstream process unit B 122. In addition, the CPU 10 also performs a download control for the necessary programs according to a process request from the system processor external.

The upstream process unit A 111 and the upstream process unit B 112 receive settings from the CPU 10, and then perform required operations to output signals (data that should be processed by the DSP 31) to the DSP 31 when there is a processing request. The downstream process unit A 121 and/or the downstream process unit B 122 receive settings from the CPU 10. Additionally, process finish signals output from the CPU 31 are input to downstream process unit A 121 and/or the downstream process unit B 122, at which required operations are performed accordingly.

The DSP 31 inputs programs and parameters required for download according to the control of the CPU 10, and receives signals from the upstream process unit A 111 and/or the upstream process unit B 112 to perform signal processes according to the downloaded programs. Afterwards, the processed signals are output to the downstream process unit A 121 and/or the downstream process unit B 122.

Figure 5:
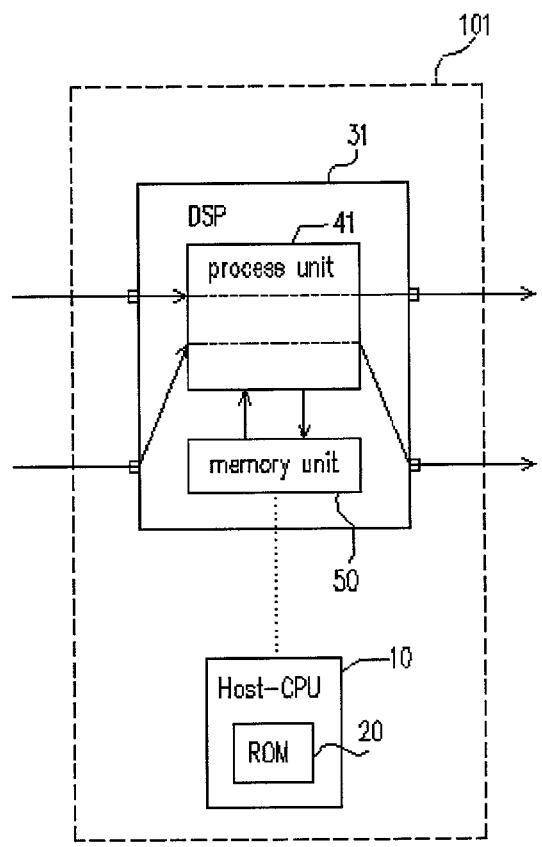
FIG. 5 shows an exemplary system configuration of the processor system suitable for the processor processing method according to the second embodiment.

FIG. 5 schematically shows an exemplary block diagram of the processor system suitable for the processor processing method of the second embodiment. The processor system 101 comprises the CPU 10 and the DSP 31. The CPU 10 has a ROM 20 inside the CPU 10 for storing the control programs. In the ROM 20, programs to be downloaded to the DSP 31 are stored. The DSP 31 is composed of a processor unit having two-system interfaces for inputs and outputs of signal processes. The inputs and the outputs are not synchronous and data can be input or output randomly.

Figure 6:
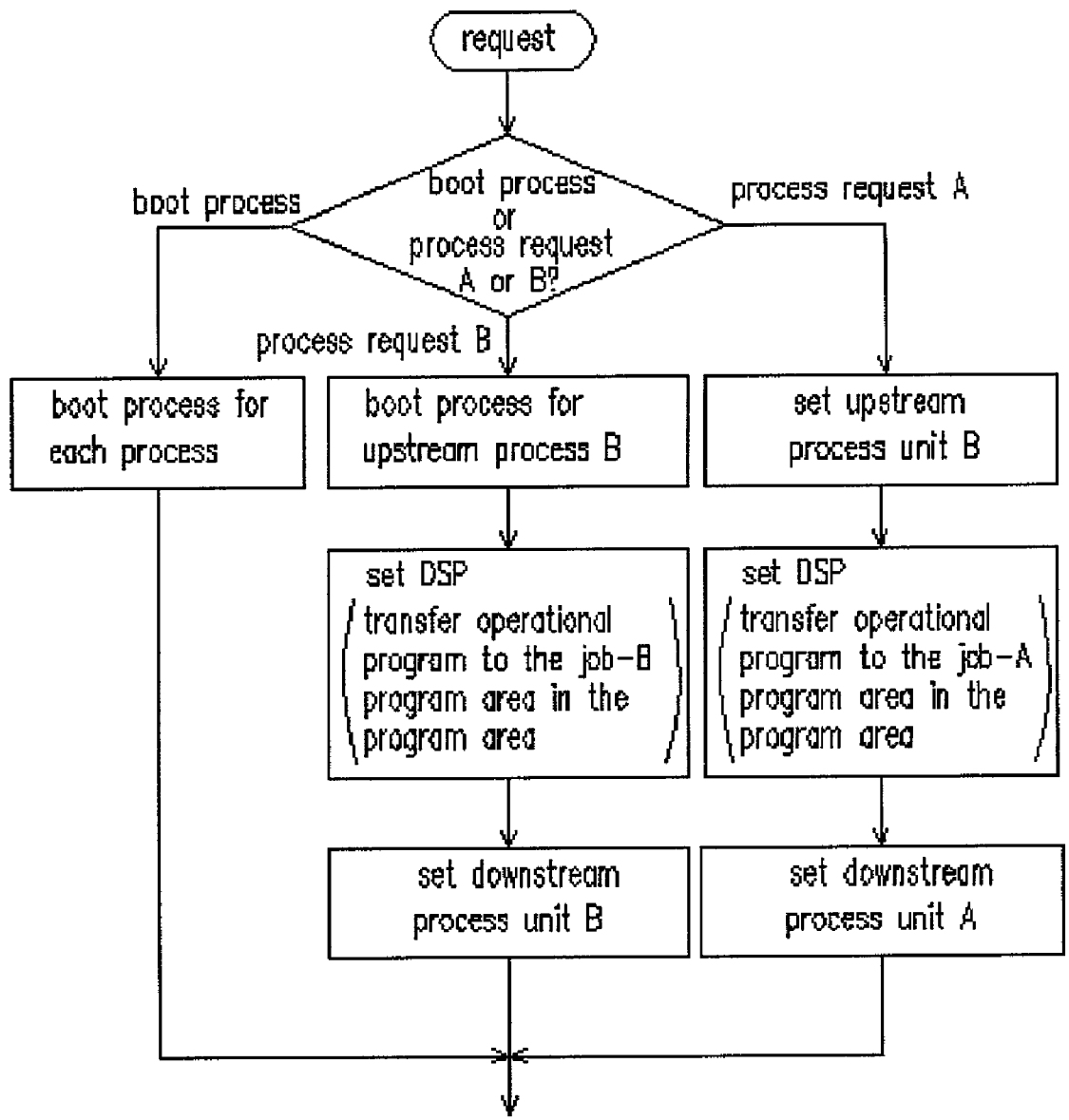
FIG. 6 is a flow chart for describing the download of the required programs in the DSP process according to the second embodiment.

FIG. 6 is a flow chart for describing the download of required programs for the DSP processes. First, when the request is a boot process, i.e., a download request when the power is on or after the reset operation, the CPU 10 performs a control to initiate the control area of the memory unit 50 in the DSP 31. Next, the main control program is downloaded to the program area of the memory unit 50.

The main control program serves as the core operation of the DSP 31, and is an unchangeable portion that is independent of the contents of the following process requests. Namely, the main control program is used for controlling general operations of the DSP 31. The main control program is downloaded to the DSP only once when the boot process is done, and is not required to be downloaded again thereafter. In addition, if it is not necessary to redesign the boot process, the main control program can be also written into the DSP 31.

When the request to the DSP 31 is a process request A, the flow at the right side of FIG. 6 is selected. The peripherals, such as the upstream process unit A 111 and/or the upstream process unit B 112, are set and the parameters and the programs required for the data processes are downloaded to the memory unit 50 in the DSP 31. When downloading, the program stored in the ROM 20 with respect to the process request A is assigned, and then is downloaded to an area allocated as a Job-A program area in the program area of the memory unit 50.

Figure 7:
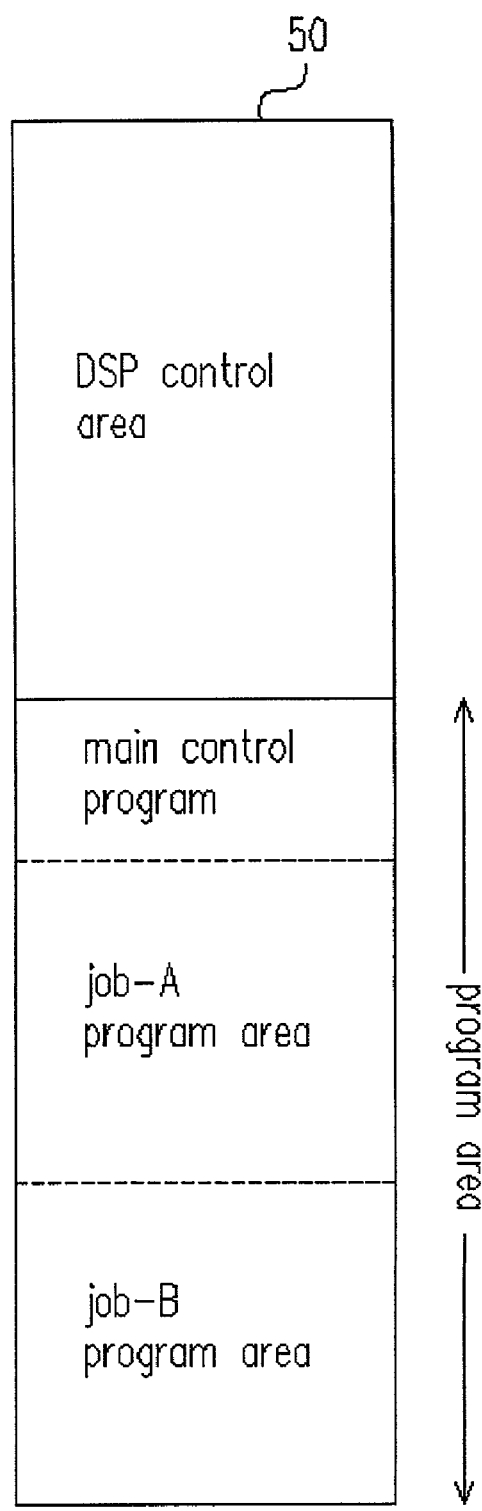
FIG. 7 shows an exemplary arrangement where the programs with respect to the process request A and the process request B are allocated to the memory unit 50 of the DSP 31.

On the other hand, when the request to the DSP 31 is a process request B, operations similar to the process request A are performed. However, the program is downloaded to an area allocated as a Job-B program area in the program area of the memory unit 50. FIG. 7 shows an exemplary arrangement where the programs with respect to the process request A and the process request B are allocated to the memory unit 50 of the DSP 31

Figure 8:
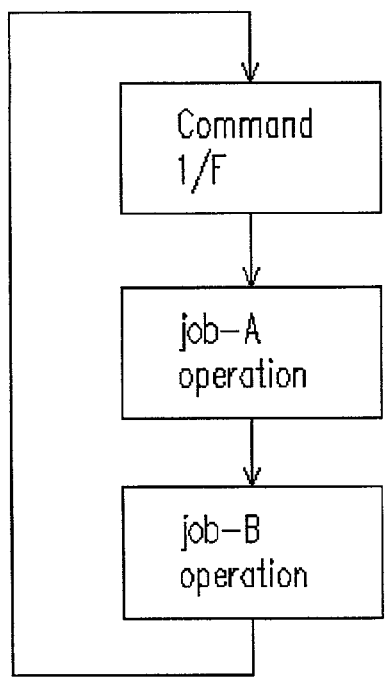
FIG. 8 is a flow chart showing the operational concept of the main control program according to the second embodiment.

FIG. 8 is a flow chart showing the operational concept of the main control program according to the second embodiment. The relationship between two signal processing programs downloaded to the program area and the processes with respect to the assignment of the CPU is shown in a temporal sequence. For example, if the DSP 31 is a SIMD type, and in comparison with the I/O (input/output) signal speed of the external of the processor unit 41, the internal signal processing speed is very fast, the processing time inside the processor unit 41 can be saved. Therefore, because a plurality of jobs is operated in a temporal sequence, a plurality of inputs and outputs from the external can be parallel processed.

Figure 9:
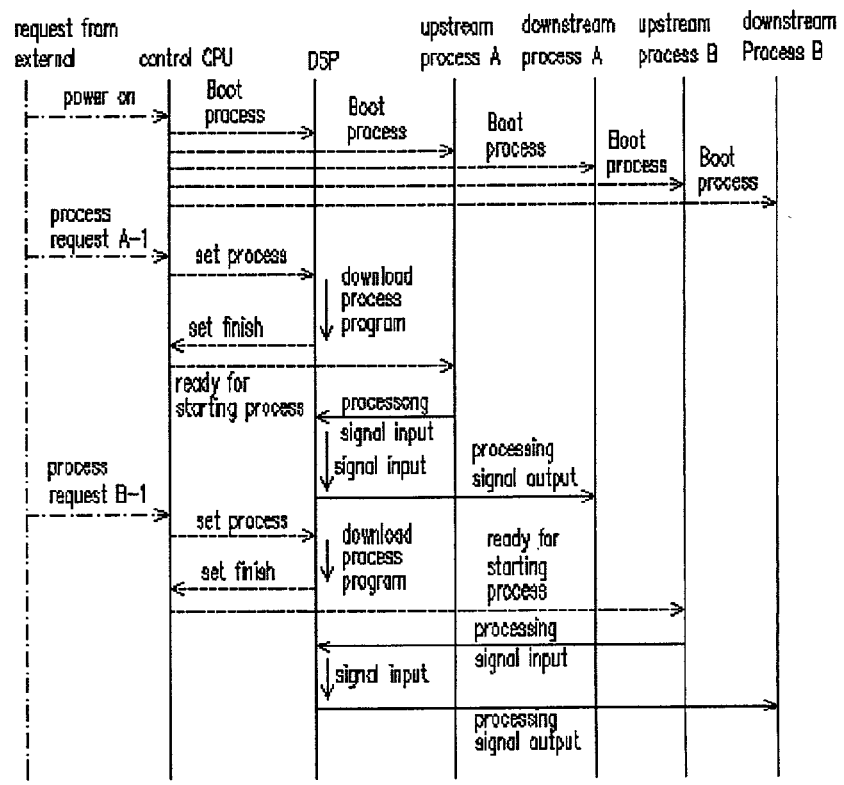
FIG. 9 is an exemplary sequence for the processor system 101.

FIG. 9 is an exemplary sequence for the processor system 101. The CPU 10 is acknowledged of the start request from the external, which serves as a setting when the system starts (when the power is turned on or after the reset is finished). As the CPU 10 receives the start request, the CPU 10 performs boot processes to all components that are required to be acknowledged. At this time, the DSP 31 initiates the control area of the memory unit 50 in the DSP 31, the main control program is input from the ROM 20 and then it is stored in the program area of the memory unit 50.

Afterwards, as the CPU 10 receives the process request A-1 from the system processor external, the CPU 10 refers to the ROM 20 in the CPU 10 so that the program corresponding to the process request A-1 is downloaded to the Job-A program area located in the memory unit 50 of the DSP 31 to serve as an operational program. After finishing the download, the DSP 31 is in a standby mode and sends a setting finish response to the CPU 10. The CPU 10 then acknowledges the upstream process unit A 111 that it is ready to start the process request A-1. The upstream process A 111 outputs processing signals (data that should be processed by the DSP) any time, and the DSP 31 processes the received signals and then sends them to the downstream unit A 121.

As shown, after all processes corresponding to the process request A-1 are finished, the process request B-1 from external is acknowledged. As the process request B-1 is acknowledged, the CPU 10 refers to the ROM 20 in the CPU 10 so that the program corresponding to the process request B-1 is downloaded to the Job-B program area located in the memory unit 50 of the DSP 31 to serve as an operational program. Afterwards, similar to the description of the process request A-1, the DSP 31 sends a setting finish response to the CPU 10, and then the CPU 10 acknowledges the upstream process unit B 112 that the process is ready to start. Processing signals are input to the DSP 31 from the upstream process B 112, and then processed by the DSP 31.

Figure 10:
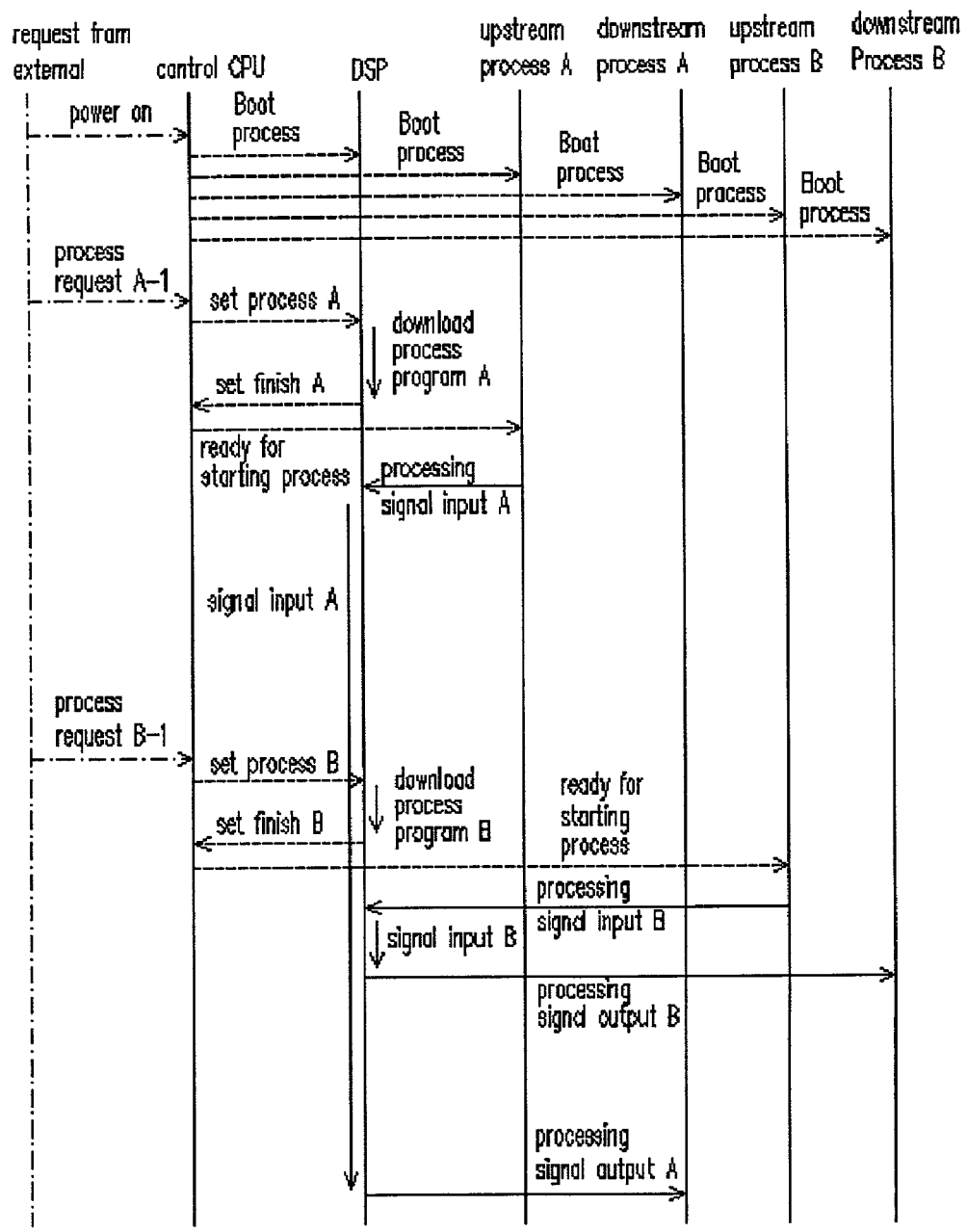
FIG. 10 is an exemplary sequence that the processor system performs non-synchronous signal processes.

Namely, because the storage locations in the memory unit 50 for the Job-A and the Job-B are different and the actual processing timing is also non-synchronous, the signal processes and the input/output processes for the system A and the system B can be performed in a non-synchronous manner. FIG. 10 is an exemplary sequence where the processor system performs non-synchronous signal processes.

FIG. 10 shows the sequence when the process request A-1 and the process request B-1 are acknowledged. In this situation, because the process request A-1 finishes the command I/F as shown in FIG. 8 and moves to the signal processes, the programs of Job-B can be downloaded to the DSP 31 according to the instruction of the process request B-1. Additionally, afterwards, the signal process A and the signal process B can be parallel executed by time sharing.

As the foregoing descriptions show, the programs are downloaded for the process request A and the process request B, respectively. However, because the DSP 31 has a plurality of input/output interfaces for different systems and the process request A and the process request B can be independently processed according to the main control program, plural types of processes can be parallel performed by the DSP 31.

<<Third Embodiment>>

The next description is a processor processing method according to the third embodiment of the invention. In the third embodiment, there are no particular limitations. The same numerals are labeled to the same elements as in the first and the second embodiments, and their corresponding descriptions are omitted.

Figure 11:
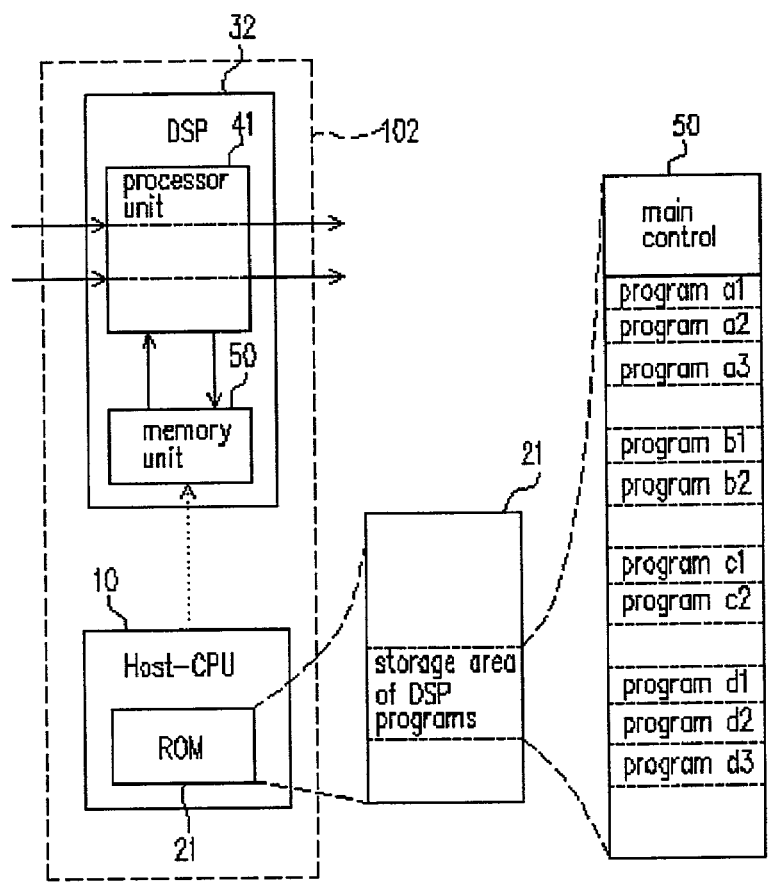
FIG. 11 schematically shows an exemplary structure of a processor system suitable for the processor processing method of the third embodiment.

FIG. 11 schematically shows an exemplary structure of a processor system suitable for the processor processing method of the third embodiment. FIG. 11 shows an exemplary configuration of the DSP 32 and the CPU 10 for selecting program components according to an abstract process request. In the third embodiment, the programs stored in the ROM 21 inside the host CPU 10 are not based on the process requests, but are managed as a collection of components for each process in detail. Namely, according to the third embodiment, the process request does not one-by-one correspond to the operation program. To process the process requests, several programs can be combined to implement a process.

Figure 12:
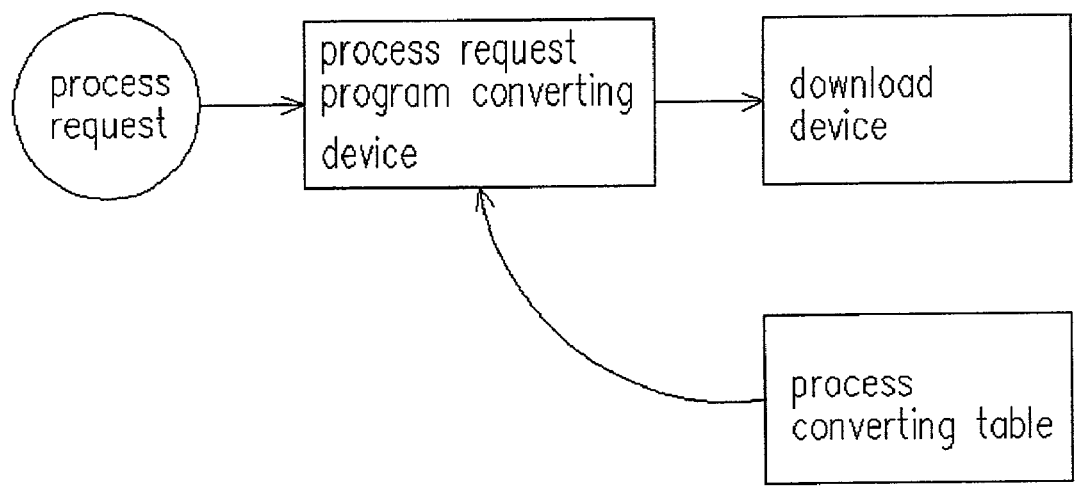
FIG. 12 shows an example of a method for determining the combination of required programs in order to suffice the process request.

FIG. 12 shows an example of a method for determining the combination of required programs in order to process the process request. First, when a process request is acknowledged, the CPU 10 refers to a process converting table in a process request converting device, and then determines the program combination and the parameters, which should be downloaded to the DSP 32, according to the process request (an abstract request).

The determined information of the program combination is transmitted to the download device so that the programs and the parameters are downloaded to a program area corresponding to the job in the memory unit 50 of the DSP 32. FIG. 13 shows an example of the process converting table. The process converting table shows when the job type is input as a process request. In a situation that the DSP 32 is an audio processing IC, the job type, for example, can have functional requests, such as clearing the muddy sound or coordinating the bass and the treble. Alternatively, when the DSP is an image processing IC, the job type can have functional requests, such as making the pattern beautiful, thickening the text, and thinning the line beautifully.

In the process converting table shown in FIG. 13, the request type is represented by an index that is written to a program combination dividing a large request category (the job type). For example, a variety of program combinations can be used, such as the dither process, the γ process, the process using a smoothing filter etc. In fact, the user, who uses a machine applying the processor system 102, can make an abstract request, and does not have to be aware of every combination of the internal processes. By this manner, the abstract requests can be managed as the program combinations.

According to the above example, by using the process converting table, it does not have to determine which program is to process the process request and therefore the loading of the CPU can be reduced. In addition, even if the complicated program combination is required, the CPU can still transmit to the DSP at a high speed. In addition, by storing the process converting table in the ROM 21, certain elements with possibility to alter the design can be included, and the design of the processor system can become more easy.

<<Fourth Embodiment>>

The next description is a processor processing method according to the fourth embodiment of the invention. In the fourth embodiment, the same numerals are labeled to the same elements as in the first, the second and the third embodiments, and their corresponding descriptions are omitted.

In the following embodiments, the initial operation and the fixed/changed portion of each process request are separated, and therefore the download loading for each process request can be reduced. Namely, a processor processing method is described, which corresponds to the parallel operation and the process request level of plural types, the use of the memory area of the DSP can be optimized, and the downloading time can be reduced.

Figure 14:
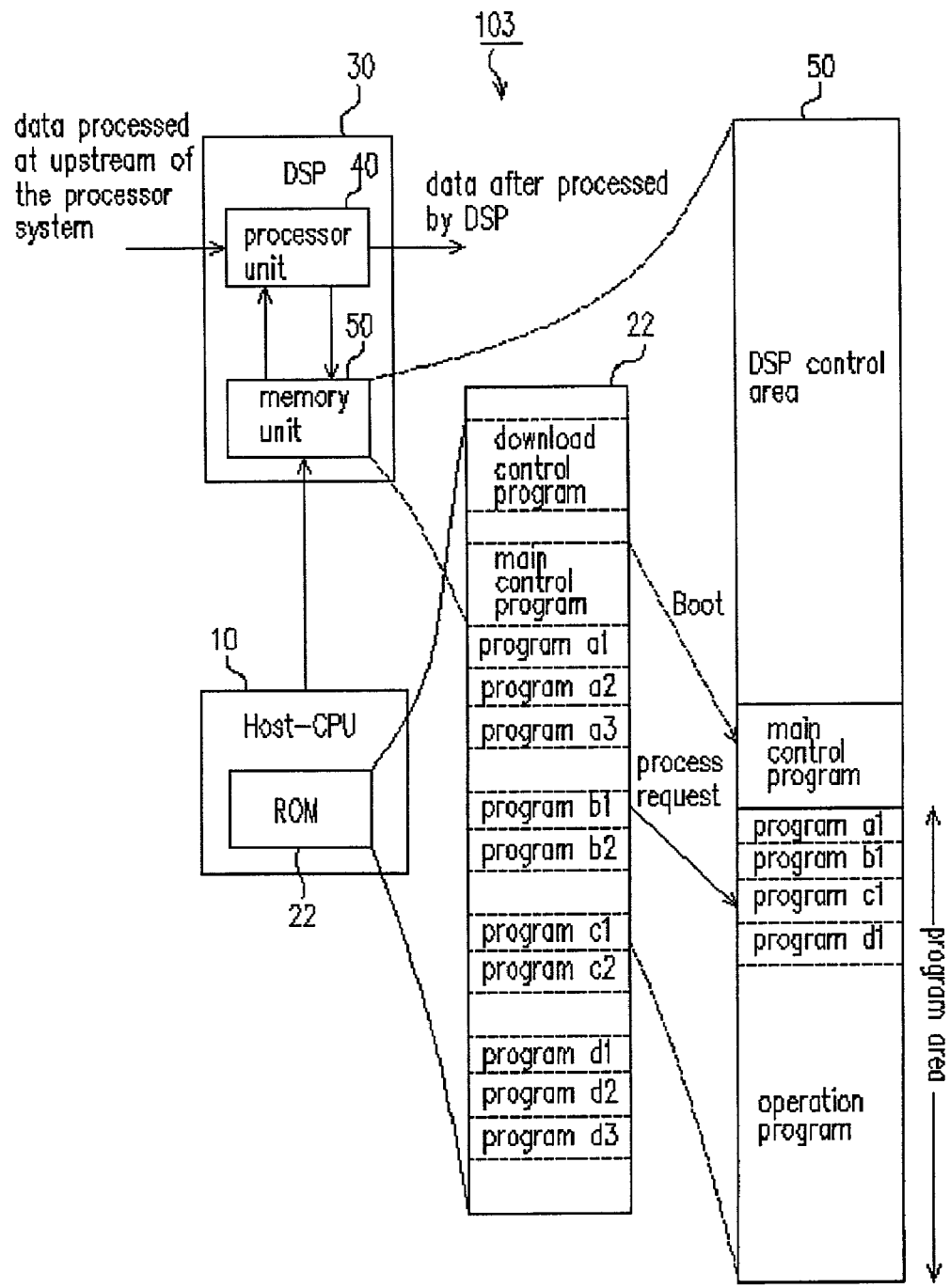
FIG. 14 schematically shows an exemplary structure of a processor system suitable for the processor processing method of the fourth embodiment.

FIG. 14 schematically shows an exemplary structure of a processor system suitable for the processor processing method of the fourth embodiment. The processor system 103 comprises a CPU 10, a ROM 22 connected to the CPU 10, and a DSP 30 having a memory unit 50 for storing programs and a processor unit 40 for processing data according to the programs.

The ROM 22 stores a plurality of programs and a plurality of parameters for processing the programs. For example, the ROM 22 stores plural types of download control programs for the DSP 30 and plural types of programs downloaded to the DSP 30. As shown in FIG. 14, these programs, for example, are small programs such as the dynamic link library (DLL), and plural programs are combined to process the process request. In the drawing, the program type is distinguished by labeling the alphabet a, b, c, . . . etc.

The CPU 10 performs the download control to the DSP 30 at the time when executing the boot process during power-on, or after executing the reset command. However, the processor system 103 can be configured to receive the process request randomly.

The DSP 30 consists of a processor unit 40 for actually performing the signal input, the signal process, the signal output, and a memory unit 50 for storing programs that determine the operations of the processor. According to the programs downloaded to the memory unit 50, the process is performed. As shown, the memory unit 50 consists of a control area for use by the DSP 30 itself, and a program area for storing programs sent from the CPU 10.

Figures 15, 16:
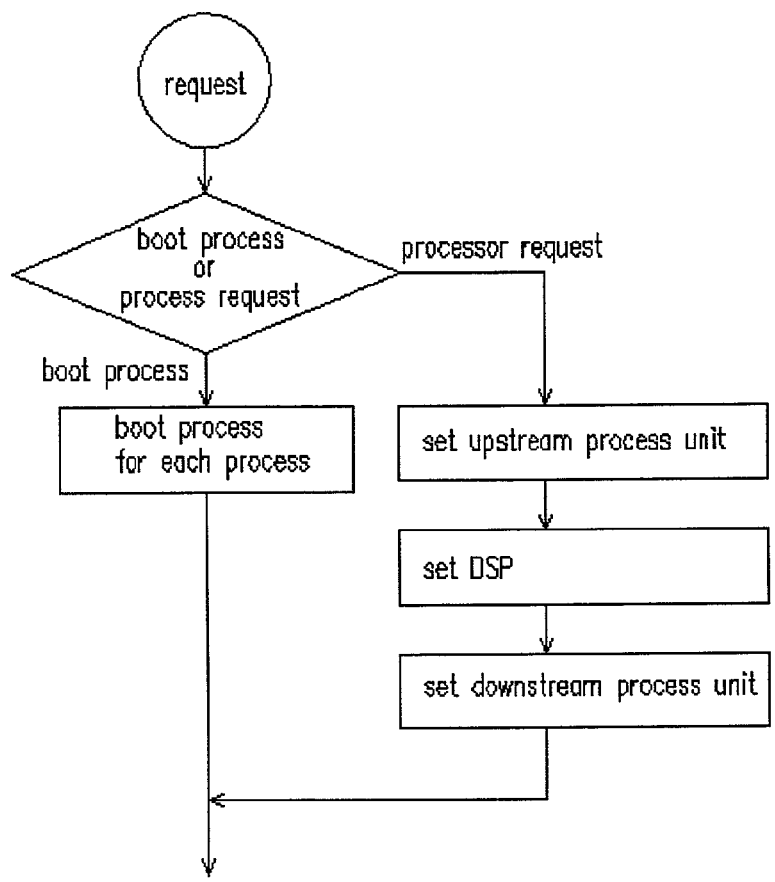
FIG. 15 is a flow chart for showing the flow for downloading the programs required for the DSP process.
FIG. 16 is a diagram for describing that the CPU divides the process request by the programs stored in the ROM of the CPU, and determines which program combination is to be downloaded.

Following is a description about the flow for downloading the programs to the memory unit 50 from the CPU 10. FIG. 15 is a flow chart showing the flow for downloading the programs required for the DSP process. First, when the request is a boot process, i.e., a download request during power on or after reset operation, the CPU 10 initiates the control area of the memory unit 50 of the DSP 30. Additionally, the main control program is downloaded to the program area.

The main control program serves as the core operations of the DSP 30, and is an unchangeable portion that is independent of the contents of the following process requests. The main control program is downloaded to the DSP only once when the boot process is done etc, and is not required to be downloaded again thereafter.

When the request to the processor system 103 is a process request, the flow at the right side of FIG. 15 is selected. The peripherals, such as the upstream process unit and the downstream process unit, are set and the parameters and the programs required for the data processes are downloaded to the memory unit 50 in the DSP 30. As shown in FIG. 16, the CPU 10 divides the process request into program units (programs a1~a3, b1~b3, c1~c3, d1~d3, etc) stored in the ROM 22 of the CPU 10, and the determines which program combination is to be downloaded.

The processor system 103 downloads the programs to locations which are empty in the program area of the memory unit 50. Namely, the programs are downloaded in sequence to the addresses behind the main control program.

Figure 17:
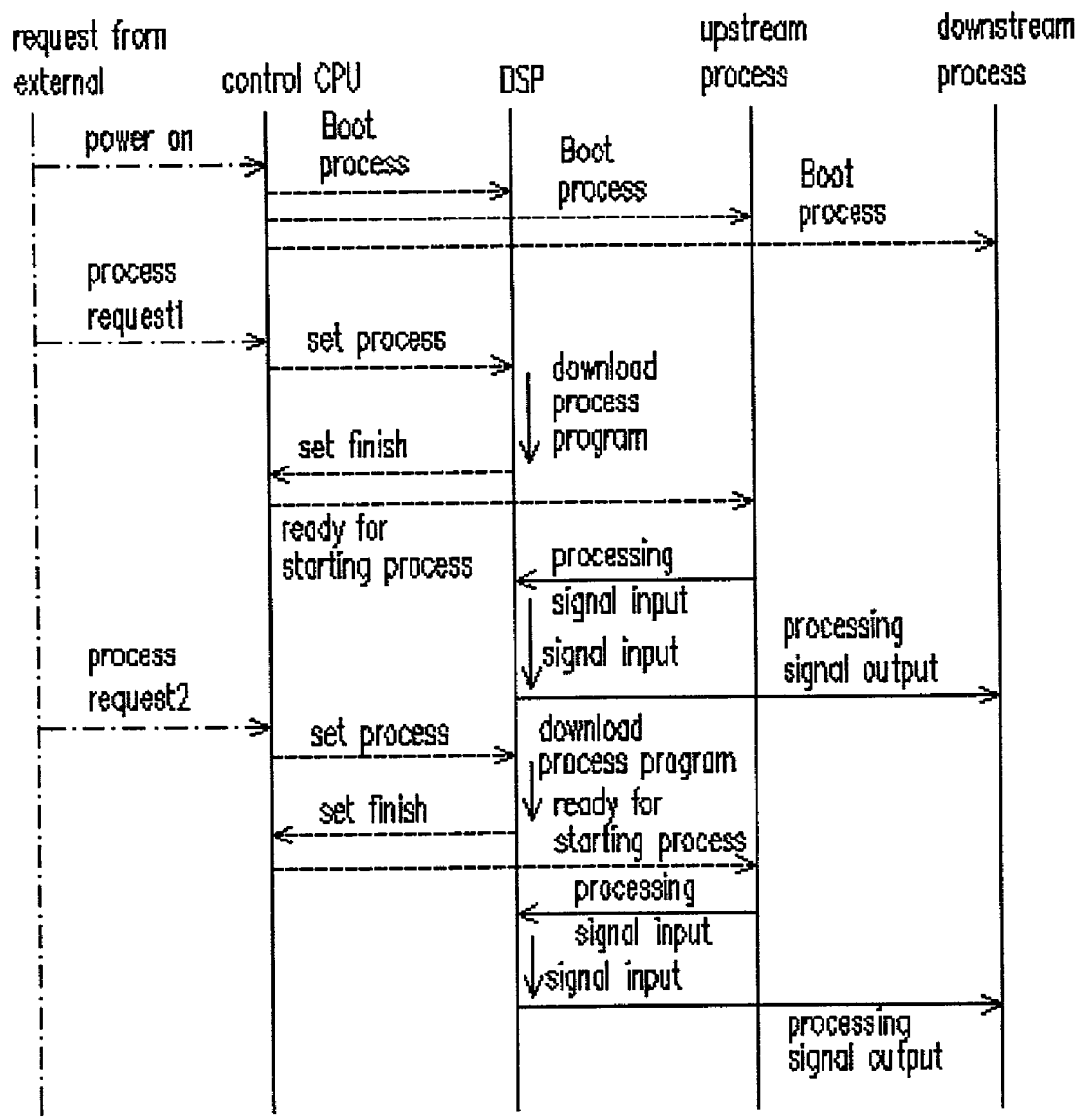
FIG. 17 is a diagram for showing the operational sequence of the processor system 103.

FIG. 17 is a diagram showing the operational sequence of the processor system 103. When the power is turned on or the reset operation is finished, a start request is informed to the CPU 10 from the system processor external. As the CPU receives the start request, a boot process is performed to all components required to be acknowledged (all connected components), including the DSP 30. At this time, the DSP 30 initiates the control area of the memory unit 50 and downloads the main control program stored in the ROM 22 to the program area of the memory unit 50.

Afterwards, as the CPU 10 receives a process request 1 from the external of the processor system 103, the CPU 10 refers to the ROM 22 in the CPU 10 so that the program corresponding to the process request 1 is downloaded to an area, other than the area of the main control program, of the program area located in the memory unit 50 of the DSP 31 and serves as an operational program. At this time, as shown in FIG. 16, plural programs corresponding to the process request are combined as a group and downloaded. After finishing the download, the DSP 30 is in a standby mode and replies with a setting finish response to the CPU 10. The CPU 10 is then acknowledges being ready for starting the process.

The upstream process unit 11 transmits processing signals to the DSP 30 at any time. The DSP 30 receives and processes the signals, and then transmits the processed signals to the downstream process unit 12. Thereafter, as all processes are finished and a process request 2 from the external are acknowledged, the CPU 10 refers the ROM 22 in the CPU 10 so that the program corresponding to the process request 2 is downloaded to an area, other than the area of the main control program, of the program area located in the memory unit 50 of the DSP 31 and serves as an operational program.

Then, the DSP 30 replies with a massage of setting finish to the CPU 10. The CPU 10 acknowledges the upstream process unit 11 of its being ready for starting the process. Thereafter, the processing signals are input from the upstream process unit 11 to the DSP 30, and processed by the DSP 30. At this time, regarding the different downloads for the respective process requests 1 and 2, because the main control program is downloaded at the beginning and is unchangeable, only the different processing programs are selected for each process request and then downloaded.

<<Fifth Embodiment>>

The next description is a processor processing method according to the fifth embodiment of the invention. In the fifth embodiment, the same numerals are labeled to the same elements as in the first through the fourth embodiments, and their corresponding descriptions are omitted.

Figure 18:
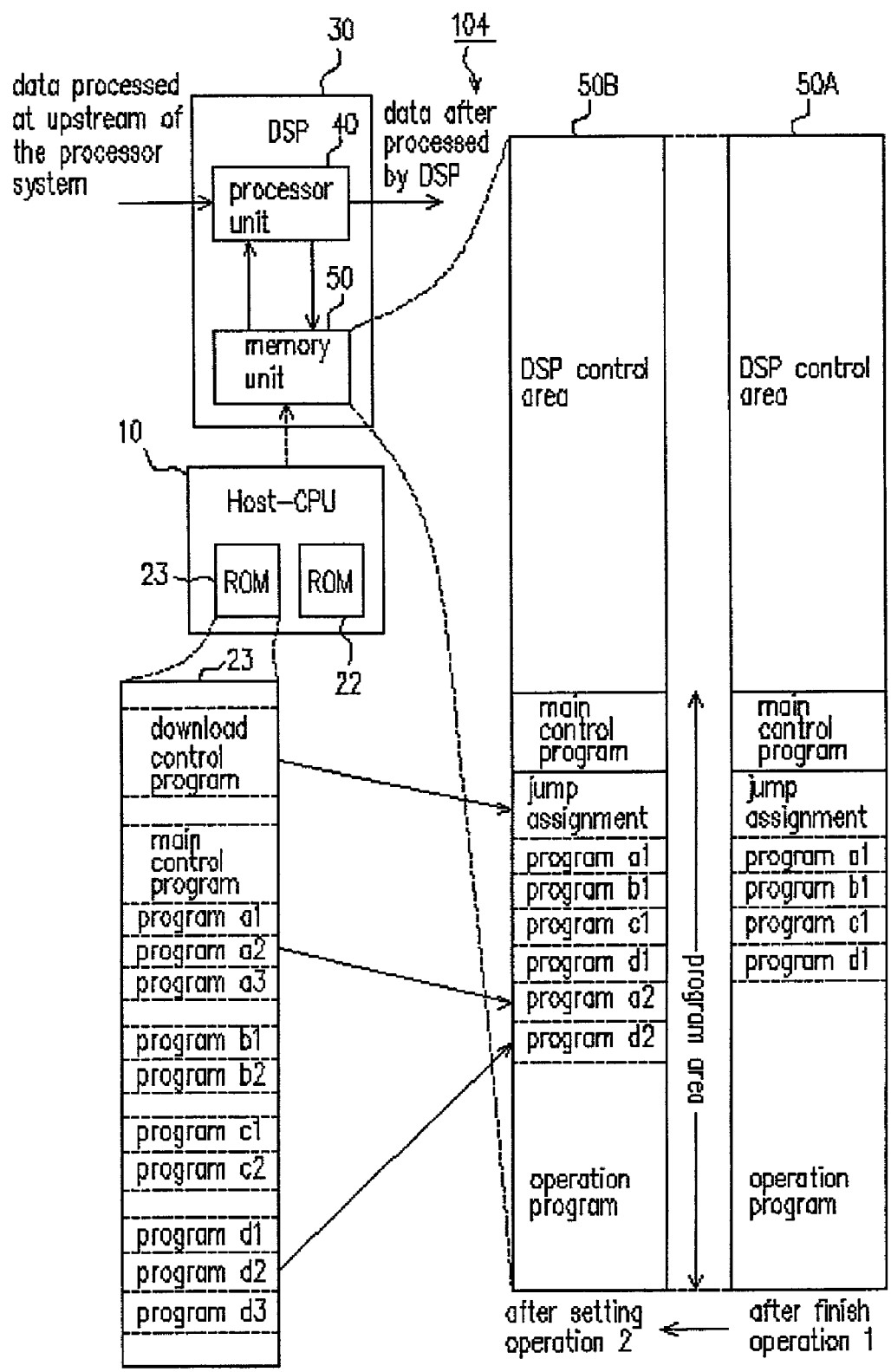
FIG. 18 shows an exemplary structure of a processor system suitable for the processor processing method of the fifth embodiment.

FIG. 18 shows an exemplary structure of a processor system suitable for the processor processing method of the fifth embodiment. The processor system 104 comprises a CPU 10, a ROM 23 connected to the CPU 10, and a DSP 30 having a memory unit 50 for storing programs and a processor unit 40 for processing data according to the programs.

FIG. 18 shows a content change of the memory unit 50 when a new process request is created after finishing the settings of the DSP shown in FIG. 14. For example, from the time point when the settings corresponding to the process request 1 shown in FIG. 17 have been finished, FIG. 18 shows an example of performing settings corresponding to a next process request. To simplify the description, item 50A is used for representing the content of the memory unit 50 at a time point when the download of the programs corresponding to the process request 1 has been finished, and item 50B is used for representing the content of the memory unit 50 at a time point when the download of the programs corresponding to the next process request has been finished.

At the beginning, regarding the download of the programs concerning the process request 1, the DSP 30 informs the CPU 10 of a message that the settings are finished. Next, the CPU 10 acknowledges the upstream process unit 11 that it is ready to start the process. The upstream process unit 11 inputs the processing signals to the DSP 30, and the processing signals are processed by the DSP 30 according to the settings corresponding to the process request 1.

In this case, according to the download control program in the CPU 10, the program locations are assigned so that which program at the specified location of the program area will be performed in what kind of sequence can be determined. For example, information, such as the address information or the program names, is written to a "jump assignment" area in the program area of the memory unit 50. The main control program can then perform those programs in the program area that are to be processed according to what kind of sequence is indicated.

After the processes of the operation 1 are finished, the CPU 10 keeps the download status of the programs corresponding to the process request 1 in the RAM 22 within the CPU 10. Next, at the time point when the next process request 2 is requested, the CPU 10 compares the difference from the past, i.e., the process request 1. For example, when the process request 2 is a program combination of the request 2 shown in FIG. 16, the programs b1 and c1 that have been downloaded before are reused. Namely, at present, the programs b1 and c1 are not downloaded and only programs a2 and d2 are downloaded.

At this time, the CPU 10 transmits the control information having a processing sequence of a2→b1→c1→d2 to the jump assignment area. The difference between the programs is managed to effectively utilize the memory unit 50.

Figure 19:
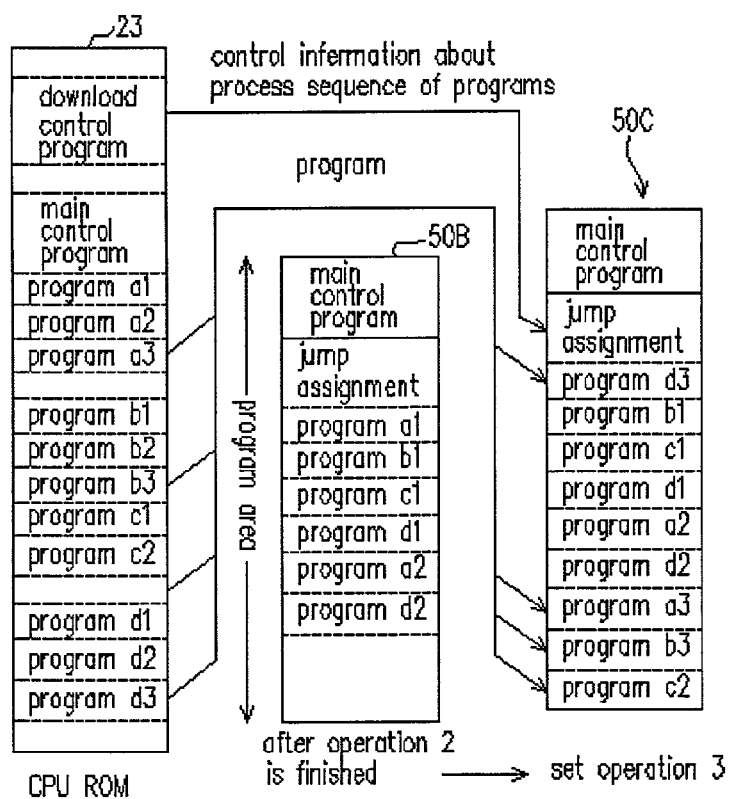
FIG. 19 shows an example that the program group corresponding to the process request 3 shown in FIG. 16 is stored next to the process request 2.

In addition, the different programs are written to the memory unit 50 in sequence based on the address sequence, and therefore, the program area will soon be filled, and thereby it is possible that the program area becomes full. The download is now described when the empty program area is not enough. FIG. 19 shows an example where the program group corresponding to the process request 3 shown in FIG. 16 is stored next to the process request 2. In addition, for convenience, item 50C represents the content of the memory unit 50 at the time point when the program download corresponding to the process request 3 is finished.

Similar to the above description, because the content of the process request 3 is a3→b3→c2→d3, the CPU 10 finds the empty areas in the memory unit 50 to which the different programs are written. At this time, at the time point when writing the programs a3, b3, c2, the memory area is filled. The CPU 10 download overwrites the requested programs (program d3 in this case) to the areas where programs have been downloaded before but that are not necessary for the process request 3. In addition, the CPU 10 finishes settings in the area of jumping assignment for indicating the program sequence corresponding to the process request 3.

As described above, because the different programs are downloaded to form a program group that satisfies the process request on demand, the download time can be reduced. In addition, because the CPU 10 transmits the processing sequence of the programs to the memory unit 50, the process will not be disturbed.

<<Sixth Embodiment>>

Next description is a processor processing method according to the sixth embodiment of the invention. In the sixth embodiment, the same numerals are labeled to the same elements as in the first through the fifth embodiments, and their corresponding descriptions are omitted.

Figure 20:
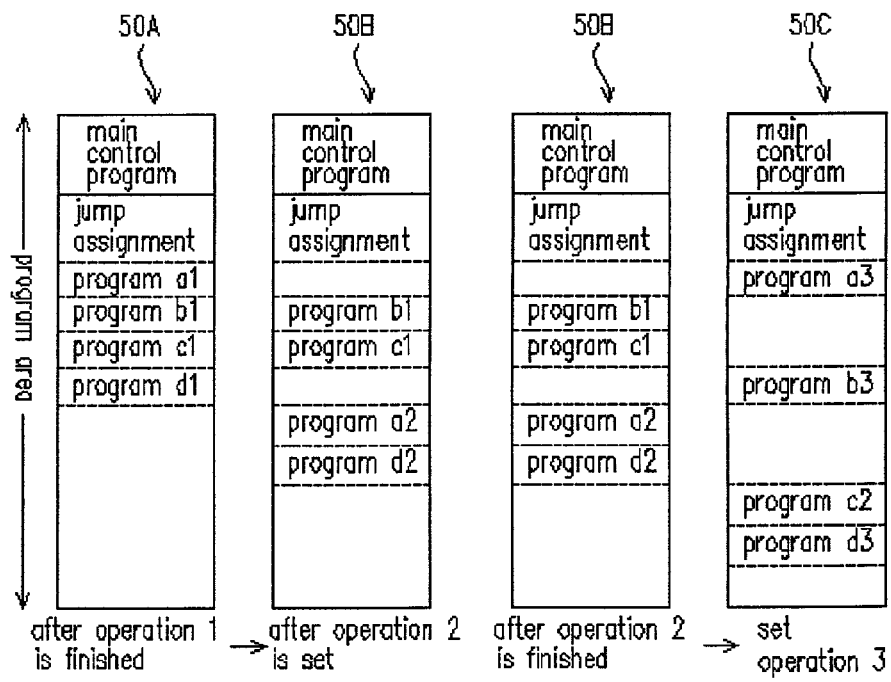
FIG. 20 is a diagram for describing the download of the programs to the memory unit according to the sixth embodiment.

FIG. 20 is a diagram for describing the download of the programs to the memory unit according to the sixth embodiment. The flow, for downloading the programs when the requests 1, 2 and 3 in FIG. 16 are requested in sequence, is described. According to the description from the time point after the settings corresponding to the process request 1 is finished, the DSP 30 returns a setting finish response to the CPU 10, and the CPU 10 acknowledges to the upstream process unit 11 that it is ready for starting the process. The upstream process unit 11 transmits signals (data) to the DSP 30, and the DSP 30 uses the processor unit 40 to process the data based on the programs stored in the memory unit 50.

In this case, according to the download control program in the CPU 10, the program locations are assigned so that which program at the specified location of the program area will be performed in what kind of sequence can be determined. For example, information, such as the address information or the program names, is written to a "jump assignment" area in the program area of the memory unit 50. The main control program can perform those programs in the program area that are to be processed according to what kind of sequence is indicated.

After the processes of the operation 1 are finished, the CPU 10 keeps the download status of the programs corresponding to the process request 1 in the RAM 22 within the CPU 10. Next, at the time point when the next process request 2 is requested, the CPU 10 compares the difference from the past, i.e., the process request 1. For example, when the process request 2 is a program combination of the request 2 shown in FIG. 16, the programs b1 and c1 that have been downloaded before are reused. Namely, at present, the programs b1 and c1 are not downloaded and only programs a2 and d2 are downloaded.

At this time, the CPU 10 transmits the control information having a processing sequence of a2→b1→c1→d2 to the jump assignment area. The difference between the programs is managed to effectively utilize the memory unit 50.

Furthermore, at the time point when the settings of the operation 2 are finished, the main control program deletes the programs only used by the process request 1, i.e., the past resources. Similarly, when the process request 3 is requested after the process request 2, the program arrangement in the memory unit 50C is made as shown at the right side of FIG. 21 because there are no programs consistently used by both the process request 2 and the process request 3 (refer to FIG. 16).

According to the method mentioned above, the CPU 10 keeps the past resources therein. Namely, the historic information of the downloaded programs can be kept by way of not exceeding the maximum program number that forms a program group. Therefore, when the content of the programs downloaded according to the respective process request is substantially the same, the amount of the programs to be downloaded can be reduced, and the information for managing the past resources can be also suppressed.

Accordingly, the capacity of the memory unit can be reduced. Also, the processing circuit can be simplified, and the speed of the DSP circuit can be accelerated. Additionally, for example, in consideration of applying the processor system to the image processing apparatus, because the copy process has a high probability of selecting the same settings, the processing time can be particularly minimized.

<<Seventh Embodiment>>

The next description is a processor processing method according to the seventh embodiment of the invention. In the seventh embodiment, the same numerals are labeled to the same elements as in the first through the sixth embodiments, and their corresponding descriptions are omitted.

Figure 21:
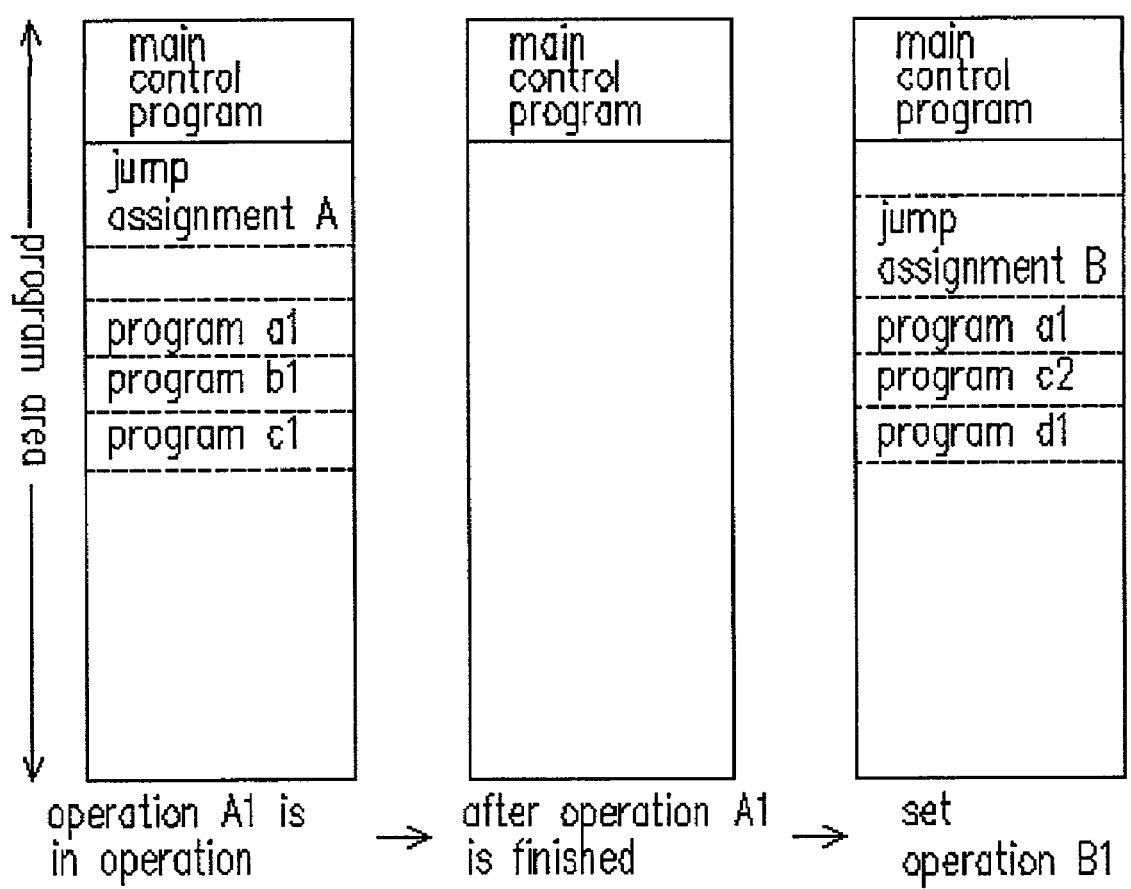
FIG. 21 shows an exemplary status of the memory unit in the sequence in FIG. 9.

The structure of the processor system in the seventh embodiment is the same as the structure of the processor system in the second embodiment. FIG. 21 is a diagram describing the memory status in the sequence shown in FIG. 9. In the sequence, the timings of the settings and the signal processes of the process request A-1 and the process request B-1 are not overlapped. First, the operation corresponding to the process request A-1 is processed according to the program group shown in FIG. 13. At this time, the program sequence is indicated in the jump assignment A.

As the process request A-1 is finished, the memory is released. Then, the programs corresponding to the process request B-1 are acquired (downloaded). Because the main control program assigns the operations by the sequence shown in FIG. 8, the jump assignment A is referred to Job-A and the jump assignment B is referred to Job-B.

Figure 22:
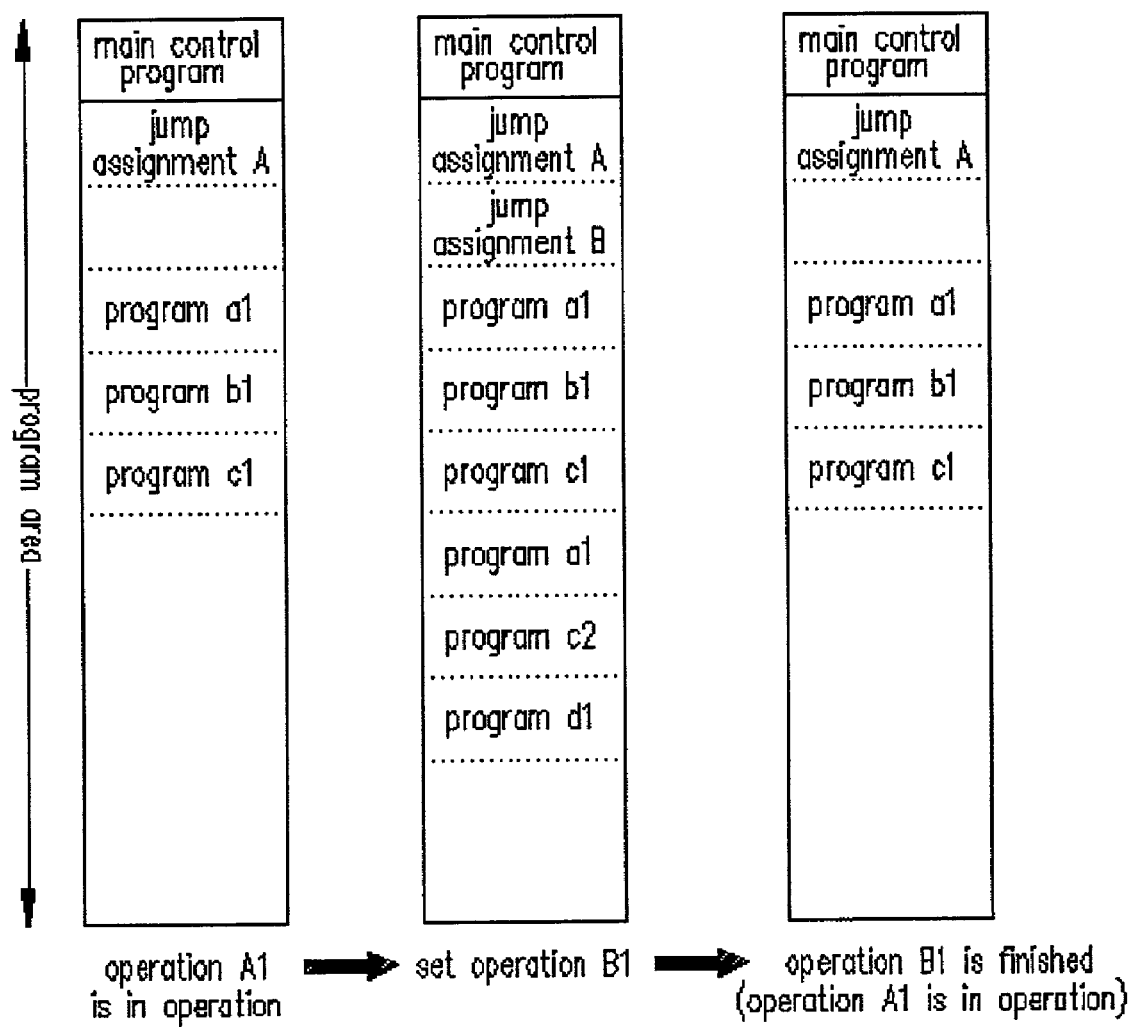
FIG. 22 is a diagram for describing the memory status in the sequence shown in FIG. 10.

FIG. 22 is a diagram for describing the memory status in the sequence shown in FIG. 10. In the exemplary sequence, the process request B-1 is requested when the process request A-1 is in operation, the main control program finds empty memory area (not used by the process request A-1), and then downloads the program group corresponding to the process request B-1 shown in FIG. 13. In addition, the jump assignment B is set to finish the settings of the process request B-1, by which the DSP 30 can execute the processes in parallel.

As the operation B-1 is finished, the memory area used by the operation B-1 is released, and additionally, only the program area, where the process request A-1 is still operating, remains. The processor processing method is also suitable for the following second and third process requests. Whether the programs are downloaded or not is determined by the difference between the past resources.

<<Eighth Embodiment>>

The next description is a processor processing method according to the eighth embodiment of the invention. The eighth embodiment describes the operations of host programs in the CPU, and particularly, the software configuration, the reuse flow, to get the new resource (download programs to empty regions of the memory unit) and to overwrite (download and overwrite programs to the memory unit) with references to the drawings.

Figure 23:
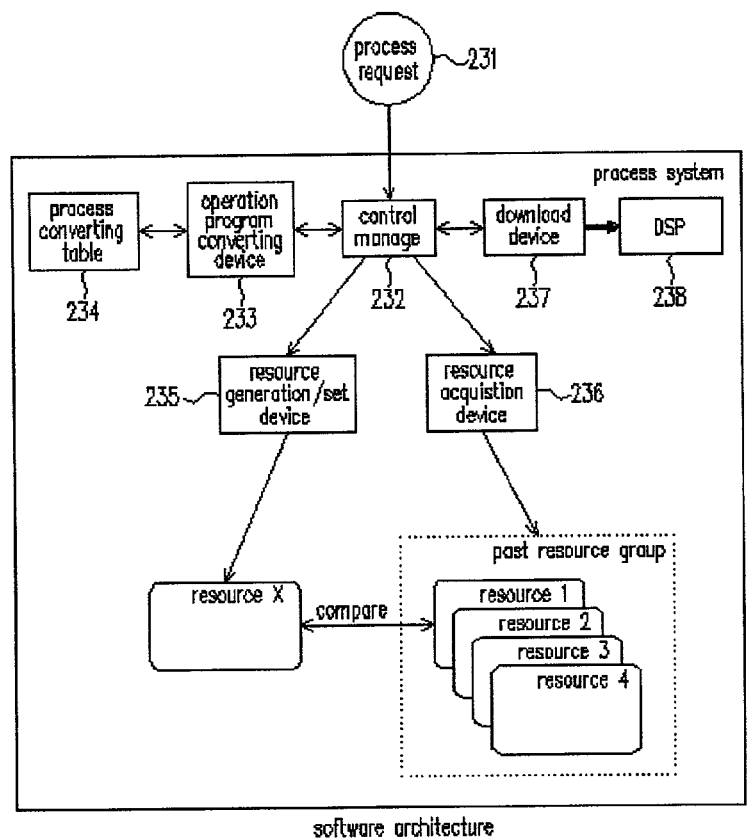
FIG. 23 is a drawing to describe the software configuration of a program system according to the eighth embodiment.
Figure 24:
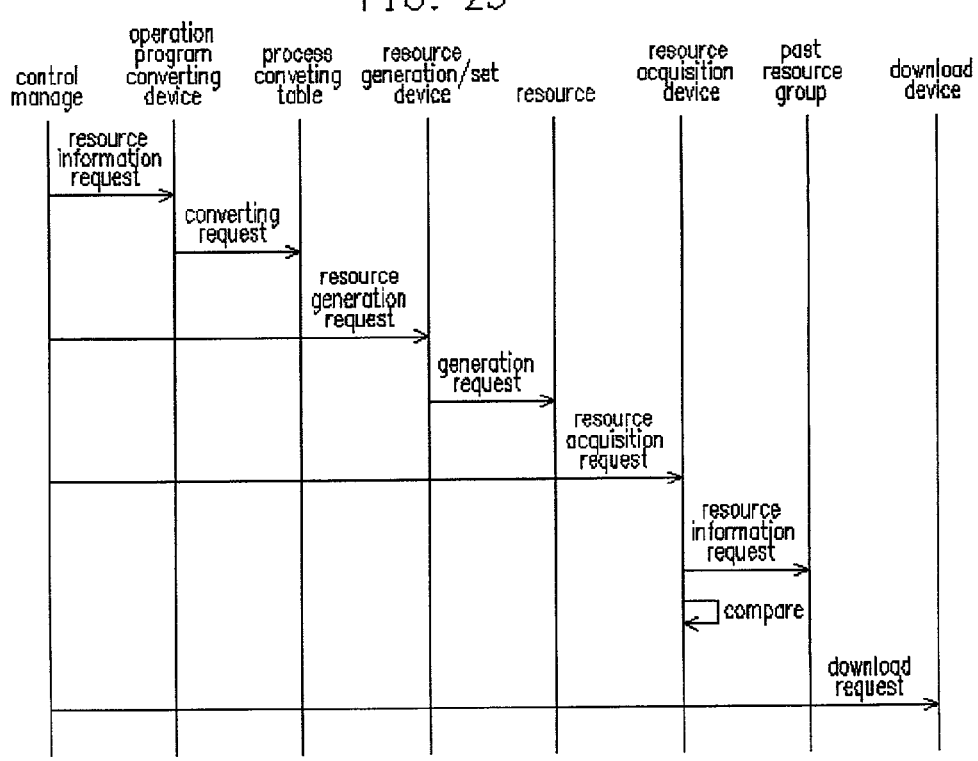
FIG. 24 shows a sequence of the software configuration in FIG. 23.

First, the software configuration is discussed. FIG. 23 is a drawing to describe the software configuration of a program system according to the eighth embodiment. FIG. 24 shows a sequence of the software configuration in FIG. 23.

The process request 231 is first transmitted to the control management 232. The control management 232 indicates operations or processing sequences of the other software of each program component (programs that form the program group). For example, as the control management 232 receives commands from the process request 231, conversions related to the process request are performed by the operation-to-program converting device 233. The operation-to-program converting device 233 interprets the contents of the process request 233 and looks up the program contents to be used from the process converting table 234.

After receiving commands from the operation-to-program converting device 233, the process converting table 234 returns the program contents (the program group to be used). When the control management 232 receives a response from the operation-to-program converting device 233, the control management 232 controls the resource generating/setting device 235 to generate resources. The resource generating/setting device 235 then generates the resources (programs to be downloaded and their related information or control messages). In the description, the generated resource is represented by the resource X.

The control management 232 transmits the generated resource X to the resource acquisition device 236 to perform a resource acquisition request. The resource acquisition device 236 compares it to the past resource group that device 236 has downloaded to determine whether it is possible to get the resource X, and then returns a result (acquisition result) to the control management 232. If the acquisition result is OK, the control management 232 asks the download device 237 to perform a download request. The download device 237 then downloads a source code to the DSP 238.

Figure 25:
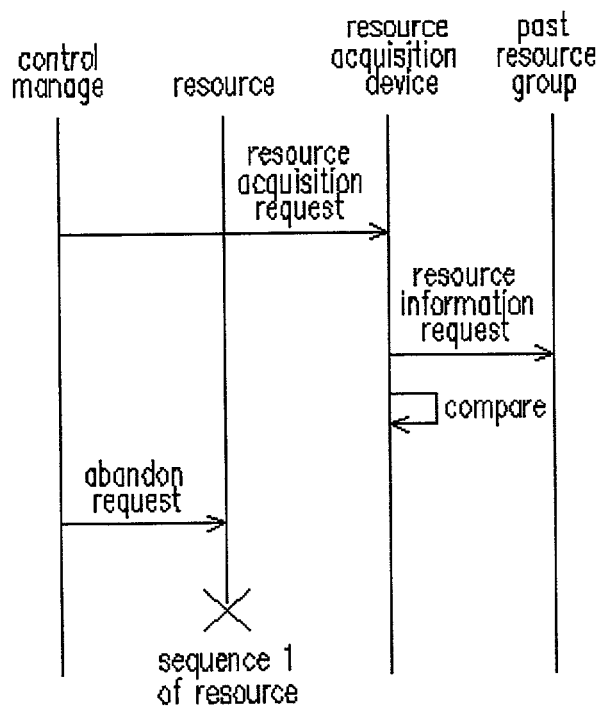
FIG. 25 is an exemplary sequence of the resource reuse.
Figure 26:
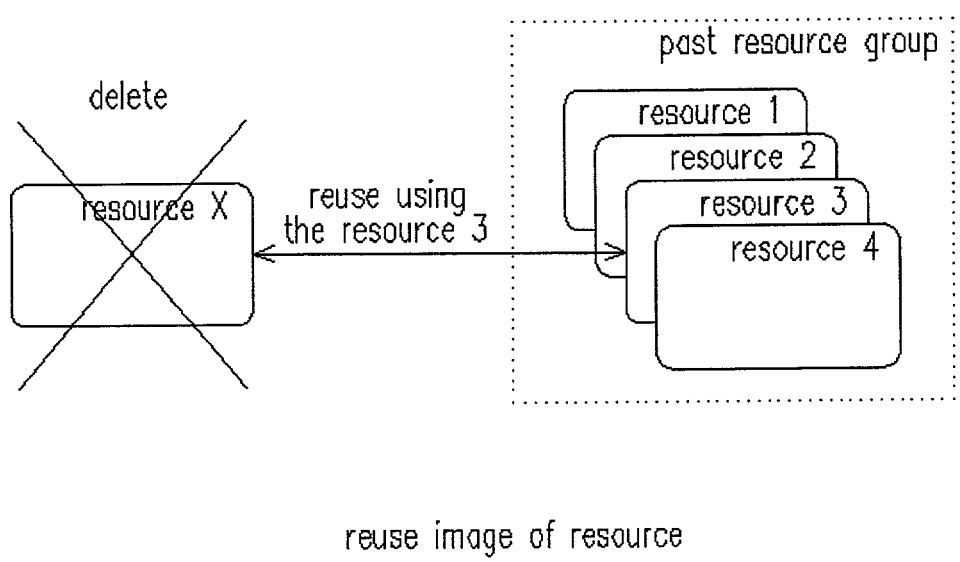
FIG. 26 is a conceptual diagram for explaining the exemplary sequence of the resource reuse in FIG. 25.

The following description is the reuse flow. The description is made in detail when the control management 232 asks the resource acquisition device 236 to perform a resource acquisition request. FIG. 25 is an exemplary sequence of the resource reuse. FIG. 26 is a conceptual diagram for explaining the exemplary sequence of the resource reuse in FIG. 25.

First, the resource reuse sequence 1 (FIG. 25) and the resource reuse image (FIG. 26) are described. The resource acquisition device 236 compares the past resource group owned by the resource acquisition device 236 before and the resource X passed from the control management 232, to examine whether the contents are the same. When the resource X can be used by reusing the resource 3, the control management 232 abandons the resource X, and the resource 3 is downloaded as an object of the process request.

Figure 27:
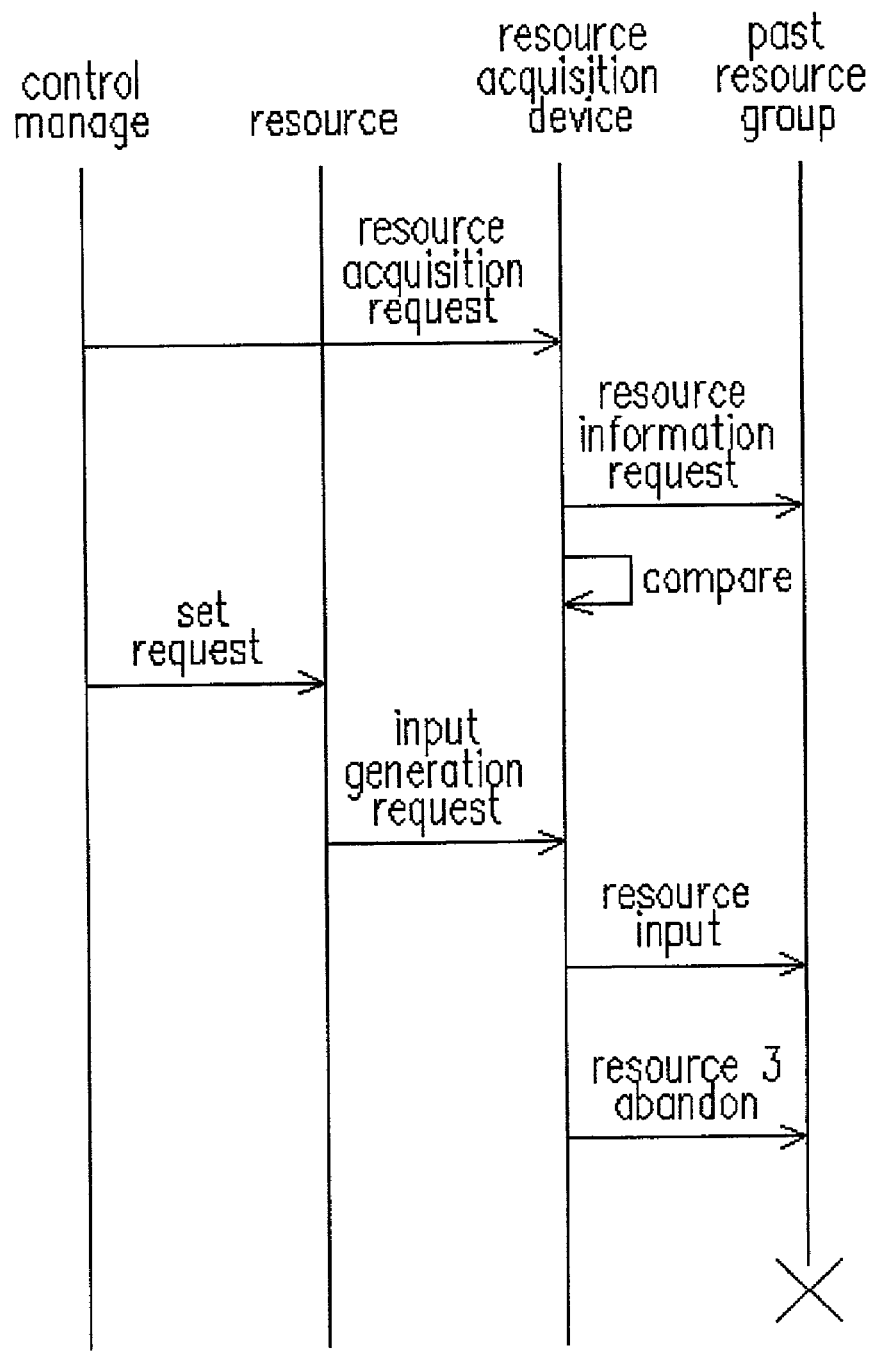
FIG. 27 is another exemplary sequence of the resource reuse.
Figure 28:
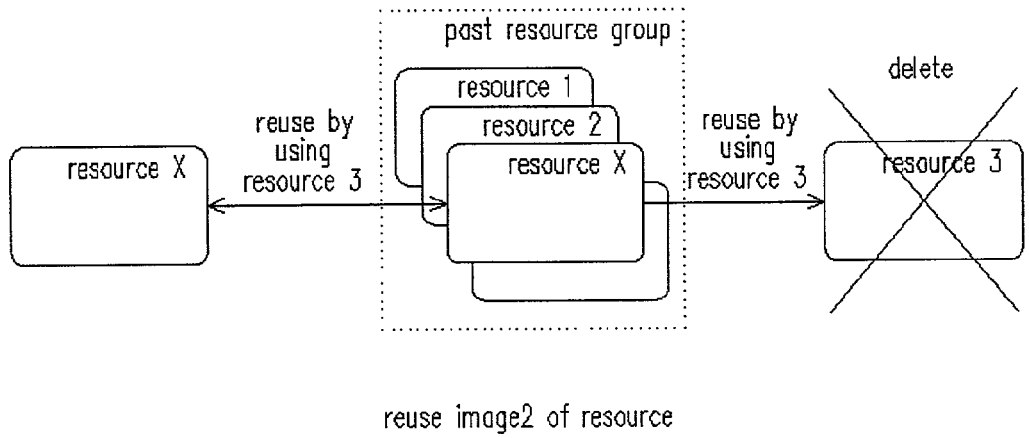
FIG. 28 is a conceptual diagram for explaining the exemplary sequence of the resource reuse in FIG. 27.

In addition, there are other methods to abandon the resource when the resource can be reused. FIG. 27 is another exemplary sequence of the resource reuse. FIG. 28 is a conceptual diagram for explaining the exemplary sequence of the resource reuse in FIG. 27. When the resource X can be used by reusing the resource 3, the control management 232 first asks the resource acquisition device 236 to perform a resource input request (additionally, even if there is no resource input request, the following operations can be included in the resource acquisition request). The resource acquisition device 236 inputs the resource X to the past resource group, and then the resource 3 in the past resource group is deleted.

Figure 29:
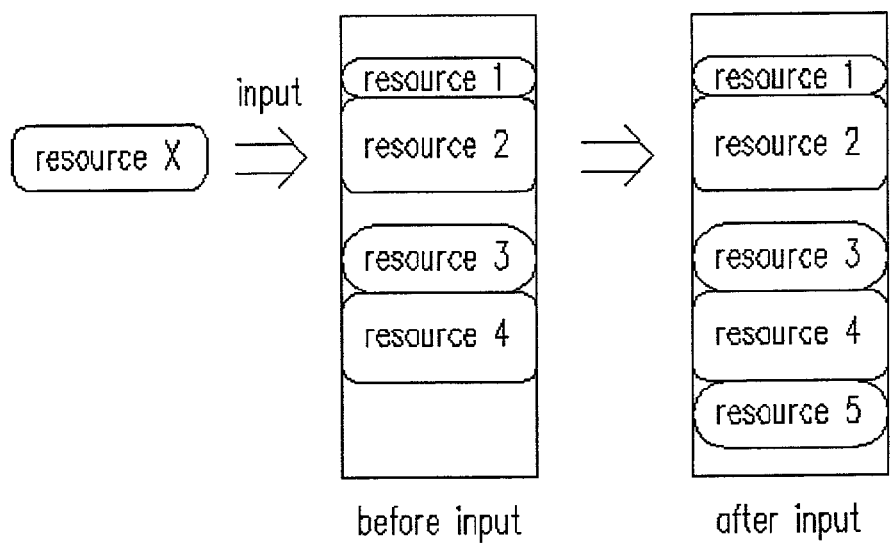
FIG. 29 is a diagram for describing how to acquire the new resource.
Figure 30:
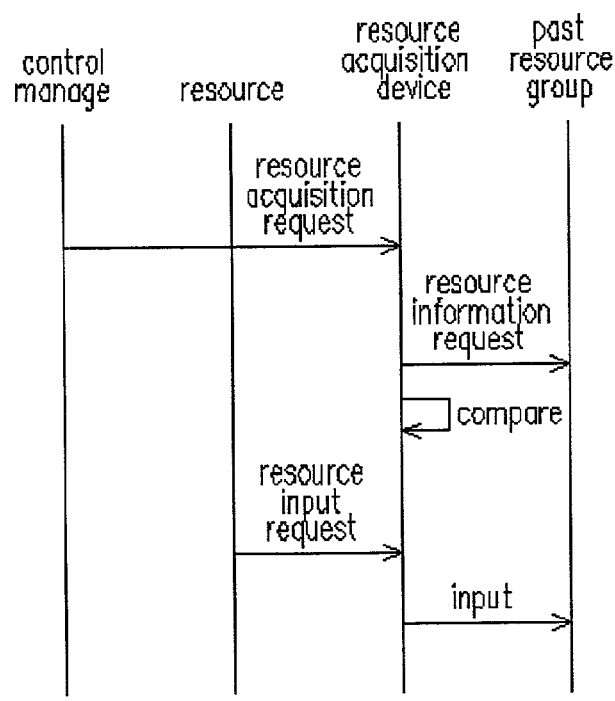
FIG. 30 is a diagram for describing how to acquire the new resource.
Figure 31:
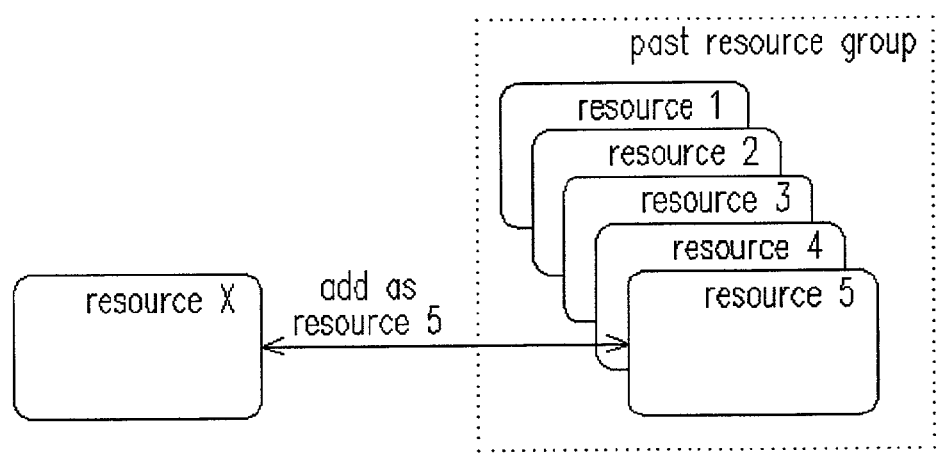
FIG. 31 is a diagram for describing how to acquire the new resource.

The following description is to describe a method for getting a new resource when the resources cannot be reused. FIGS. 29-31 are diagrams for describing how to get the new resource. First, when the control management 232 performs a request acquisition request to the resource acquisition device 236, the resource acquisition device 236 examines the opened area of the memory area (the memory area mainly consisting of the memory unit of the DSP) occupied by the past resources. As an area larger than the memory area requested by the resource X is to be acquired, a message capable of acquiring the resource is returned.

The control management 232 asks the resource acquisition device 236 to perform a resource input request (even if there is no resource input request, the following operations can be included in the resource acquisition request). The resource acquisition device 236 inputs the resource X to the past resource group.

Figure 32:
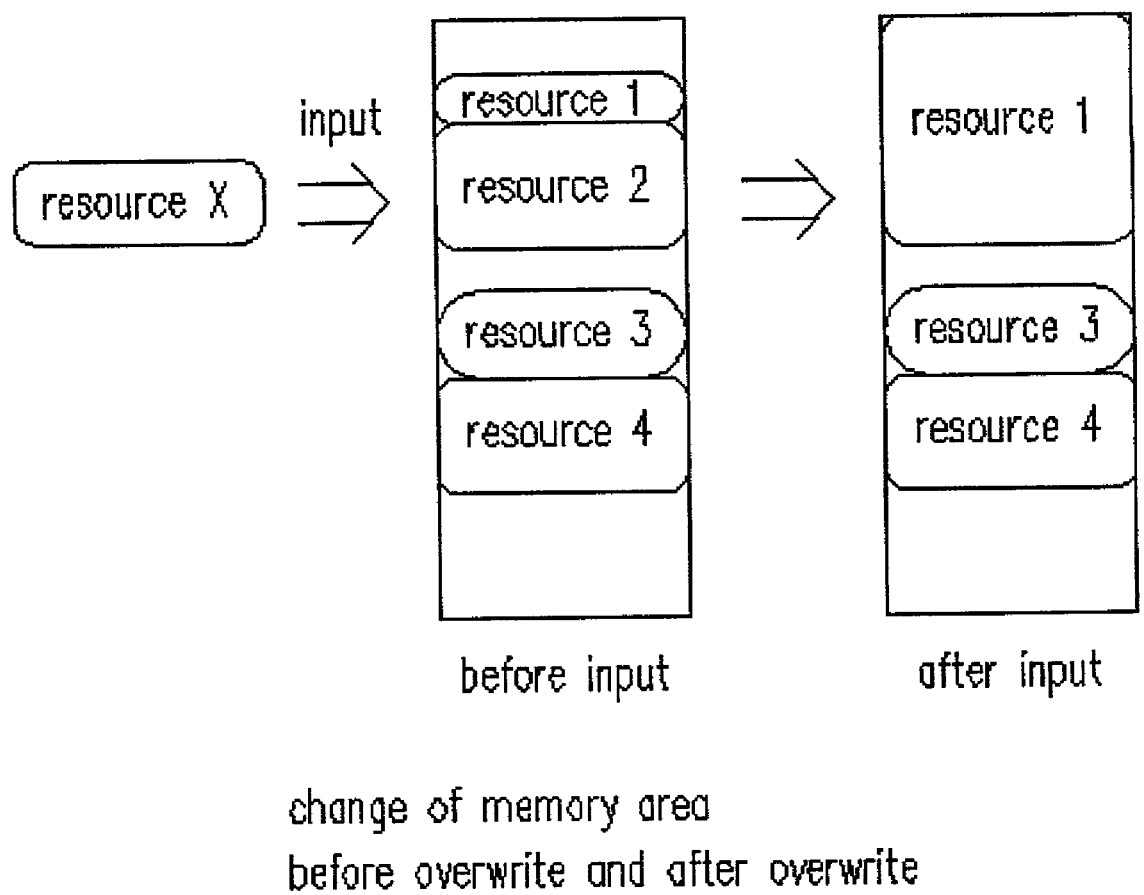
FIG. 32 is a diagram for describing a method how to acquire the new resource when the memory resource cannot be reused and the new resource cannot be acquired.
Figure 33:
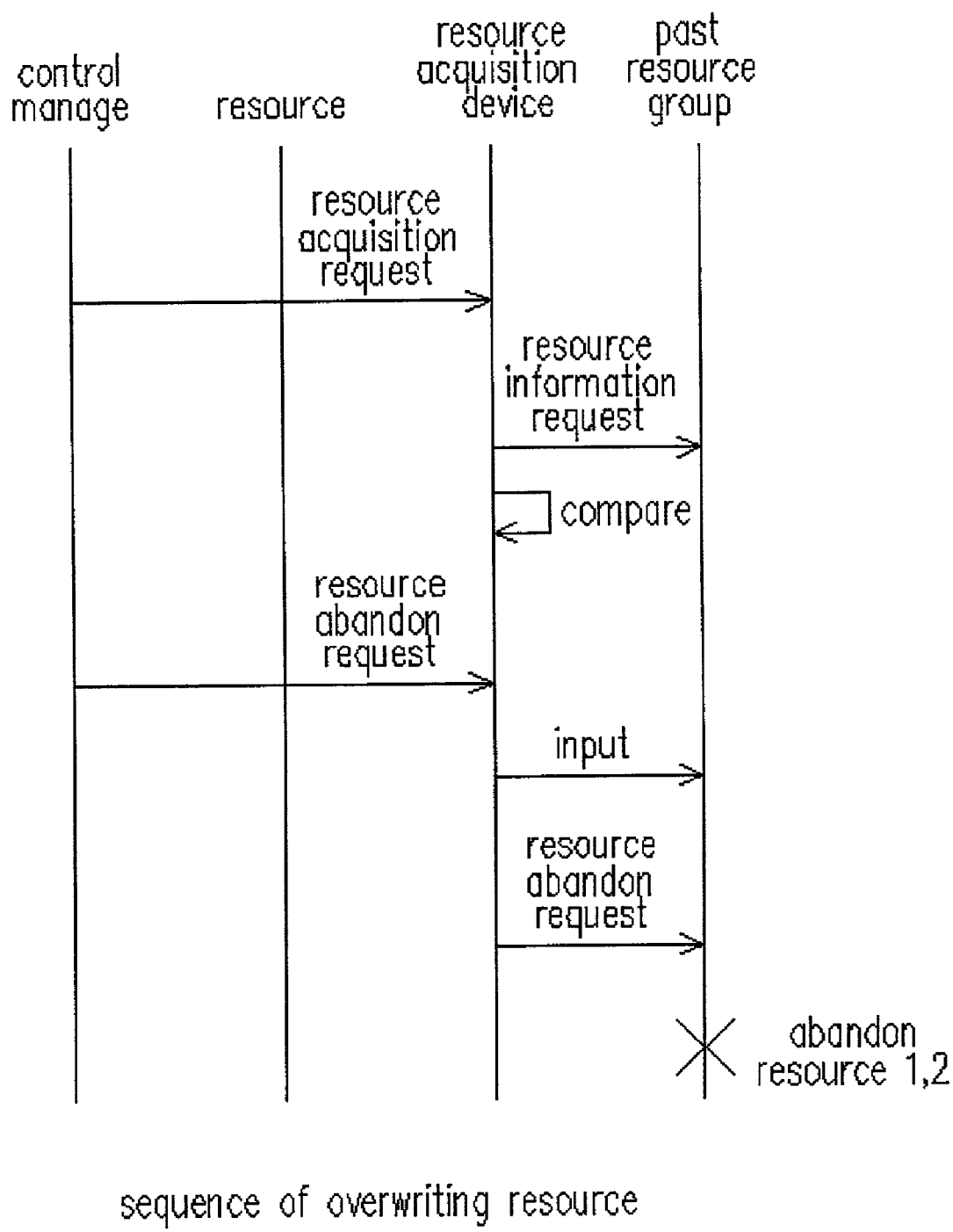
FIG. 33 is a diagram for describing a method how to acquire the new resource when the memory resource cannot be reused and the new resource cannot be acquired.
Figure 34:
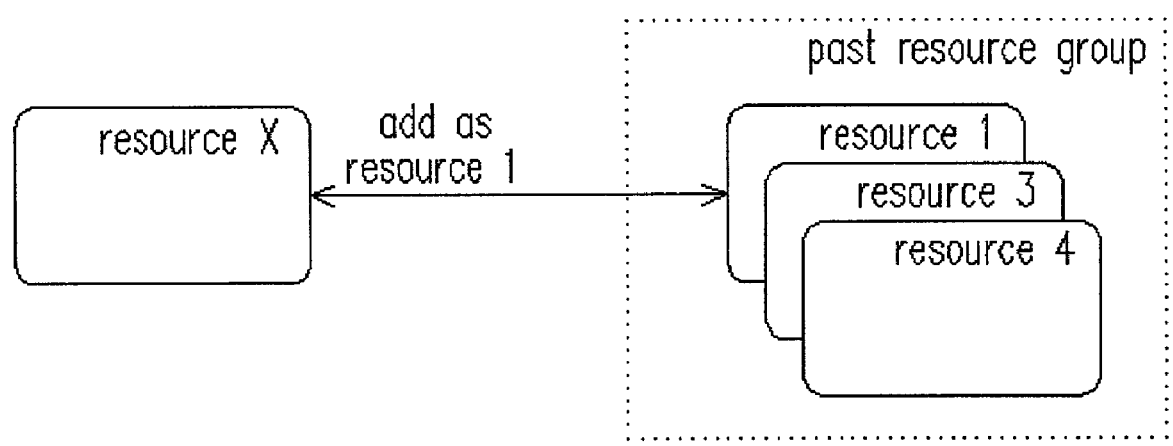
FIG. 34 is a diagram for describing a method how to acquire the new resource when the memory resource cannot be reused and the new resource cannot be acquired.

The following description is about how to overwrite the resource. It describes a method for acquiring a resource when the memory area cannot be reused and the new resource cannot be acquired. FIGS. 32~34 are diagrams for describing the method for acquiring a resource when the memory area cannot be reused and the new resource cannot be acquired. When the control management 232 performs the resource acquisition request to the request acquisition device 236, the resource acquisition device 236 examines the past resources. If the area of the past resources can be obtained (i.e., not in use), the opened area containing that area is examined, and then the opened area is acquired if the opened area is larger than the area of the resource X to be acquired.

At this time, the control management 232 performs a resource input request to the resource acquisition device 236 (even if there is no resource input request, the following operations can be included in the resource acquisition request). The resource acquisition device 236 inputs the resource X to the past resource group and the past resources overlapping the area of the resource X are deleted.

Furthermore, the eighth embodiment describes the processor system or the processing method for the processor system in a middleware manner. The portions repeated in the first to the seventh embodiments are included.

<<Ninth Embodiment>>

Till now, the above embodiments describe mainly the processor processing method of how to effectively use the memory resource based on the use status of the memory unit. The following description is made of how to effectively use the memory resource by adding registers in the processor unit. In the ninth embodiment, the same numerals are labeled to the same elements as in the first through the eighth embodiments, and their corresponding descriptions are omitted.

Figure 35:
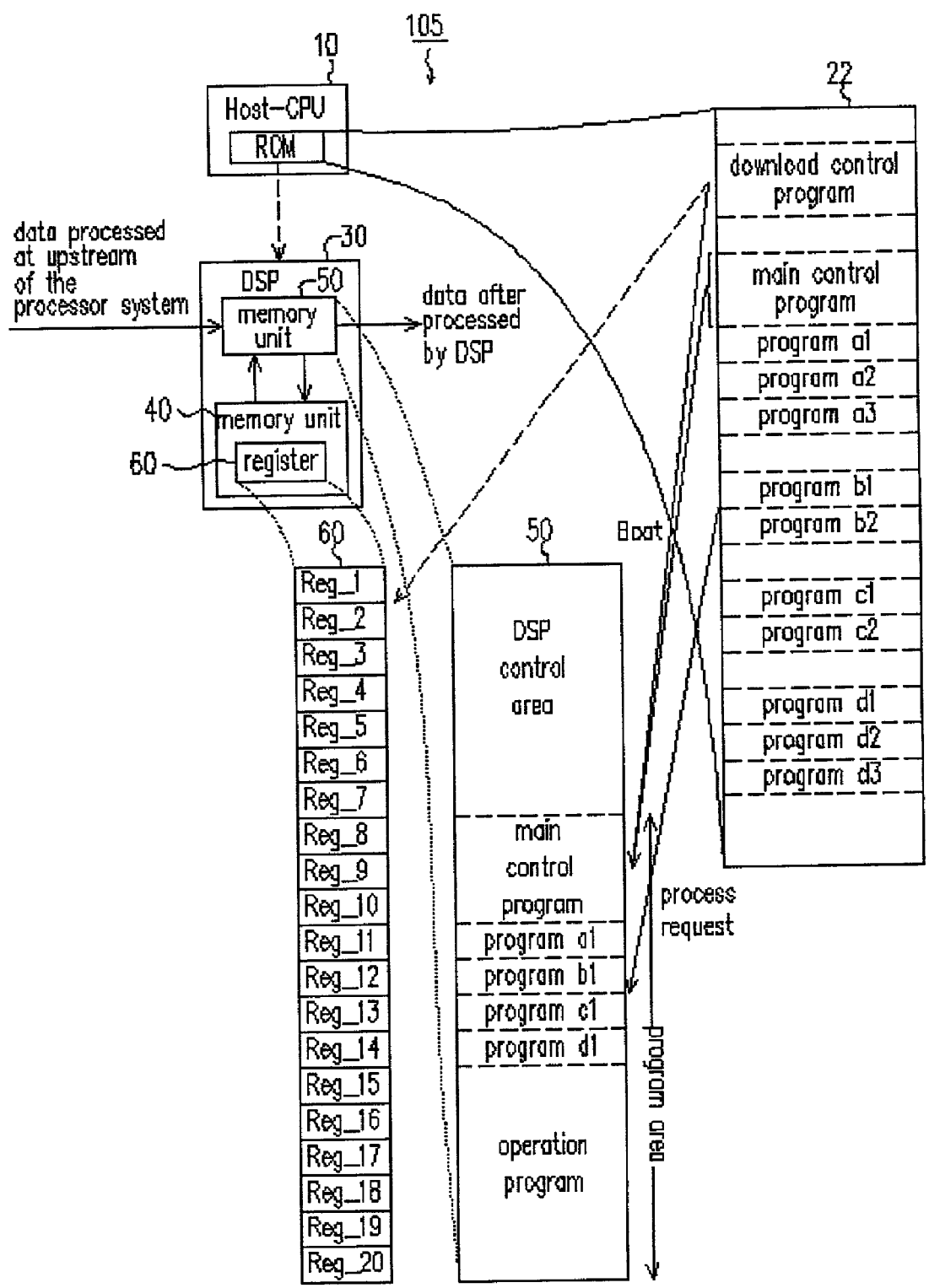
FIG. 35 shows an exemplary structure of a processor system suitable for the processor processing method of the ninth embodiment.

FIG. 35 shows an exemplary structure of a processor system suitable for the processor processing method of the ninth embodiment. The processor system 106 is a system containing a register unit 60 in the processor unit 40 of the DSP 30. As shown, the register unit 60 is composed of 20 registers, which are used for storing the results while the process is processed by an algorithmic method. The register unit 60 can be properly controlled by a download control program of the CPU 10.

An example of when a process request is from the system processor external 105 is shown in FIG. 3. As described above, the CPU 10 performs the settings of the peripherals such as the upstream process unit and the downstream process unit, and the program downloads to the DSP 30 (refer to FIG. 2). When downloading, the programs stored in the ROM 22 of the CPU 10 are assigned to perform the setting request. As described above, because the programs in the ROM 22 have a lot of program components, the process can handle different types. In addition, because the main control program is downloaded first, the download for programs that change portions each time can become more efficient.

An exemplary sequence for the processor system is like the sequence shown in FIG. 3, for example. After the boot process, as the CPU 10 receives the process request 1 from the system processor external 105, the CPU 10 refers to the ROM 22 in the CPU 10 so that the program corresponding to the process request 1 is downloaded to an area (other than the area of the main control program) of the program area where the memory unit 50 of the DSP 31 is located and serves as an operational program. In addition, when the programs use the registers, the registers are also assigned for the download. After the download is finished, the DSP 30 goes into a stand-by mode for the input signals, and returns a setting finish response to the CPU 10.

The CPU 10 acknowledges the upstream process unit 11 that it is ready for starting the process. The upstream process unit 11 outputs processing signals (data that should be processed by the DSP 30) to the DSP 30 at any time. The DSP 30 processes the received signals and then transmits the processed signals to the downstream unit 12.

As shown, after the process corresponding to the process request 1 is finished, the process request 2 from the system processor external 105 is informed. The CPU 10 refers the ROM 22 in the CPU 10 so that the program corresponding to the process request 1 is downloaded to an area (other than the area of the main control program) of the program area where the memory unit 50 of the DSP 31 is located and serves as an operational program. At this time, when the programs use the registers, the registers are also assigned for the download. The following is the same as the process request 1, a setting finish response from the DSP is returned to the CPU 10. The CPU 10 acknowledges the upstream process unit 11 that it is ready for starting the process. Then, the processing signals are input from the upstream process unit 11 to the DSP 30 at which point the processing signals are processed.

At this time, because the main control program downloaded at the beginning is not changed for downloading the different process requests 1 and 2, only the different programs and registers are selected to download. Therefore, the processing time for the whole processor system 105 can be reduced and the plurality of types of programs can be enriched.

Figure 36:
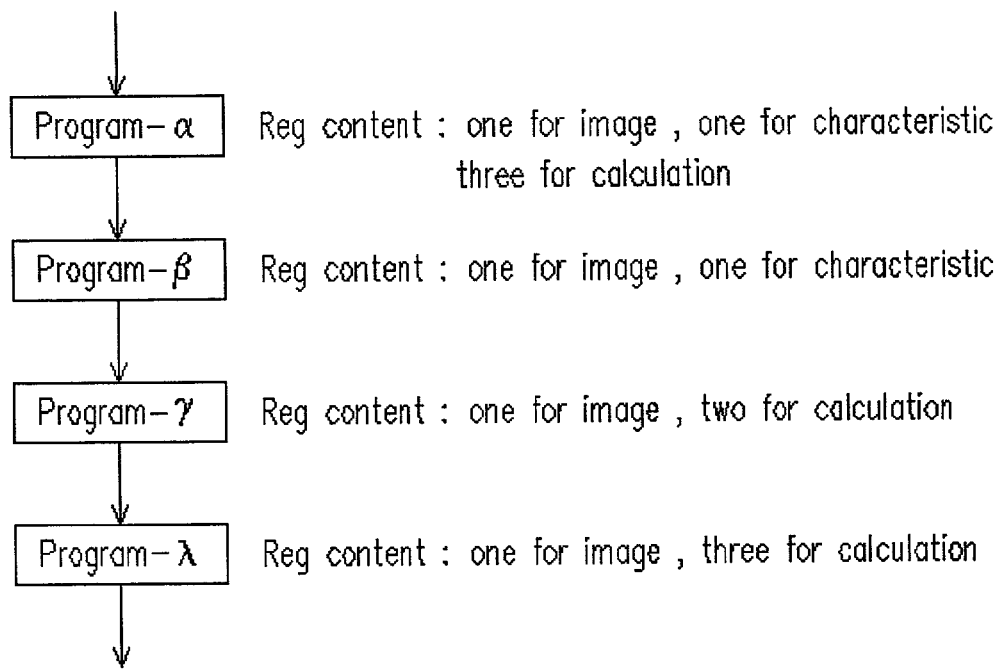
FIG. 36 is diagram showing the relationship between the programs to be downloaded and the registers to be used.
Figure 37:
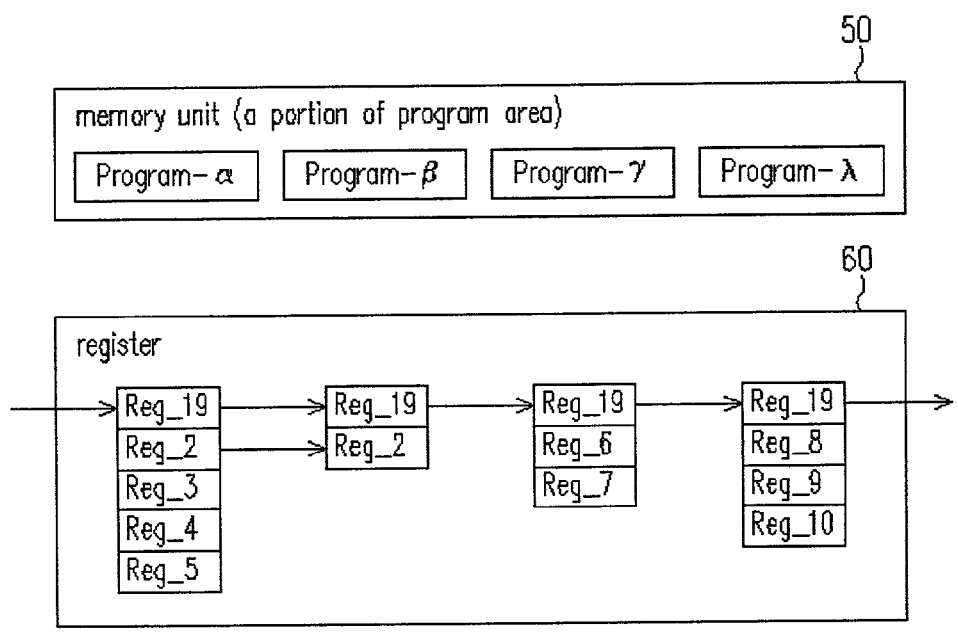
FIG. 37 is a conceptual diagram for showing the process shift for each program and register shown in FIG. 36.

The following description is the relationship between the programs to be downloaded and the registers to be used when the process request is an image process. FIG. 36 is a diagram showing the relationship between the programs to be downloaded and the registers to be used. FIG. 37 is a conceptual diagram for showing the process shift for each program and register shown in FIG. 36.

As shown, programs α, β, χ, and λ require registers shown at their respective right side. Because the image register serves as a storage register of the image data that should always be processed, the register for image is commonly used for all the programs α, β, χ, and λ. In addition, between the programs α, β, the characteristic generated by the program α is stored in the characteristic register, and the program β can refer the characteristic register to execute the process.

As mentioned above, because the processor system considers the memory resource and the register resource to distribute the programs and the required parameters, the memory resource and the register resource can be effectively utilized.

<<Tenth Embodiment>>

In the tenth embodiment, the register unit of the processor unit is connected to a line memory and hardware such as for the image process or for the audio process. The tenth embodiment describes a processor processing method for reading and writing data of the line memory or the hardware above. Additionally, in the tenth embodiment, the same numerals are labeled to the same elements as in the first through the ninth embodiments, and their corresponding descriptions are omitted.

Figure 38:
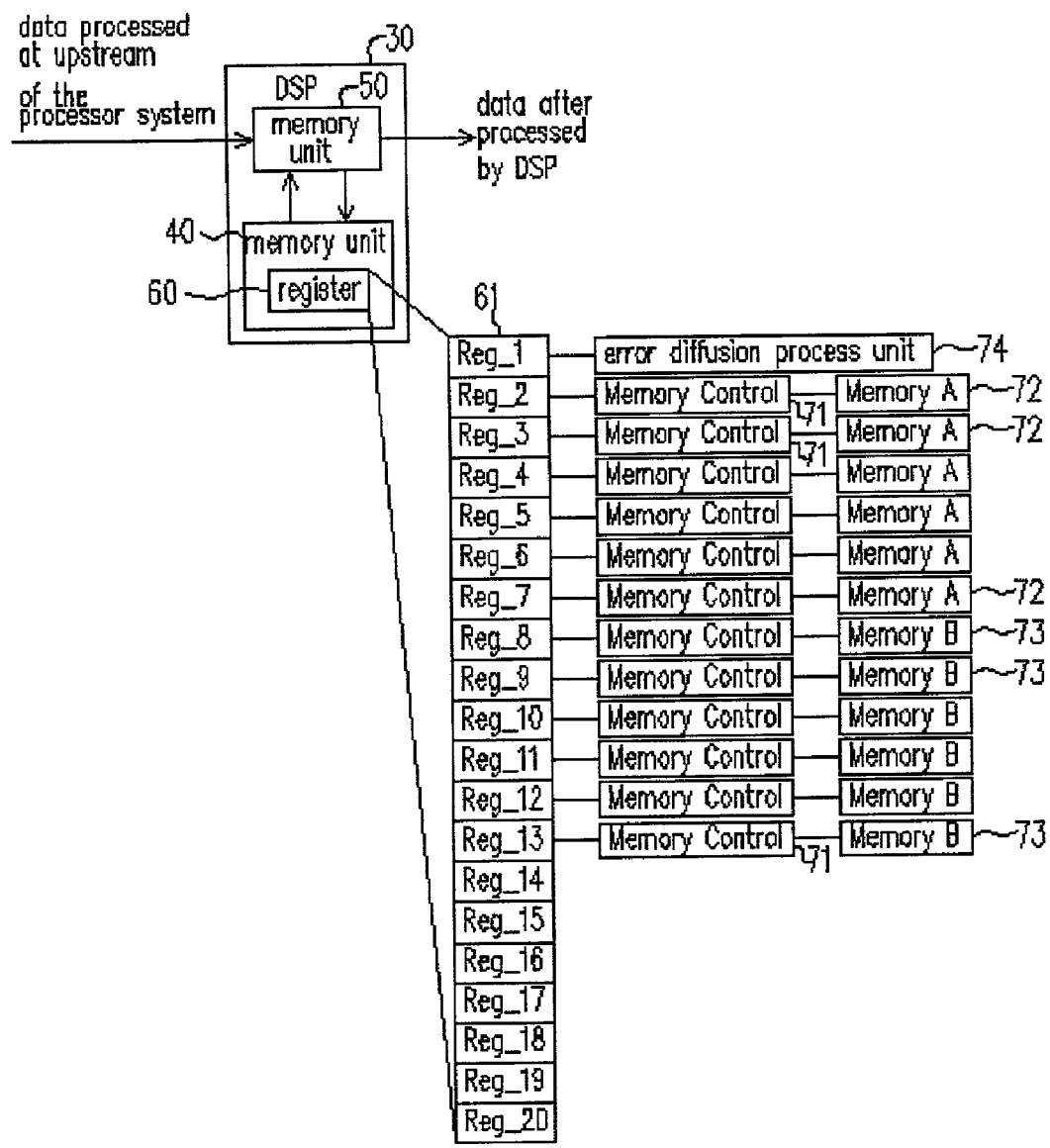
FIG. 38 shows the connection of the registers of the processor system according to the tenth embodiment.

FIG. 38 shows the connection of the registers of the processor system according to the tenth embodiment. The registers 61 of the tenth embodiment are not only used for storing data, but also connected to the hardware having other functions. By such a connection, processes that are more complicated than the above embodiment can be executed. The memory-A 72 connected to the memory controller (MCon) 71 is a line memory, and the memory-B 73 is also a line memory having an image storage capacity different from the memory-A 72. The error diffusion processing unit 74 is a hardware used for executing the image process that is specified to the error diffusion, and is connected to the register Reg_1.

Figure 39:
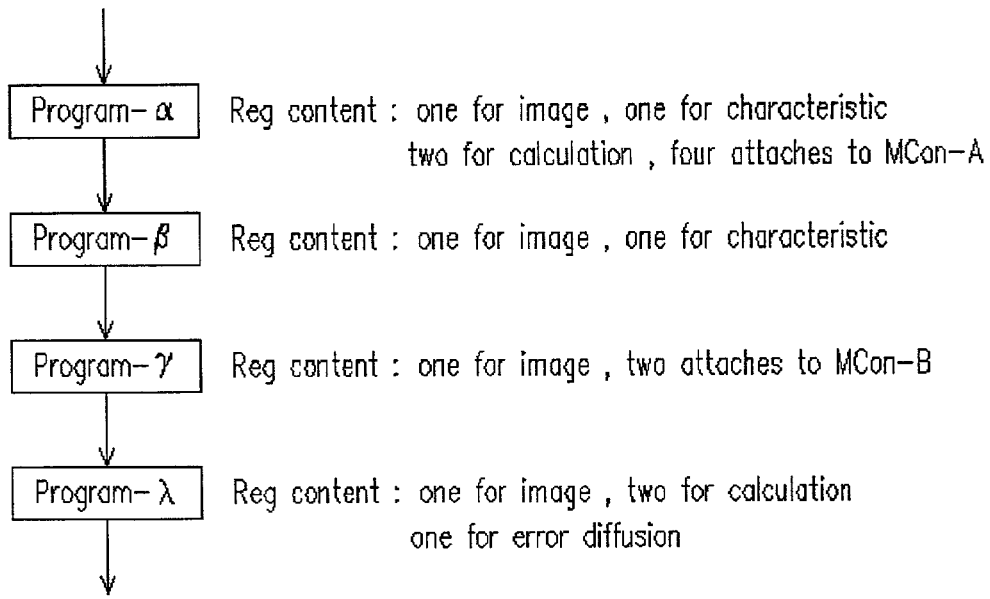
FIG. 39 shows a relationship between the programs to be downloaded and the registers to be used.
Figure 40:
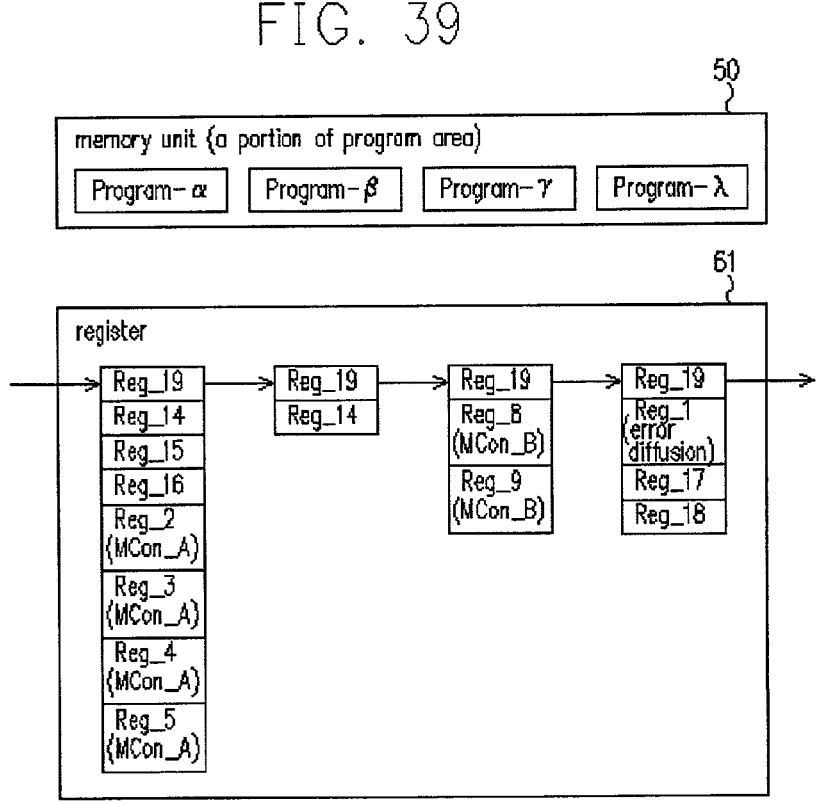
FIG. 40 is a conceptual diagram for showing the process shift for each program and register shown in FIG. 39.

The use of the registers are described with reference to the drawings. FIG. 39 shows a relationship between the programs to be downloaded and the registers to be used. FIG. 40 is a conceptual diagram for showing the process shift for each program and register shown in FIG. 39. As shown in FIG. 38, in addition to the registers used for image, registers used for characteristic and registers used for calculation, registers attached to the memory controllers 71 (MCon-A connected to the memory-A, and MCon-B connected to the memory-B) or registers connected to the error diffusion processing unit 74 are used.

For example, by using the line memories (the memory-A 72 and the memory-B 72) through the memory controller (MCon-A or MCon-B), it is possible to have functions, such as a filter that refers the image in the sub-scanning direction to perform calculations. In addition, by using the register (Reg_1 in FIG. 38) connected to the hardware (the error diffusion processing unit 74) specified for the error diffusion, the error data of the past line can be held. Therefore, a process, such as the error diffusion calculation, wherein the error of current line is calculated to reflect an error result in the next pixel, is difficult for the SIMD process, but becomes possible in the embodiment.

<<Eleventh Embodiment>>

In the eleventh embodiment, it describes a processor processing method where there are two process requests. One is where after initial process request is finished and then the next process request is performed; another one is where the two process requests are performed in parallel. In the eleventh embodiment, the same numerals are labeled to the same elements as in the first through the tenth embodiments, and their corresponding descriptions are omitted.

The configuration of the eleventh embodiment is the same as the configuration of the second embodiment. The processes of the two process requests are performed in parallel. In addition, for convenience, the processor system 101 in the second embodiment is referred to as the processor system 107 and the register is referred to the register 62. The flow, for downloading the programs required for the process of the DSP 31 corresponding to the process request, is shown in FIG. 6.

When the process request to the DSP 31 is a process request A, the flow at the right side of FIG. 6 is selected. In this situation, the peripherals, such as the upstream process unit A 111, the upstream process B 112, the downstream process unit A 121 and the downstream process unit B 122 etc, are set, and additionally, the parameters and the programs required for the data process are downloaded to the memory unit 50 of the DSP 31. The programs are downloaded to an area that is released as a program area in the memory unit 50 of the DSP 31. In addition, the registers are acquired according to the indications in the registers used by the respective program.

Figure 41:
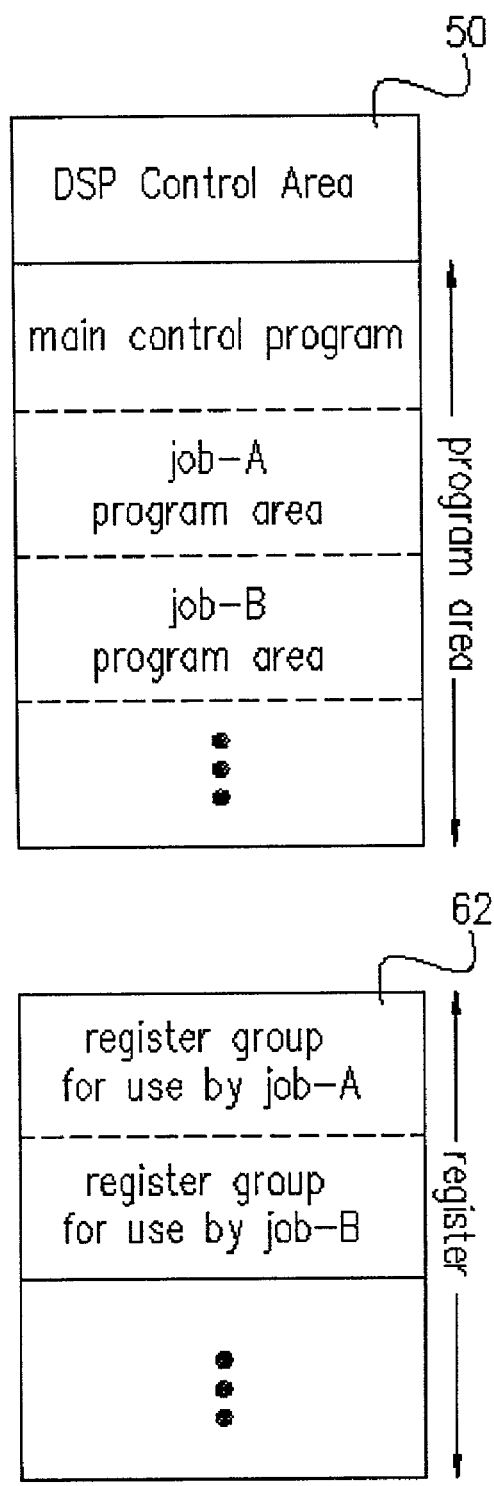
FIG. 41 shows an exemplary allocation for the register 62 and the memory unit 50 of the DSP 30 with respect to the programs corresponding to the two process requests (process request A and the process request B)

When the request to the DSP 31 is a process request B, the operations similar to the process request A are performed. However, the area, which is released as a program area in the memory unit 50 of the DSP 31, is searched to download the programs. Additionally, regarding the registers, it is similarly searched for empty regions so that the registers can be acquired. FIG. 41 shows an exemplary allocation for the register 62 and the memory unit 50 of the DSP 30 with respect to the programs corresponding to the two process requests (process request A and the process request B).

FIG. 9 shows an exemplary sequence of the process system 107. As the CPU 10 receives a process request A-1 from the external of the process 107, the CPU 10 refers the ROM 20 in the CPU 10 so that the program corresponding to the process request A-1 and the register assignment is downloaded to the Job-A program area of the program area where it is located in the memory unit 50 of the DSP 31 and serves as an operational program. Also, the register 62 is set. Similarly, for the process request B-1, the CPU 10 refers the ROM 20 in the CPU 10, so that the program corresponding to the process request B-1 and the register assignment is downloaded to the Job-A program area of the program area where it is located in the memory unit 50 of the DSP 31, and serves as an operational program. Meanwhile, the register 62 is also set.

Figure 42:
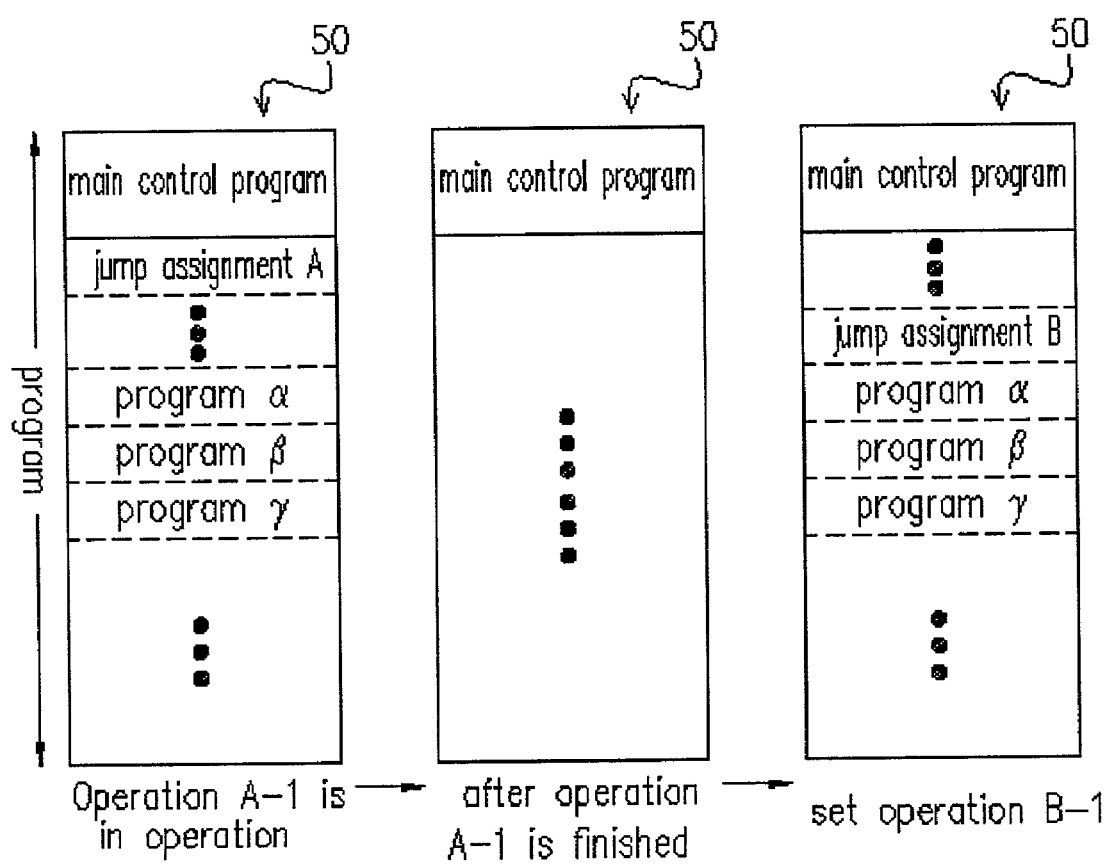
FIG. 42 shows the change of the status of the memory unit 50 corresponding to the sequence 1.
Figure 43:
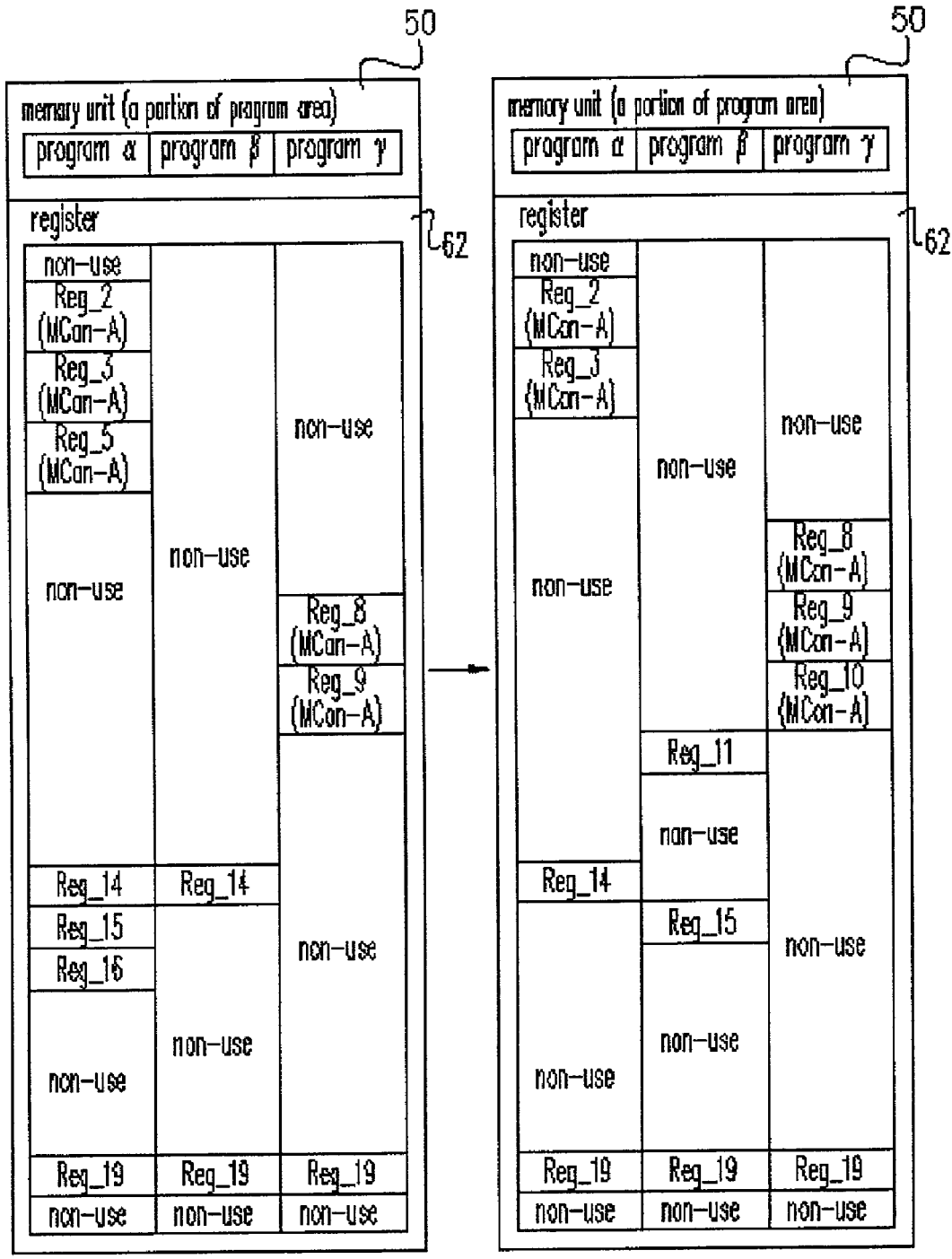
FIG. 43 shows the change of the status of the memory unit 50 corresponding to the sequence 1.

The status of the memory and the register acquisition corresponding to the sequence 1 is discussed. FIGS. 42 and 43 show the change of the status of the memory unit 50 corresponding to the sequence 1. In the sequence 1, the timings of the signal processes and the settings of the process requests A-1, B1 are not overlapped. Therefore, in the operation of the process request A-1, the program group, the jumping location, and the registers shown in FIG. 42 are assigned. In FIG. 42, the register assignment is omitted.

After the process request A-1 is finished, the program area is released. Afterwards, the programs corresponding to the process request B-1 are downloaded. Because the main control program assigns the operations according to the sequence shown in FIG. 8, the jump assignment A is referenced when the process request is the process request A-1 and the jump assignment B is referenced when the process request is the process request B-1. At this time, the use status (acquisition status) of the registers is shown in FIG. 43. Namely, because the timings of the process requests A-1 and B-1 are not overlapped, no competition occurs among the used registers and therefore the register control can become much easier.

In the above example, because the storage locations of the memory unit 50 and the register 62 for the process request A-1 and the process request B-1 are different, and the actual processing timings are not synchronous, the respective signal processes and the input/output can be performed in a non-synchronous manner. Next, the non-synchronous process is described. Namely, it describes a processor processing method that the process requests A-1, B-1 are input in the non-synchronous manner and then processed by the CPU 31 in parallel. Following describes that the process request B-1 is informed during the signal process of the process request A-1. Because the exemplary sequence (refer to the sequence 2) is shown in FIG. 10, and therefore this example is used as a description.

Figure 44:
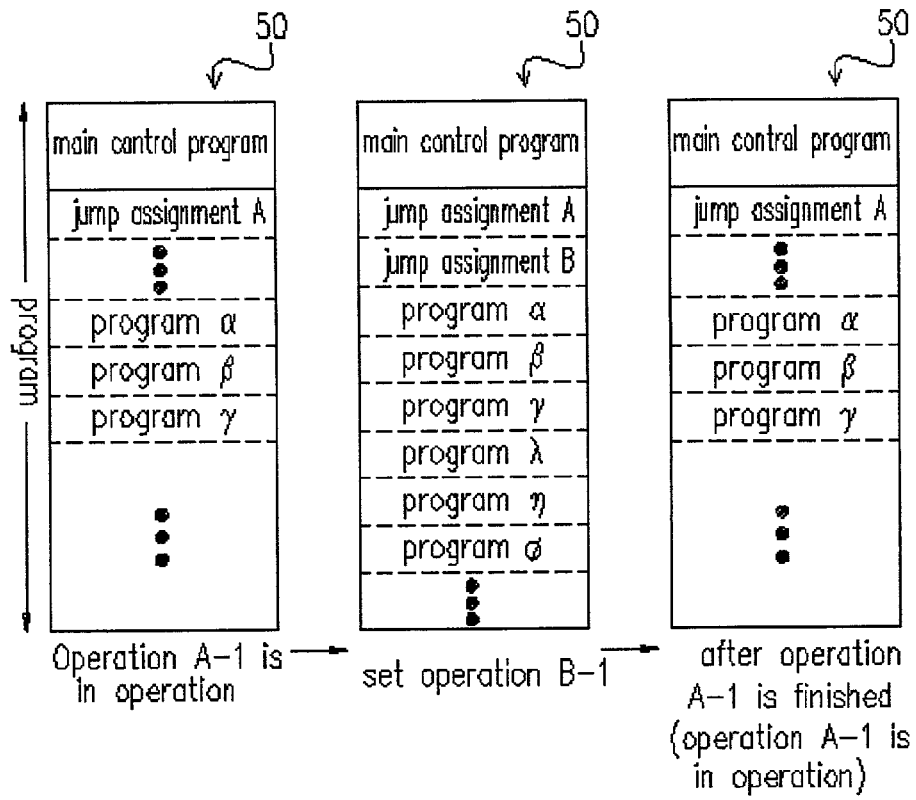
FIG. 44 shows the change of the status of the memory unit 50 corresponding to the sequence 2.
Figure 45:
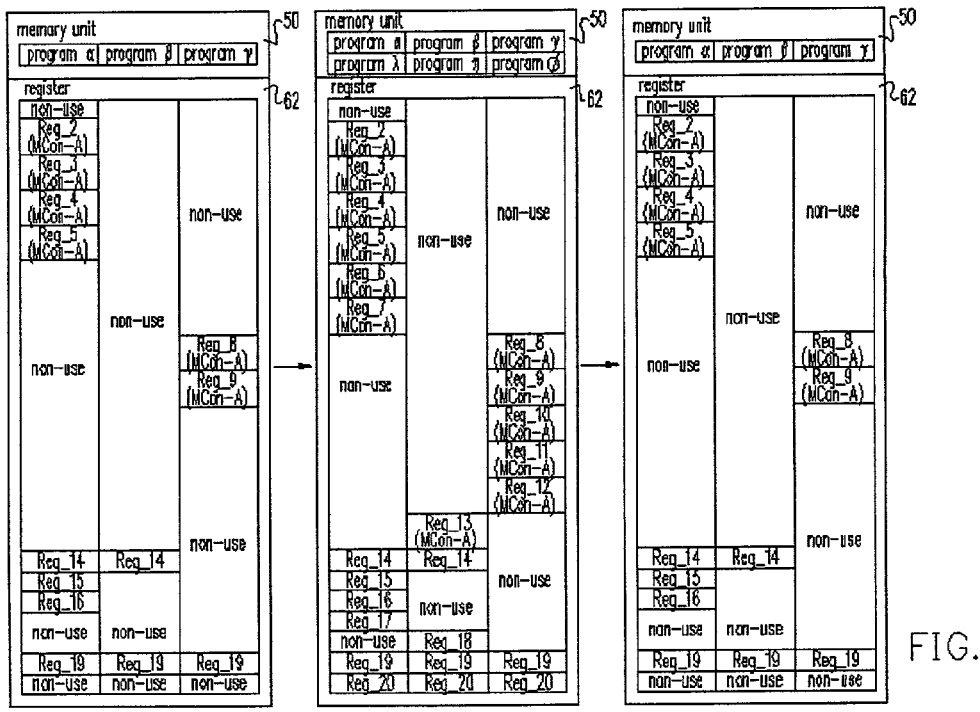
FIG. 45 shows the change of the status of the memory unit 50 corresponding to the sequence 2.

FIGS. 44 and 45 shows the change of the status of the memory unit 50 corresponding to the sequence 2. In this situation, because the process request B-1 is requested when the processes corresponding to the process request A-1 are in operation, the control program finds empty memory are other than the program area used by the process request A-1, and then downloads the program group corresponding to the process request B-1 (refer to FIG. 44). At this time, the jump assignment B is set, and the processes continue when the settings of the process request B-1 are finished. As the processing operations corresponding to the process request B-1 are finished, the memory area used by the process request B-1 is released. In addition, only the process request A-1 in operation remains.

As shown in FIG. 45, it corresponds to FIG. 44. Even if the process request B-1 is asserted when the process corresponding to the process request A-1 is in operation, because the empty region in the registers are searched for use, and therefore, the parallel process can be performed. In addition, the registers corresponding to the process request B-1 is marked by the thick lines in the drawing.

As described, the processor system 107 searches the empty region to effectively utilize the memory resource and the register resource. Additionally, plural process requests can be processed at the same time. In other words, the processor system 107 can efficiently execute the processes in parallel.

<<Twelfth Embodiment>>

The twelfth embodiment describes the transmission timing of the programs etc from the CPU to the DSP. Furthermore, in the twelfth embodiment, the same numerals are labeled to the same elements as in the first through the eleventh embodiments, and their corresponding descriptions are omitted.

Figure 46:
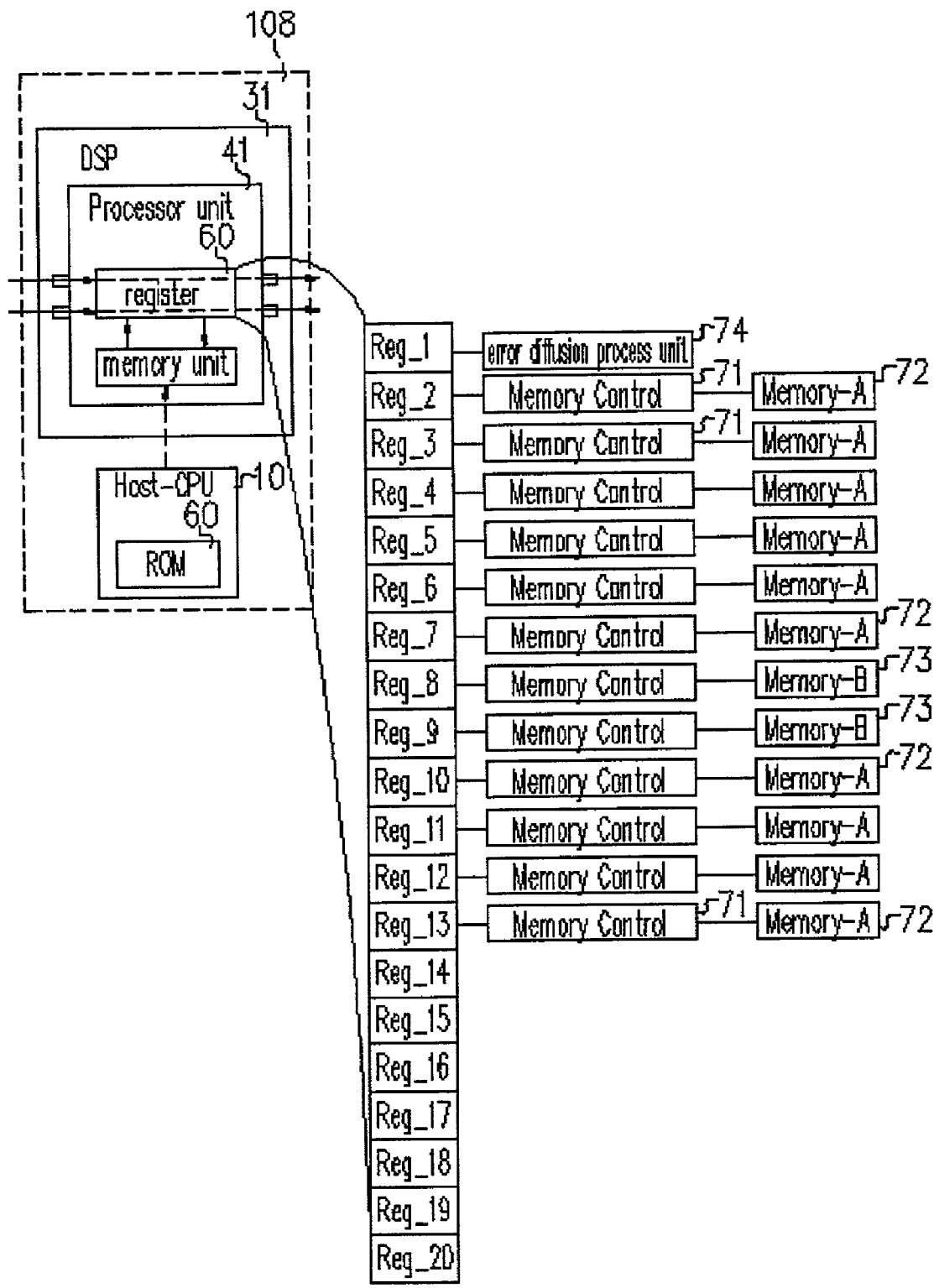
FIG. 46 shows a connection status of the registers in the processor system 108 according to the twelfth embodiment.

FIG. 46 shows a connection status of the registers in the processor system 108 according to the twelfth embodiment. Inside the CPU 10 is a ROM 20 to store the control program. The ROM 20 stores plural types of programs downloaded to the DSP 31 or control programs downloaded to the DSP 31. The CPU 10 performs the download to the DSP 31 during the boot process when the power is turned on, after the reset command is finished, or when receiving operation request randomly.

Similar to FIG. 4, the DSP 31 is composed of a processor having an interface of a two-system output for signal processes and a two-system input for signal processes. The DSP 31 consists of a register unit 60 in the processor unit 41 and a memory unit 50. The processor unit 41 uses the calculator etc to perform the actual signal input, the signal process and the signal output. The memory unit 50 stores programs that determine the operations of the processor unit 41. By downloading (transferring) programs to the memory unit 50, the DSP 31 performs various processes in sequence. Additionally, as shown, the register unit 60 consists of a plurality of registers 61 for storing the calculating results etc during the process by algorithmic methods.

Figure 47A:
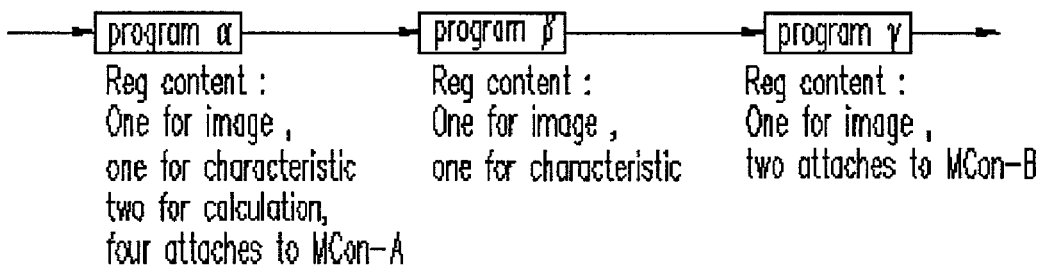
FIG. 47A shows that registers respectively required for exemplary programs α, β, γ corresponding to the process request A.
Figure 47B:
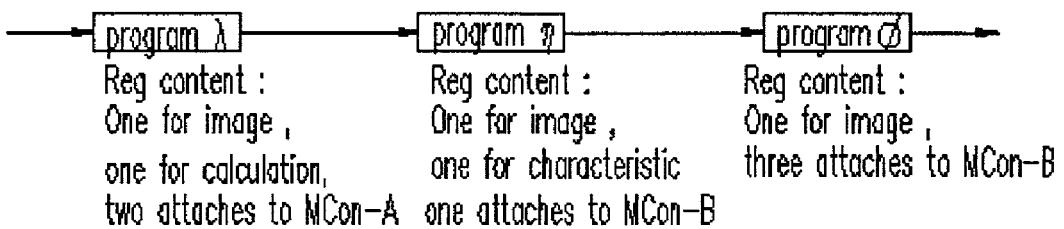
FIG. 47B shows that registers respectively required for exemplary programs λ, η, Φ corresponding to the process request B.

Following is a description of the relationship between the register and the program, and then the timing for downloading the programs is described. FIG. 47 uses two process requests to describe the relationship between the downloaded programs and the registers. FIG. 47A shows registers respectively required for exemplary programs α, β, γ corresponding to the process request A. Similarly, FIG. 47A shows registers respectively required for exemplary programs λ, η, Φ corresponding to the process request B. Furthermore, the present embodiment considers two exemplary sequences as shown in FIGS. 9 and 10, in which the exemplary sequences are referred to as the sequence 1 and the sequence 2.

Figure 48A:
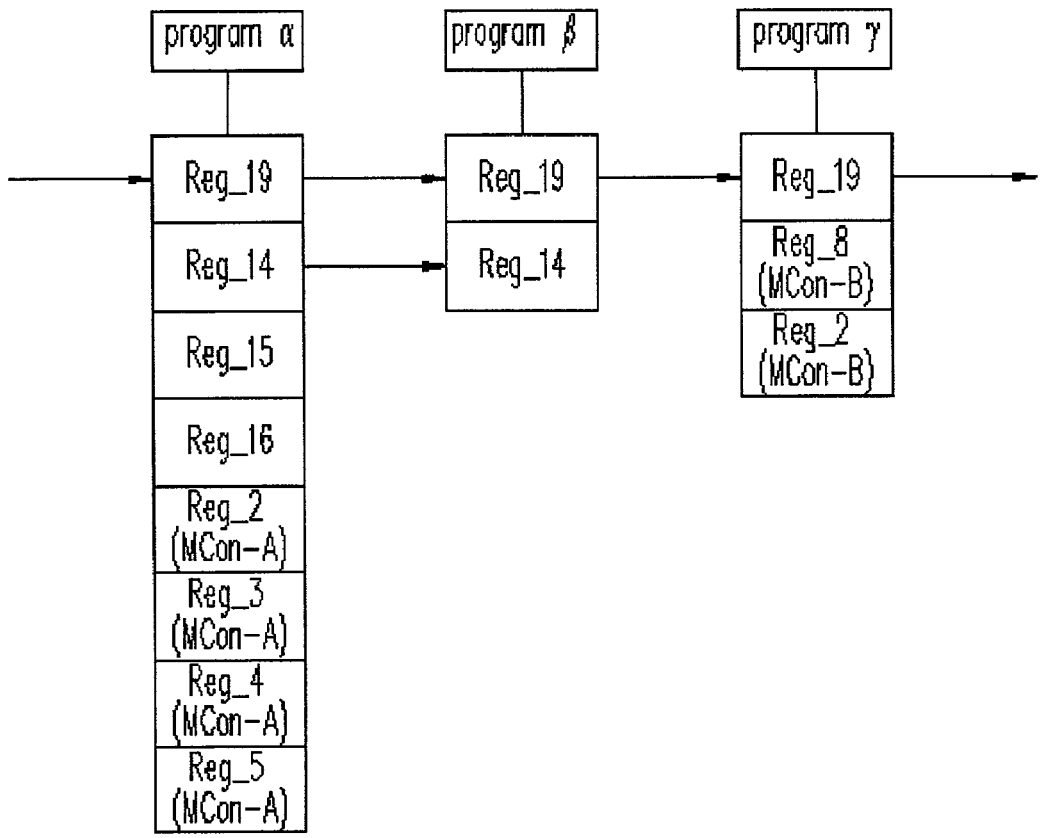
FIG. 48 is a diagram for explaining the relationship between the programs and the registers by an exemplary arrangement that explicitly shows the used registers.
Figure 48B:
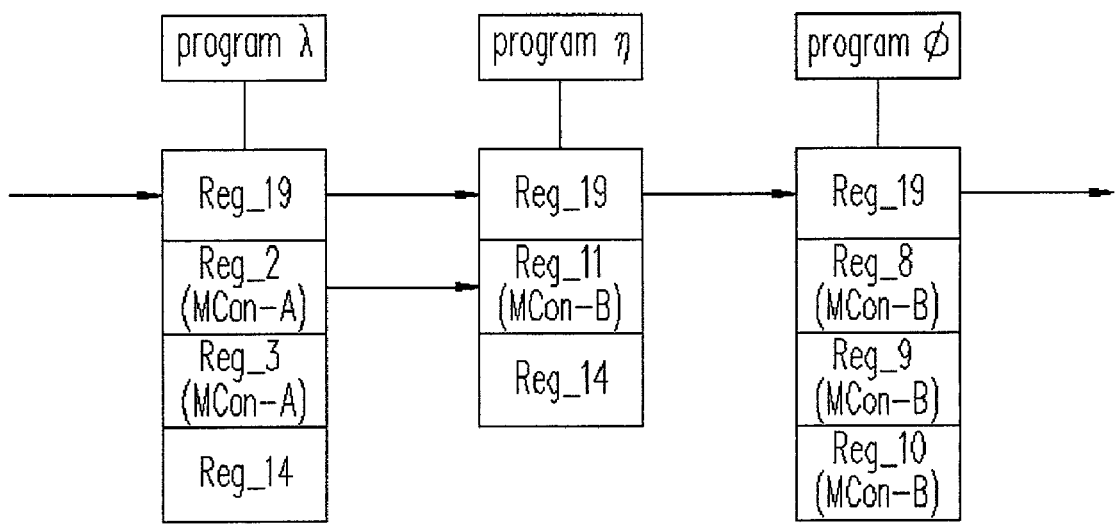

FIG. 48 is a diagram for explaining the relationship between the programs and the registers by an exemplary arrangement that explicitly shows the used registers. FIG. 48A is an arrangement where the process request A-1 similar to FIG. 42 is in operation. FIG. 48B is an arrangement where the process request B-1 similar to FIG. 44 is in operation. The detailed descriptions are omitted because they have been discussed in the above embodiments. However, as shown in the drawing, it can be understood that a portion of the registers corresponding to the process request are repeatedly used.

Figure 49:
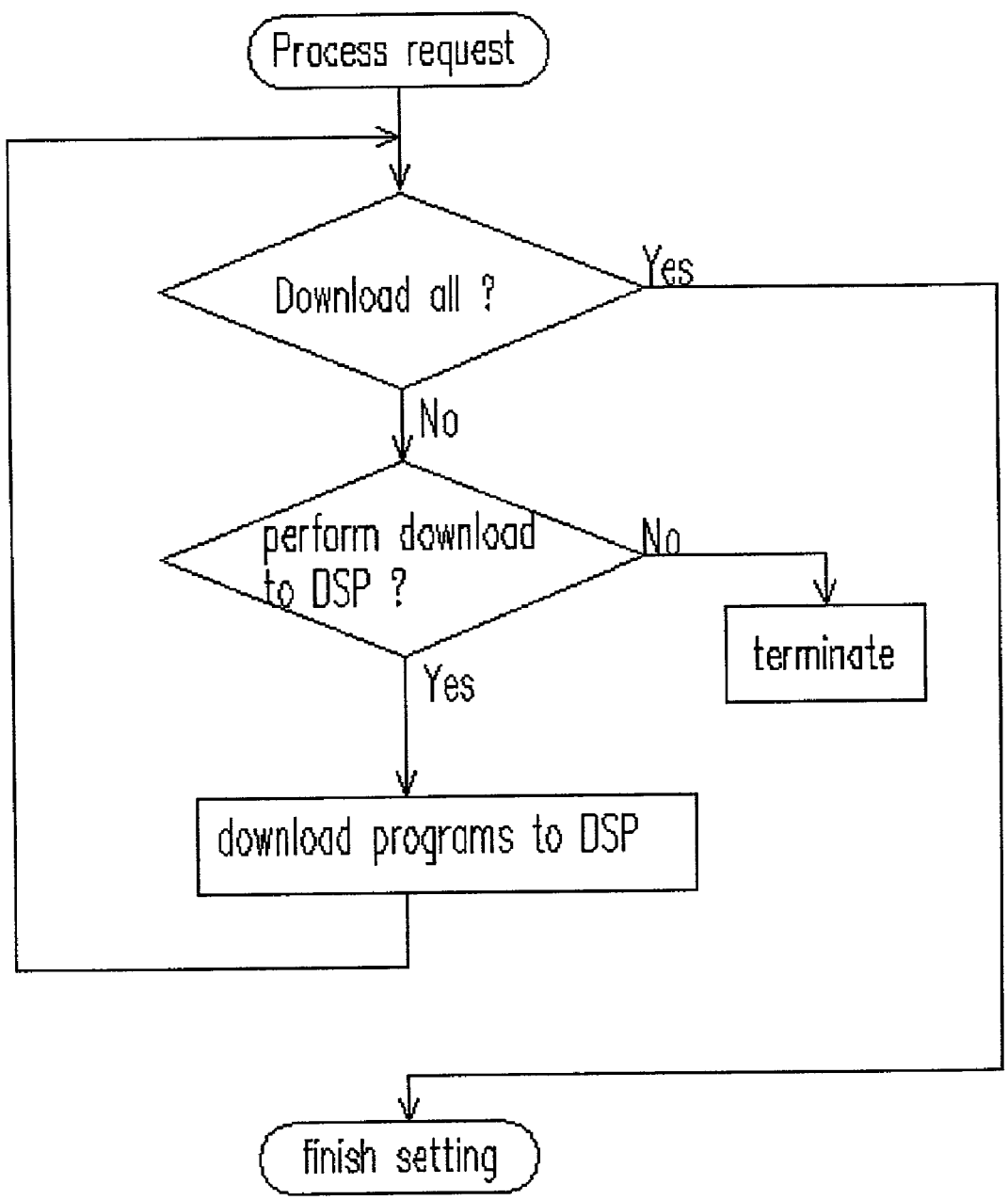
FIG. 49 is used for explaining the actual download sequence and the determination for acquiring the resources of the DSP 31.

FIG. 49 is used for explaining the actual download sequence and the determination for acquiring the resources of the DSP 31. The CPU 10 grasps the acquisition status of the resources during the operation of the DSP to determine whether the program group and the required parameters should be downloaded when a process request is requested. Namely, the CPU 10 determines whether the program group and the data required for performing the process request should be downloaded or not, according to the current operational status of the register unit 60 or the memory unit 50.

When the process request B-1 is asserted during the operation of the process request A-1, as shown in FIG. 47, the required resources are the programs λ, η, Φ and their corresponding registers. Considering the program λ first, at this time, the download control program determines whether the transfer of the program λ, two registers attached to the MCon-A, one register for calculation, and one register for image is possible or not. If possible, the resources are downloaded and set. Next, regarding the program η, the download control program determines whether the transfer of the program η, one register attached to the MCon-A, one register for calculation, and one register for image is possible or not. If possible, the resources are downloaded and set. Next, regarding the program Φ, similar download and setting are performed.

Figure 50:
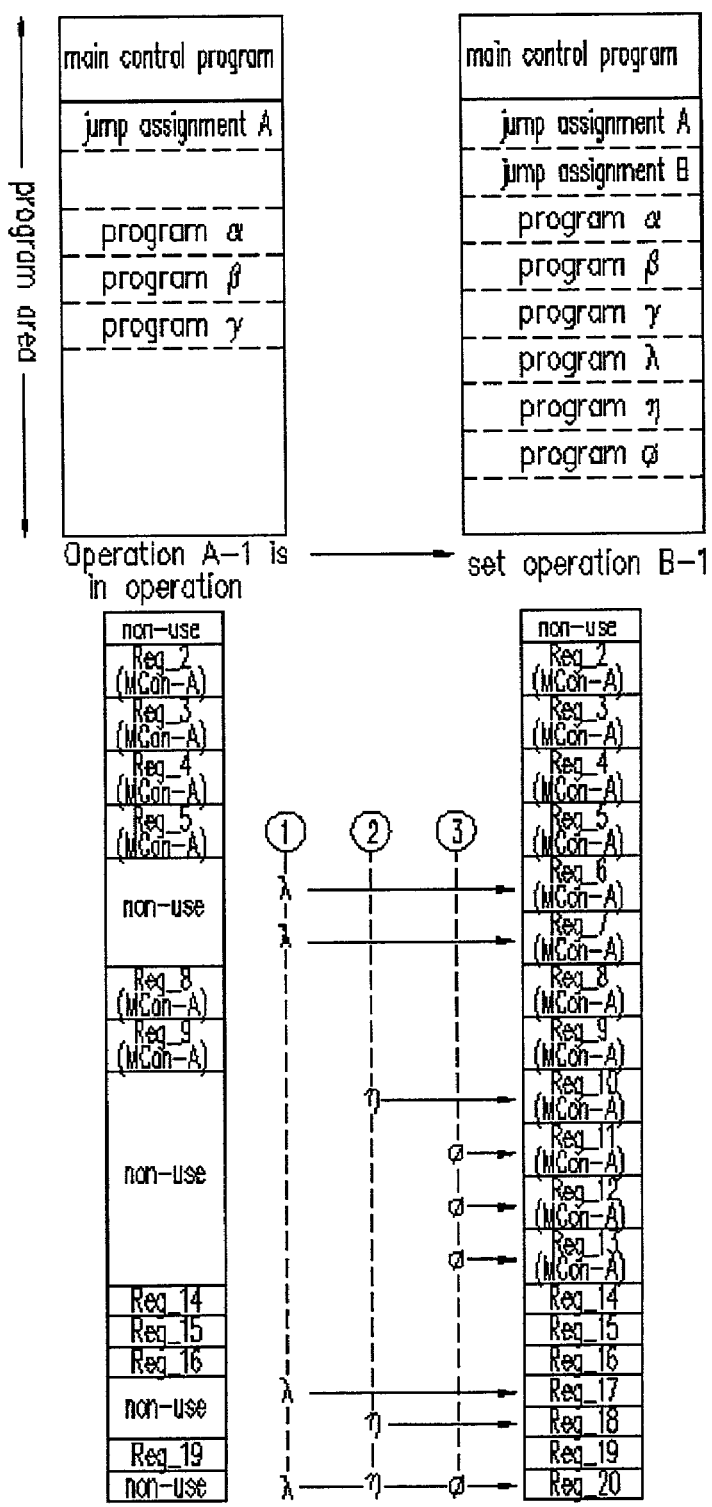
FIG. 50 is a diagram for showing timing of the above download.

Because the resources required for the process request A-1 are satisfied, the setting is finished. Additionally, when the download cannot be performed, whether the operation for the process request is impossible is determined, and then the process is terminated. At this time, a necessary warning can be output to the upstream process unit and the downstream process unit. FIG. 50 is a diagram for showing timing of the above download. As shown, to process the process request, the download determines each required program each time. Moreover, at this time, the required parameters can be downloaded each time.

<<Thirteenth Embodiment>>

The thirteen embodiment describes a structure of a processor system having a plurality of DSPs, and then describes the timing for transferring the programs etc from the CPU to the DSP. Additionally, in the thirteenth embodiment, the same numerals are labeled to the same elements as in the first through the twelfth embodiments, and their corresponding descriptions are omitted.

Figure 51:
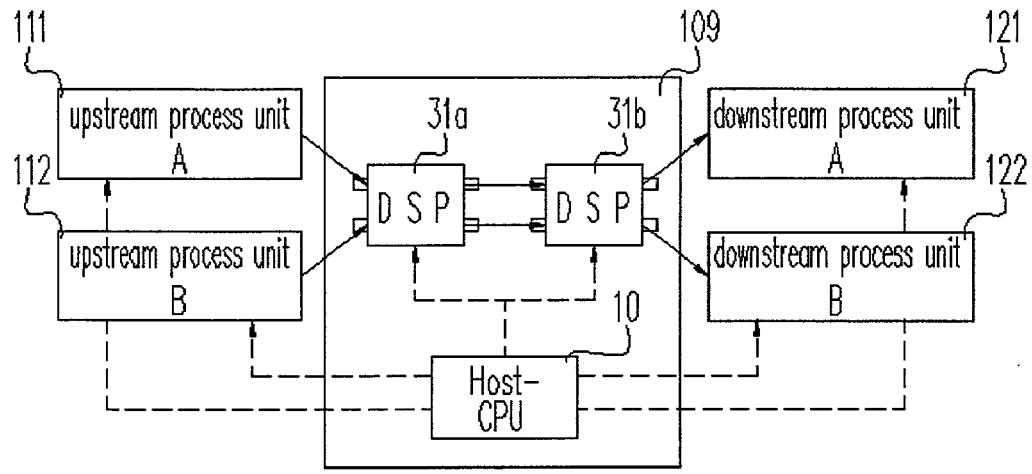
FIG. 51 shows an exemplary structure of the processor system suitable for the processor processing method according to the thirteenth embodiment.

FIG. 51 shows an exemplary structure of the processor system suitable for the processor processing method according to the thirteenth embodiment. The processor system 109 is a system having a plurality of DSPs 31 (31a, 31b, for example). In the following paragraphs, the DSP near the upstream side is referred to the DSP 31a, and the DSP near the downstream side is referred to the DSP 31b.

The CPU 10 performs required settings to the upstream process unit A 111, the upstream process unit B 112, the down stream process unit A 121 and the downstream process unit 122. Additionally, the settings of the download of the programs corresponding to the process request or the registers are performed to the DSP 31a and the DSP 31b. The upstream process unit A 111 and the upstream process unit B 112 receive settings from the CPU 10, and perform required operations when there is a process request so that the signals or data is output to the DSP 31a. The downstream process unit A 121 and the downstream process unit B 122 receive settings from the CPU 10, and then perform required operations when receiving signal or data from the DSP 31b.

The DSP 31a downloads the programs from the CPU 10 and sets the registers. As receiving signals from the upstream process unit A 111 and the upstream process unit B 112, the signal process is performed according to the downloaded programs. The DSP 31b downloads the programs from the CPU 10 and sets the registers. After receiving signals or data processed by the DSP 31a, the signal process is performed according to the downloaded programs. Then, the processed signals or data is output to both or one of the downstream process unit A 121 and the downstream process B 122.

Figure 52:
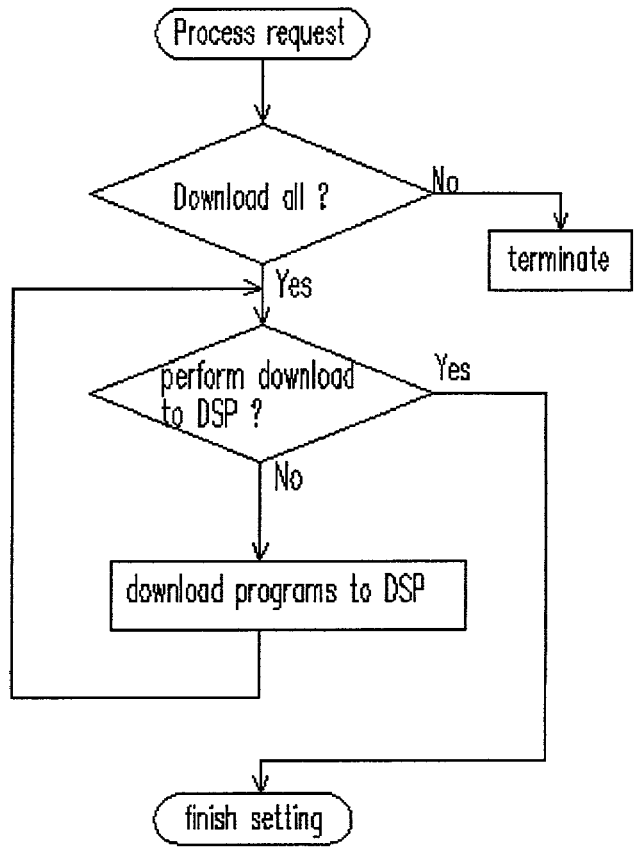
FIG. 52 describes the determination for acquiring the resources of the DSP 31 and the actual download sequence.

FIG. 52 describes the determination for acquiring the resources of the DSP 31 and the actual download sequence. The CPU 10 grasps the acquisition status of the resources when the DSP 31 is in operation to determine whether the program group and the required parameters should be downloaded when a process request is requested. Namely, the CPU 10 determines whether the program group and the data required for performing the process request should be downloaded or not, according to the internal status of the DSP 31 at that time.

Figure 53:
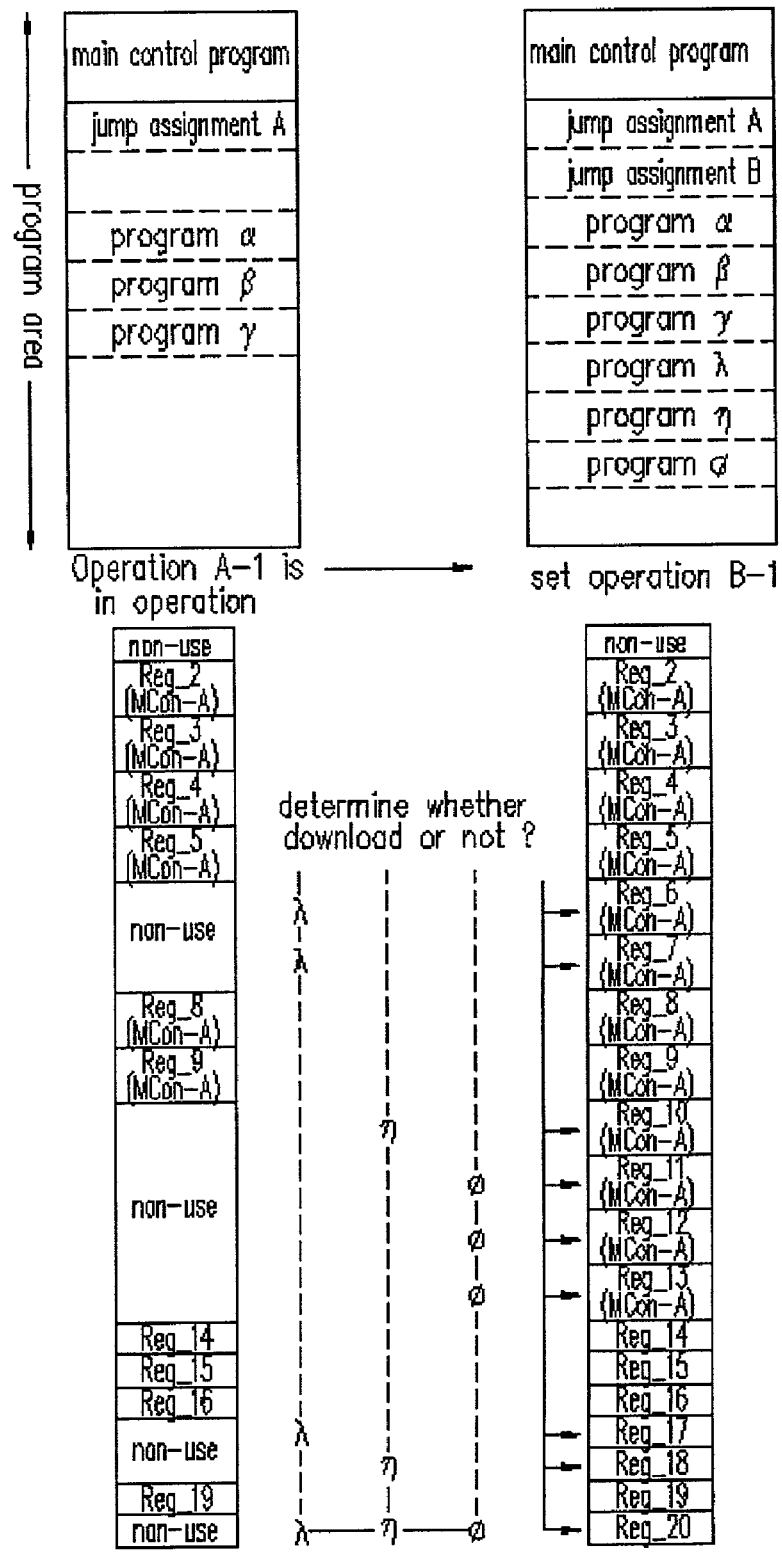
FIG. 53 describes the timing for transferring the programs.

In this situation, the processor system 109 determines which DSP all programs are downloaded to, and then the download process is performed. FIG. 53 describes the timing for transferring the programs. When the process request B-1 occurs when the process request A is in operation, the required resources are the programs λ, η, Φ and their related registers.

At this time, considering the program λ first, the download control program determines whether the transfer of the program λ, two registers attached to the MCon-A, one register for calculation, and one register for image is possible or not. If possible, regarding the program η, the down load control program determines whether the transfer of the program η, one register attached to the MCon-A, one register for calculation, and one register for image is possible or not. Furthermore, the same determination is made to the program Φ. When the status is determined that all resources can be acquired at the beginning, the download and setting related to all programs and registers are performed. In addition, if a negative decision is made for the determination of the download, all downloads to the DSP 31 are not performed and the processes are terminated.

As described above, the processor controlling method for determining whether all the programs related to the process request and the required parameters are possible to be transferred is very useful when the program size is large, the download loading to the DSP 31 is large, and time is limited, for example. In particular, the method is useful when a plurality of DSPs are used.

The processor processing methods described in the above embodiments have to consider various general purposes. On the other hand, the program downloaded to the DSP has to be customized to use according to the processor format or content. Namely, when special operations are requested, in addition to the general known languages, assembler etc can be used. Moreover, through the content of the compiler, because the expected function is not satisfied, the function can be complemented by the control software of the CPU when downloading.

Figure 54:
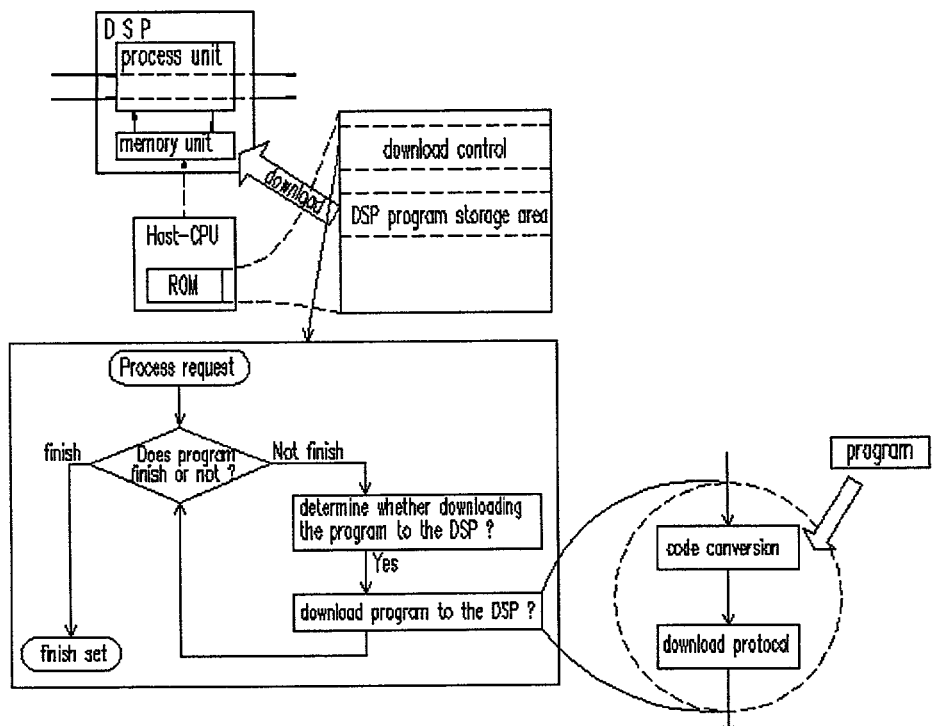
FIG. 54 explains the concept of the code conversion. This process is a method that the program is converted by the processor in advance and then downloaded to the DSP.

For example, as described above, when the download of the programs and the registers is freely determined, it is possible that the assigned registers preset by the programs cannot be used. Therefore, in this situation, the register settings of the program may need to be changed. The degree of freedom of the download can be maintained by performing the change by the code converting device when the program of the CPU is downloaded. FIG. 54 explains the concept of the code conversion. This process is a method where the program is converted by the processor in advance and then downloaded to the DSP.

Figure 55:
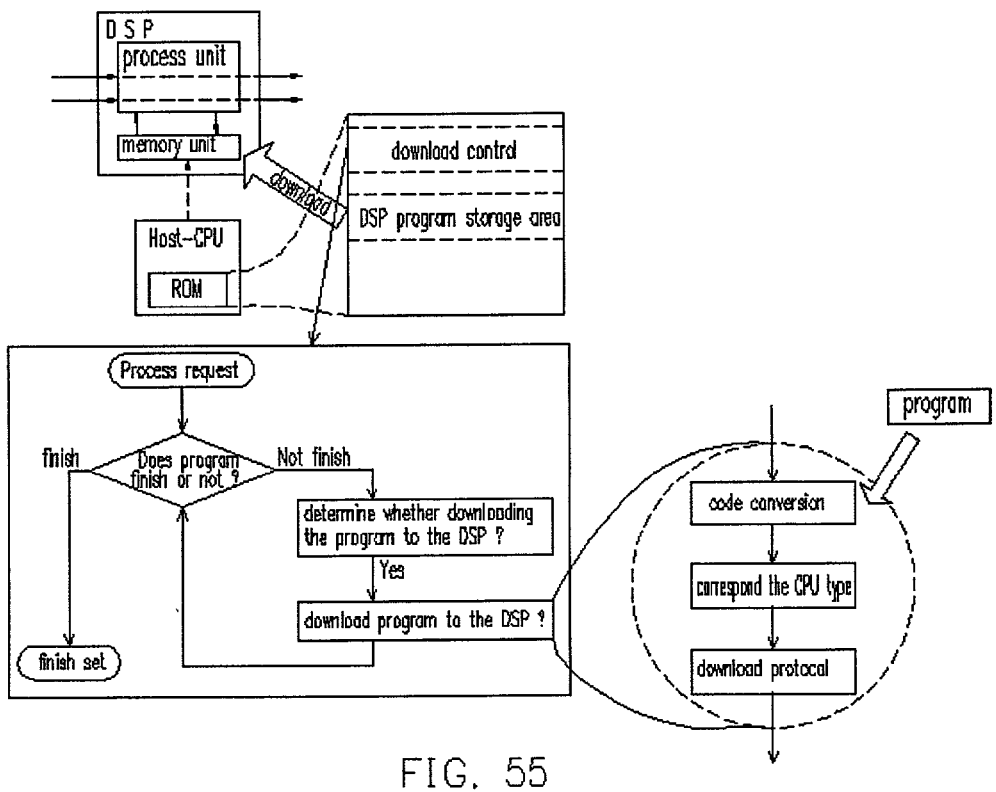
FIG. 55 shows the concept of the CPU correspondence.
Figure 56:
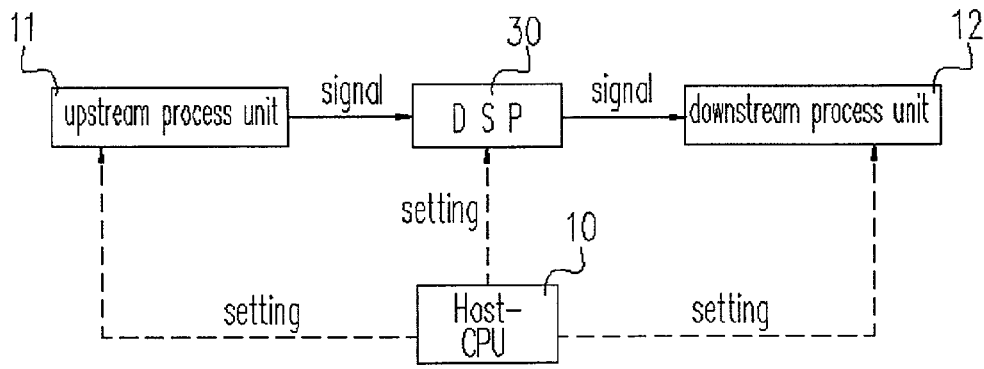
FIG. 56 is a diagram for explaining the configuration of a DSP system.
Figure 57:
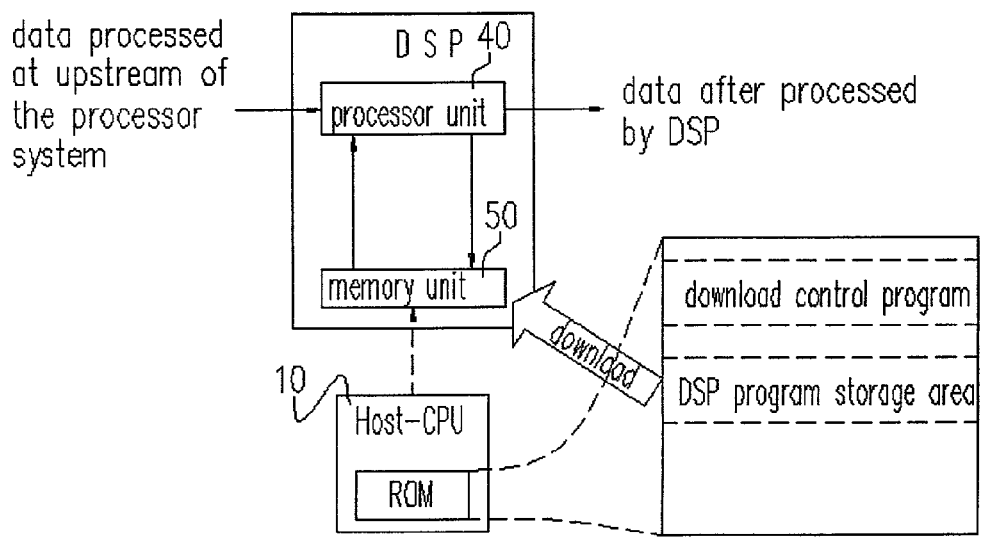
FIG. 57 is an exemplary structure of the CPU 10 and the DSP 30.
Figure 58:
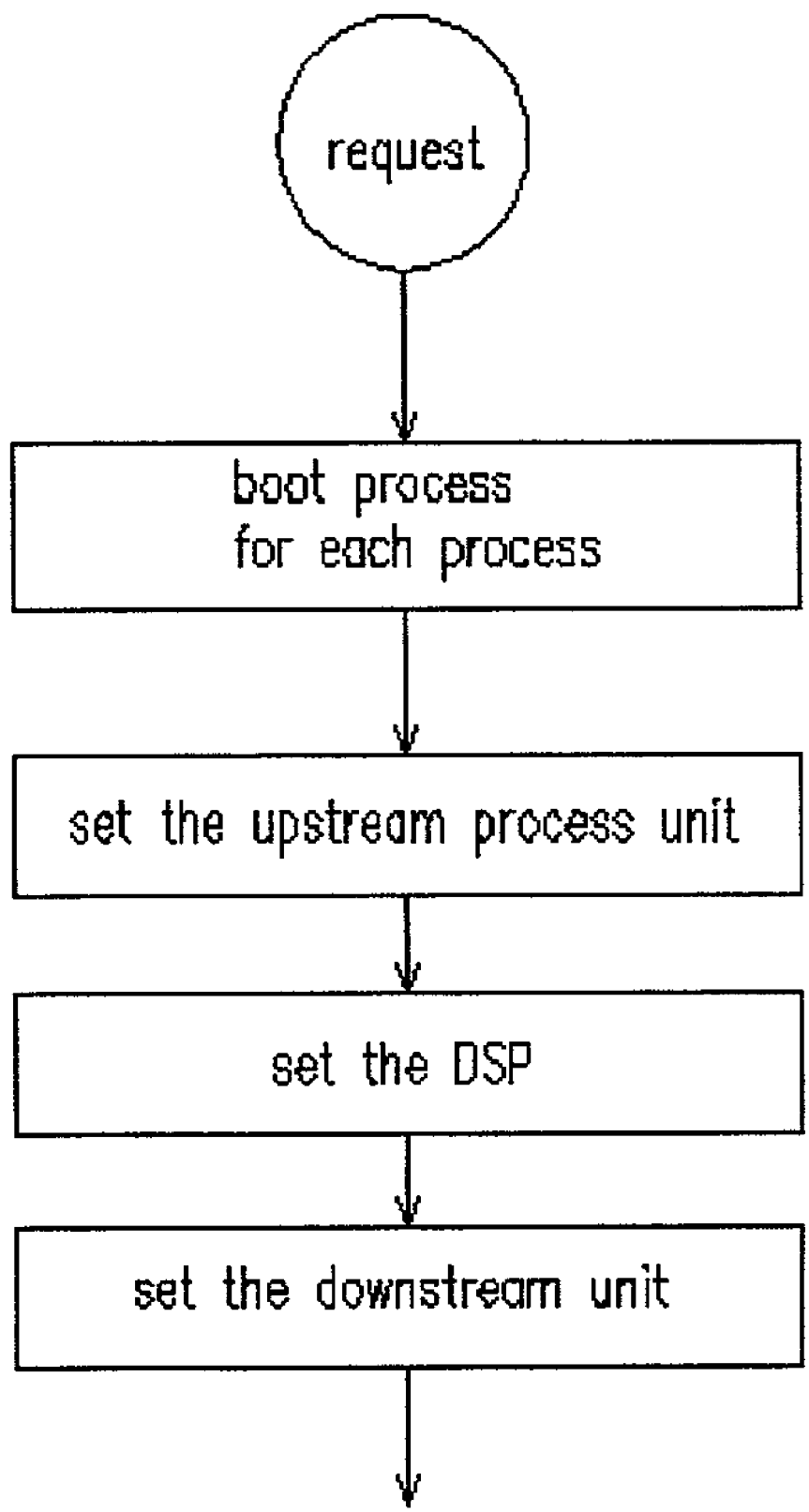
FIG. 58 is a flow chart describing the setting process of the CPU 10.
Figure 59:
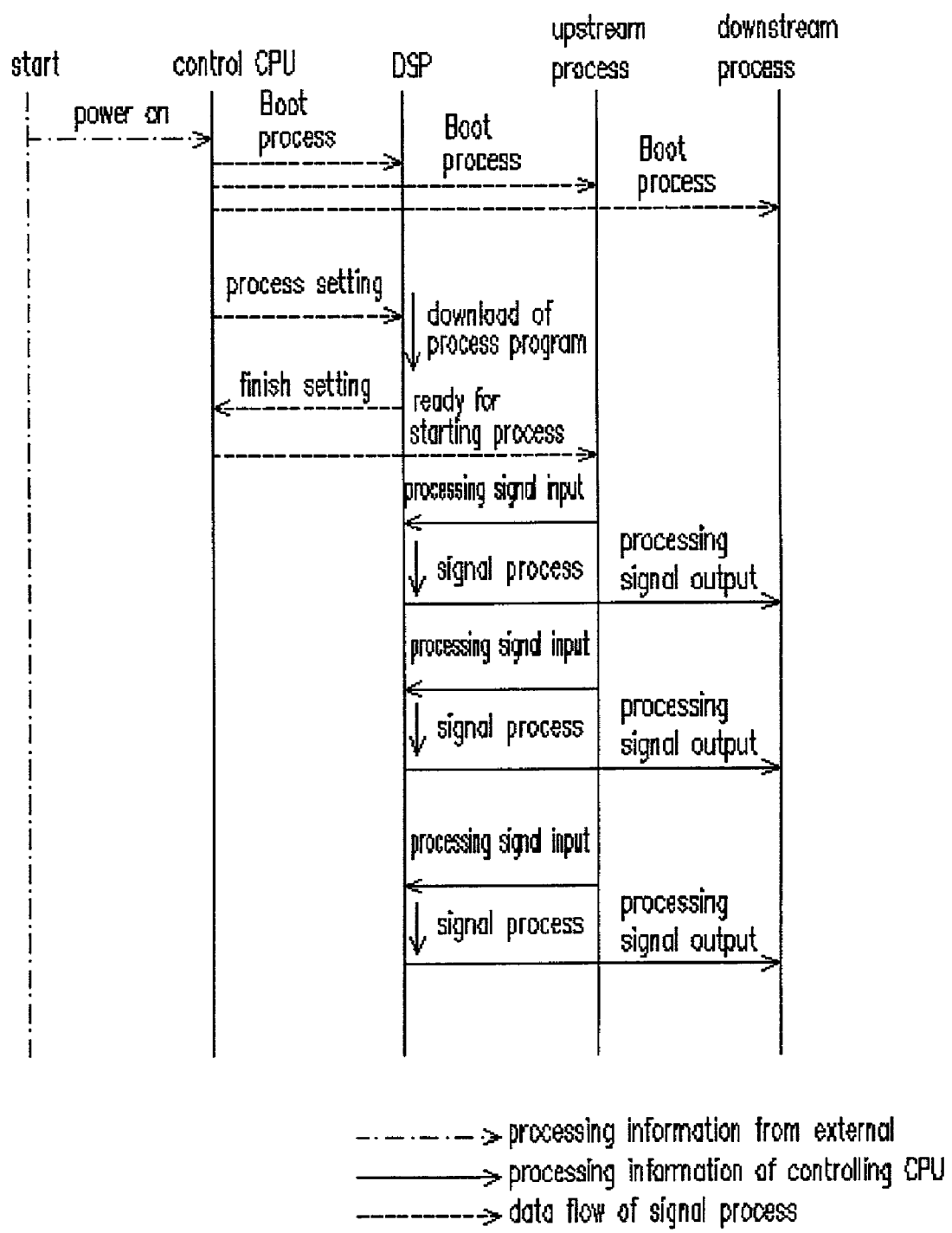
FIG. 59 shows the sequence when the system in FIG. 35 is actually operating.

In addition, when the CPU is replaced, the position of the data bit is different due to the CPU maker. Therefore, a pattern for bit conversion should be prepared, and is made available during the aforementioned code conversion, thereby the CPU format is not an issue. The program downloaded to the DSP can be reused. FIG. 55 shows the concept of the CPU correspondence. Because the conversion due to the processor corresponds to the code format that is dependent on the CPU, a general system that is independent on the code format of the CPU is possible.

Accordingly, the invention provides a processor processing method, suitable for a processor system, wherein the processor system comprises a CPU, a ROM coupled to the CPU, and a DSP having a memory unit for storing programs and a processor unit for processing data according to the programs. The method comprises the following steps. A plurality of programs and parameters required for processing the programs is stored to the ROM. An initial program is downloaded from the CPU to the memory unit of the DSP when power is turned on. The programs and the parameters corresponding to each process request from the system processor external are transferred from the ROM to the memory unit of the DSP. The data to be processed is input from the system processor external to the DSP. The data is processed by the processor unit based on the programs and the parameters that are transferred to the memory unit. The processed data is output to the system processor external. Therefore, the design can be easily changed only by replacing the ROM. In addition, the process varieties of the DSP are increased.

In addition, the method further comprises steps of: storing a plurality of programs corresponding to types of process requests; receiving the process request by the CPU at any time, and then transferring the programs and the parameters corresponding to the respective process requests from the ROM to the memory unit of the DSP; acquiring the data of a plurality of input/output interfaces respectively, wherein the DSP has the input/output interfaces corresponding to the data; processing the data by the processor unit based on the programs and the parameters that are transferred to the memory unit; and outputting the data to the system processor external through the input/output interfaces. Therefore, the process request can be received immediately, and then plural types of processes can be parallel performed by the DSP.

The method further comprising: preparing a table corresponding to the process requests and program groups required for processing the process requests; and determining program groups to be transferred to the DSP and required parameters by the CPU by referring to the table according to the process requests. Accordingly, it is easy to determine which program can process the process request. The CPU can transfer the whole program group to the DSP with a high speed.

The table is stored in the ROM. Therefore, all elements for changing the design can be integrated into the ROM chip, and processing of varieties of DSP are conveniently increased.

The method further comprises detecting a memory use status of the memory unit of the DSP by the CPU; searching empty regions in the memory unit; and transferring the programs and the required parameters corresponding to each process request from the ROM to the empty regions in the memory unit. Therefore, the memory resource can be effectively utilized.

The method further comprises: holding a history of the process requests by the CPU; determining whether each coming process request from the system processor external is consistent with past process requests; transferring required different programs and required different parameters from the ROM to the memory unit of the DSP to process the coming request by referring to the table if the coming process request is not consistent with the past process request; using the programs and parameters that have been transferred to the memory unit of the DSP if the coming process request is consistent with the past process request, and then processing the data by the processor unit and outputting the data to the system processor external; and using the different programs and the different parameters as well as the programs and parameters that have been transferred to the memory unit of the DSP to process the data by the processor unit and then to output the data to the system processor external, if the different programs and the different parameters are transferred. Accordingly, the transferring time can be reduced, and the processing time of the DSP can be also reduced.

The method further comprises: detecting a memory use status of the memory unit of the DSP by the CPU; searching empty regions in the memory unit, and then transferring the different programs and the required parameters from the ROM to the empty regions in the memory unit; and referring the history of the process requests to ask the DSP to release regions where the programs are not used if there are no empty regions, and then transferring the different programs and the required parameters from the ROM to the released regions in the memory unit. Accordingly, the transferring time can be reduced, and the processing time of the DSP can be also reduced.

The method further comprises: detecting a memory use status of the memory unit of the DSP and a register use status of the register unit of the processor unit by the CPU; and distributing and transferring the programs and the required parameters corresponding to each process request from the ROM to empty regions in the memory unit and empty regions in the registers of the register unit of the processor unit. Therefore, the memory resource and the register resource can be effectively utilized.

The method further comprises: holding a history of the process requests by the CPU; determining whether each coming process request from the external of the processor system is consistent with past process requests; distributing and transferring required different programs and required different parameters from the ROM to the memory unit of the DSP and a register unit of the processor unit to process the coming request by referring to the table if the coming process request is not consistent with the past process request; using the programs and parameters that have been transferred to the memory unit of the DSP if the coming process request is consistent with the past process request, and then processing the data by the processor unit and outputting the data to the external of the processor system; and using the different programs and the different parameters as well as the programs and parameters that have been transferred to the memory unit of the DSP to process the data by the processor unit and then to output the data to the system processor external, if the different programs and the different parameters are transferred. As a result, the transferring time can be reduced, and the processing time of the DSP can be also reduced.

The method further comprises: detecting a memory use status of the memory unit of the DSP and a register use status of the register unit of the processor unit by the CPU; distributing and transferring the different programs and the required parameters from the ROM to empty regions in the memory unit and empty regions in the register unit of the processor unit; and referring to the history of the process requests to ask the DSP to release regions where the programs are not used if there are no empty regions, and then transferring the different programs and the required parameters from the ROM to the released regions in the memory unit and the released regions in the register unit of the processor unit. As a result, the transferring time can be reduced, and the processing time of the DSP can be also reduced.

As mentioned, the CPU holds the history if the past process requests. The processing time of the DSP can be reduced when there are routine works.

The register unit of the processor unit is connected to line memories, an image processing hardware, or an audio processing hardware. Therefore, the complicated processes can be performed conveniently at a high speed.

The transfer of the programs required from the CPU to the DSP is performed each time when the respective required program to process the process request is determined. Therefore, the downloaded programs can become more generalized. The CPU can transfer the whole program group to the DSP at a high speed.

The transfer of the programs required from the CPU to the DSP is performed once after the required program group to process the process request is determined. Therefore, the downloaded programs can become more general. The CPU can transfer the whole program group to the DSP at a high speed.

The invention further provides a processor system, consisting of a CPU and a DSP to perform plural data processes with respect to data, and to execute functions for different applications. The CPU further comprises a ROM coupled to the CPU, for storing programs corresponding to a plurality of processes respectively, and parameters used by the program; a process request input device, for inputting process requests to start processes to execute the functions; a determining device, for determining process combinations to be processed by the DSP and required parameters according to the process requests input from the process request input device; and a transferring device, for transferring programs related to the process combinations, and the parameters, which are determined by the determining device from the programs and parameters stored in the ROM, to the DSP. The DSP further comprises a data input device for inputting the data; a RAM for storing the programs and parameters transferred from the CPU; a processing device, for performing a series of processes to the data input from the data input device, according to the programs and parameters stored in the RAM, and therefore to execute the functions corresponding to applications. The design can be easily changed by only replacing the ROM, and the process varieties of the DSP can be increased.

The invention further provides a processor system, consisting of a CPU and a DSP to perform plural data processes with respect to data, and to execute functions for different applications. The CPU further comprises a ROM coupled to the CPU, for storing programs corresponding to a plurality of processes respectively, and parameters used by the program; a process request input device, for inputting process requests to start processes to execute the functions; a determining device, for determining process combinations to be processed by the DSP and required parameters according to the process requests input from the process request input device; and a transferring device, for transferring programs related to the process combinations, and the parameters, which are determined by the determining device from the programs and parameters stored in the ROM, to the DSP. The DSP further comprises a data input device for inputting the data; a RAM and a register unit for storing the programs and parameters transferred from the CPU; a processing device, for performing a series of processes to the data input from the data input device, according to the programs and parameters stored in the RAM through the register unit, and therefore to execute the functions corresponding to applications. The design can be easily changed only by replacing the ROM, and the processing varieties of DSP can be increased.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A method of processing with a processor system coupled to first and second external system processors, wherein the processor system comprises a CPU including a ROM, and a DSP having a memory unit for storing programs and a processor unit for processing data according to the programs, the method comprising the steps of:
   storing a plurality of programs and a plurality of parameters in the ROM, at least one of said plurality of parameters used for processing at least one of the plurality of programs;
   downloading an initial program from the CPU to the memory unit of the DSP when a power is turned on;
   transferring a first program and a first parameter from the ROM to the memory unit of the DSP, said first program and first parameter corresponding to a first process request originating from the first external system processor;
   inputting first data to the processor unit of the DSP from the first external system processor;
   processing the first data by the processor unit of the DSP based on the first program and the first parameter;
   outputting first processed data to a second external system processor;
   transferring a second program and a second parameter corresponding from the ROM to the memory unit of the DSP, said second program and second parameter corresponding to a second process request originating from the first external system processor, said transferring a second program and a second parameter occurring without having to re-perform said downloading step;
   inputting second data to the processor unit of the DSP from the first external system processor;
   processing the second data by the processor unit of the DSP based on the second program and the second parameter; and
   outputting second processed data to a second external system processor, said method further comprising:
   holding a history of process requests by the CPU;
   determining whether an incoming process request from the first external system processor is consistent with a past process request; and
   performing at least one of
      transferring a program and a parameter corresponding to said incoming process request from the ROM to the memory unit of the DSP if the incoming process request is not consistent with the past process request, and then processing corresponding incoming data; and
      processing said corresponding incoming data with a program and a parameter that has previously been transferred to the memory unit of the DSP if the incoming process request is consistent with the past process request.

2. The method of claim 1, wherein:
said step of storing a plurality of programs and a plurality of parameters comprises storing in accordance with a type of process request, said method further comprising:
acquiring data corresponding to a plurality of input/output interfaces of the DSP, respectively; and
processing the acquired data by the processor unit.

3. The method of claim 2, further comprising:
preparing a table corresponding to the type of process request and a program group used for processing the type of process request; and
determining program groups and required parameters to be transferred to the DSP by the CPU by referring to the table.

4. The method of claim 3, wherein the table is stored in the ROM.

5. The method of claim 1, further comprising:
determining a memory use status of the memory unit of the DSP by the CPU;
locating an empty region in the memory unit; and
transferring one of said first program, said second programs, said first parameter, and second parameter from the ROM to the empty region in the memory unit.

6. The method of claim 1, further comprising
determining a memory use status of the memory unit of the DSP by the CPU; and at least one of
   locating an empty region in the memory unit, and then transferring said program and said parameter corresponding to said incoming process request from the ROM to the empty region in the memory unit; and
   referring to the history of the process requests to instruct the DSP to release a region containing a program and a parameter not being used if said step of locating an empty region identifies there are no empty regions, and then transferring said program and said parameter corresponding to said incoming process request from the ROM to the released region.

7. The method of claim 1, further comprising:
detecting a memory use status of the memory unit of the DSP and a register use status of a register unit of the processor unit by the CPU; wherein
at least one of said step of transferring a first program and a first parameter and said step of transferring a second program and a second parameter includes transferring to at least one of an empty region in the memory unit and an empty region in the register unit of the processor unit.

8. The method of claim 3, further comprising:
holding a history of process requests;
determining whether an incoming process request from the first external system processor is consistent with a past process request;
referring to said table and performing at least one of
transferring a program and a parameter corresponding to said incoming process request from the ROM to at least one of the memory unit and a register of the DSP if the incoming process request is not consistent with the past process request, and then processing corresponding incoming data; and
processing said corresponding incoming data with a program and a parameter that has previously been transferred to the memory unit of the DSP if the incoming process request is consistent with the past process request.

9. The method of claim 8, further comprising:
determining, by the CPU, a memory use status of the memory unit and a register use status of a register of the DSP; and at least one of
locating an empty region in the memory unit and in the register, and then transferring said program and said parameter corresponding to said incoming process request from the ROM to the empty regions located in the memory unit and the register; and
referring to the history of the process requests to instruct the DSP to release a region in the memory unit and a region in the register where a program and a parameter is not being used if said step of locating an empty region identifies there are no empty regions in the memory unit and in the register, and then transferring at least one of said program and said parameter corresponding to said incoming process request from the ROM to the released regions in the memory unit and in the register.

10. The method of any one of claims 1, 7, 8 or 9, wherein the CPU holds the history if the past process requests one time.

11. The method of claim 7, wherein the register unit of the processor unit is connected to line memories, an image processing hardware, or an audio processing hardware.

12. The method of claim 6, wherein the transfer of the programs required from the CPU to the DSP is performed each time when the respective required program to process the process request is determined each time.

13. The method of claim 6, wherein the transfer of the programs required from the CPU to the DSP is performed once after the required program group to process the process request is determined.

14. A processor configured to be coupled to first and second external system processors, said processor comprising:
a CPU including a ROM; and
a DSP having a memory unit for storing programs and a processor unit for processing data according to the programs, wherein:
the CPU is configured
to store a plurality of programs and a plurality of parameters in the ROM, at least one of said plurality of parameters used for processing at least one of the plurality of programs;
to download an initial program to the memory unit of the DSP when a power is turned on;
to transfer a first program and a first parameter from the ROM to the memory unit of the DSP, said first program and first parameter corresponding to a first process request originating from the first external system processor;
to transfer, without having to download said initial program, a second program and a second parameter corresponding from the ROM to the memory unit of the DSP, said second program and second parameter corresponding to a second process request originating from the first external system processor; and
said DSP is configured to
input first data to the processor unit of the DSP from the first external system processor;
process the first data by the processor unit of the DSP based on the first program and the first parameter;
to output first processed data to a second external system processor;
to input second data to the processor unit of the DSP from the first external system processor;
to process the second data by the processor unit of the DSP based on the second program and the second parameter; and
to output second processed data to a second external system processor;
wherein said CPU is further configured to
hold a history of process requests by the CPU;
determine whether an incoming process request from the first external system processor is consistent with a past process request; perform at least one of
transferring a program and a parameter corresponding to said incoming process request from the ROM to the memory unit of the DSP if the incoming process request is not consistent with the past process request, and then processing corresponding incoming data; and
processing said corresponding incoming data with a program and a parameter that has previously been transferred to the memory unit of the DSP if the incoming process request is consistent with the past process request.

15. The processor of claim 14, wherein said memory unit further comprises:
a RAM and a register.

* * * * *